United States Patent
Sadler

(10) Patent No.: US 10,078,696 B1
(45) Date of Patent: *Sep. 18, 2018

(54) RELEVANT SOCIAL SEARCHING AND USER CENTRIC DATA ANALYSIS VIA USER AND PEER GROUP PARAMETERS VIA A DYNAMIC INTERFACE

(71) Applicant: Paul Jerome Sadler, Rochester, MN (US)

(72) Inventor: Paul Jerome Sadler, Rochester, MN (US)

( * ) Notice: Subject to any disclaimer, the term of this patent is extended or adjusted under 35 U.S.C. 154(b) by 1093 days.

This patent is subject to a terminal disclaimer.

(21) Appl. No.: 13/848,715

(22) Filed: Mar. 21, 2013

Related U.S. Application Data

(60) Continuation of application No. 13/453,990, filed on Apr. 23, 2012, now abandoned, which is a division of application No. 11/964,703, filed on Dec. 26, 2007, now Pat. No. 8,166,026.

(60) Provisional application No. 60/877,047, filed on Dec. 26, 2006.

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
None
See application file for complete search history.

(56) References Cited

U.S. PATENT DOCUMENTS

| 8,082,242 B1* | 12/2011 | Mysen | G06F 17/30699 707/711 |
| 2004/0153463 A1* | 8/2004 | Sasai | G06F 17/30289 |
| 2005/0144158 A1* | 6/2005 | Capper | G06F 17/30696 |
| 2007/0088603 A1* | 4/2007 | Jouppi | G06Q 30/02 705/14.66 |
| 2008/0256023 A1* | 10/2008 | Nair | G06F 17/3064 |
| 2011/0040751 A1* | 2/2011 | Chandrasekar | G06F 17/3087 707/725 |
| 2014/0236678 A1* | 8/2014 | Akerman | G06F 17/3087 705/7.34 |
| 2015/0026153 A1* | 1/2015 | Gupta | G06F 17/30336 707/711 |

* cited by examiner

*Primary Examiner* — Kenny S Lin

(57) ABSTRACT

A system and method that enables the user to search and identify meaningful and relevant information, based upon the weighted, custom parameters provided by the user and parameters or rules defined by the community of users as a group, with the option of utilizing user profile information to tune or detune searching, comparing or contrasting, and predicting. User profile information is collected and organized with data and feedback collected from other users. The results are then tailored to a weighted, cumulative summary result, for display that benefits the contributing user and subsequent future community or user group associations (UGA). The methods provide a summary, or result, that can be tailored specifically to the user based upon weighted rules (algorithms) and parameters defined by the user (or a user group as a whole), and the weighted rules and parameters defined as meaningful by the user (group).

24 Claims, 28 Drawing Sheets

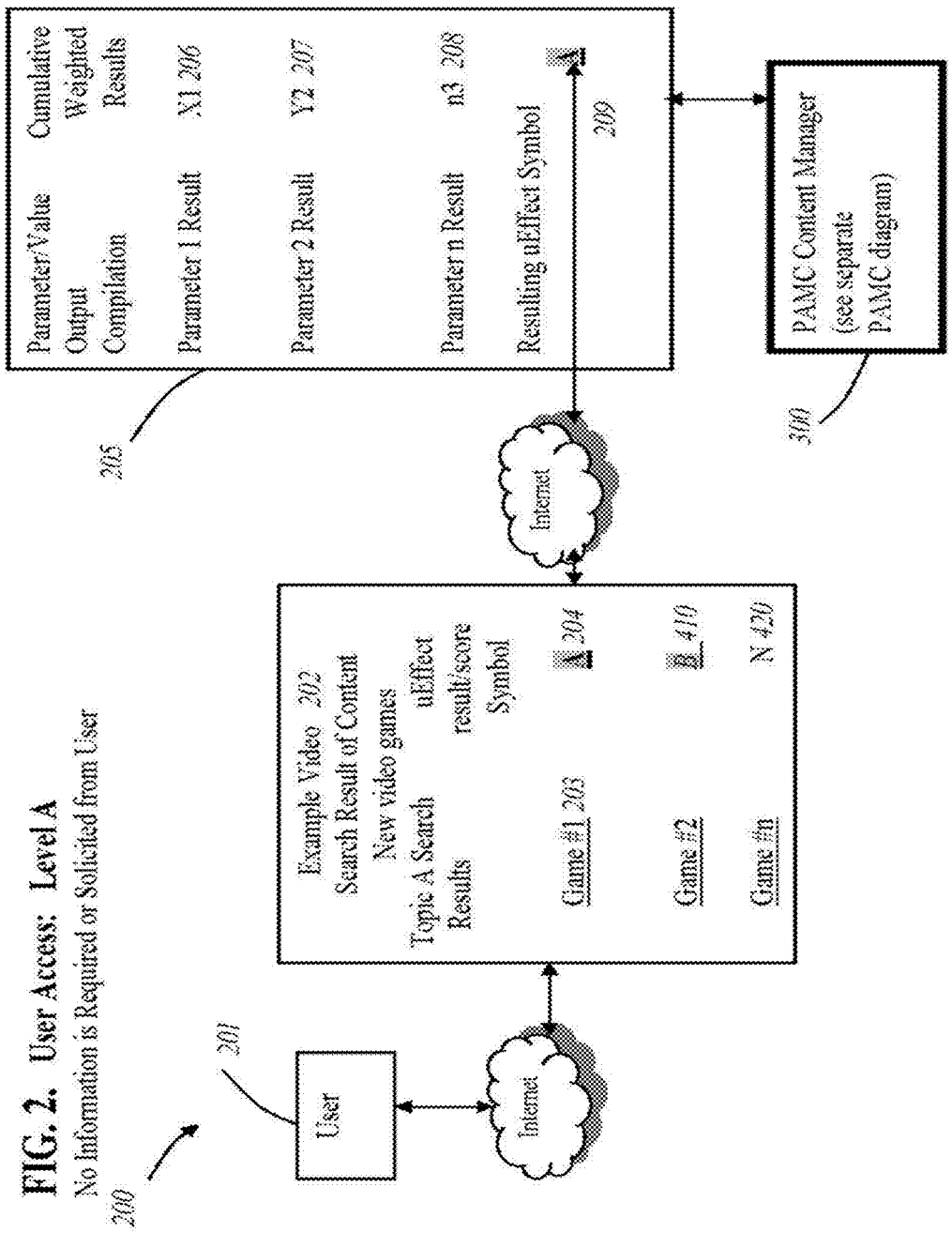

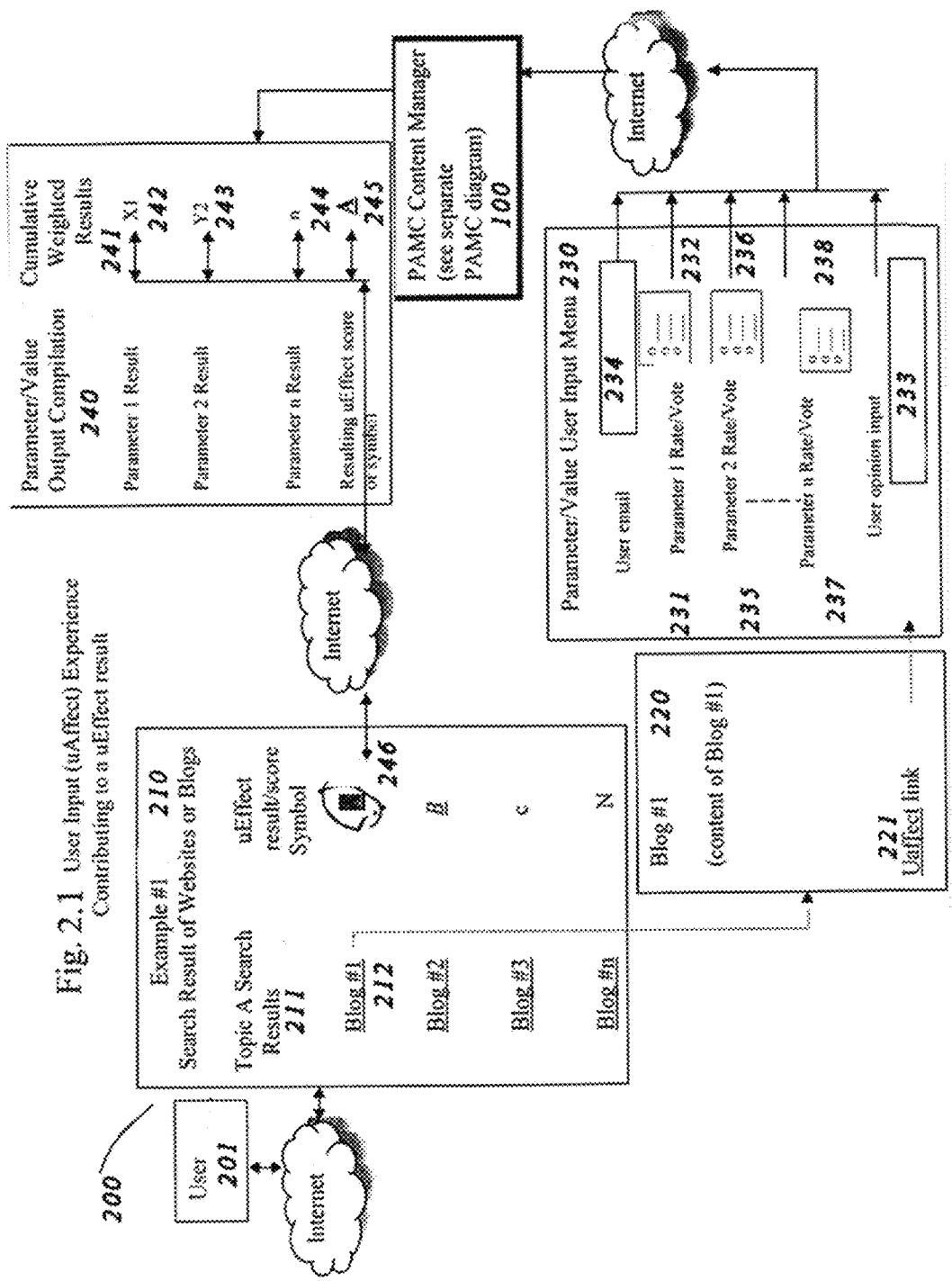
Fig. 2.1 User Input (uAffect) Experience
Contributing to a uEffect result

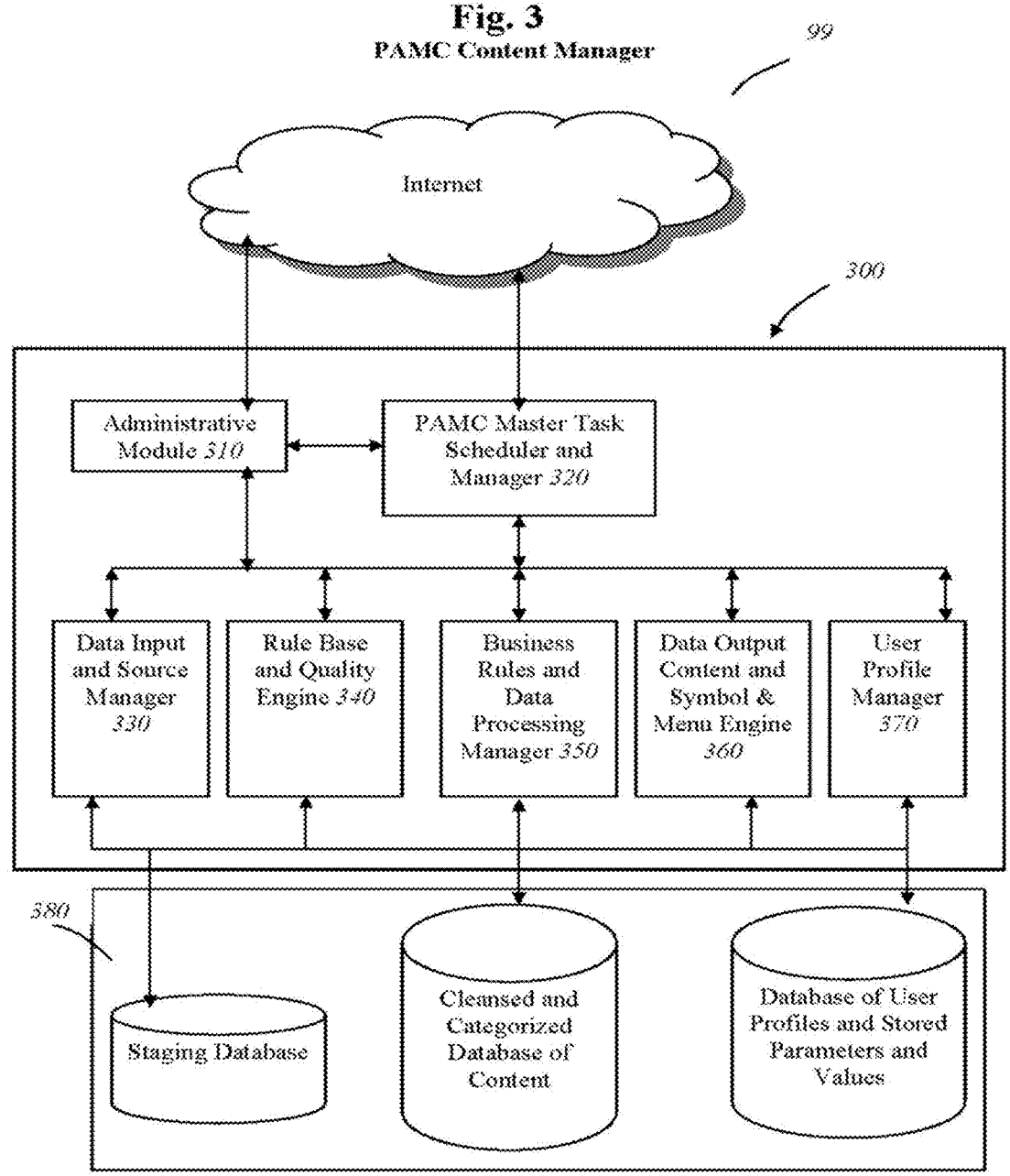

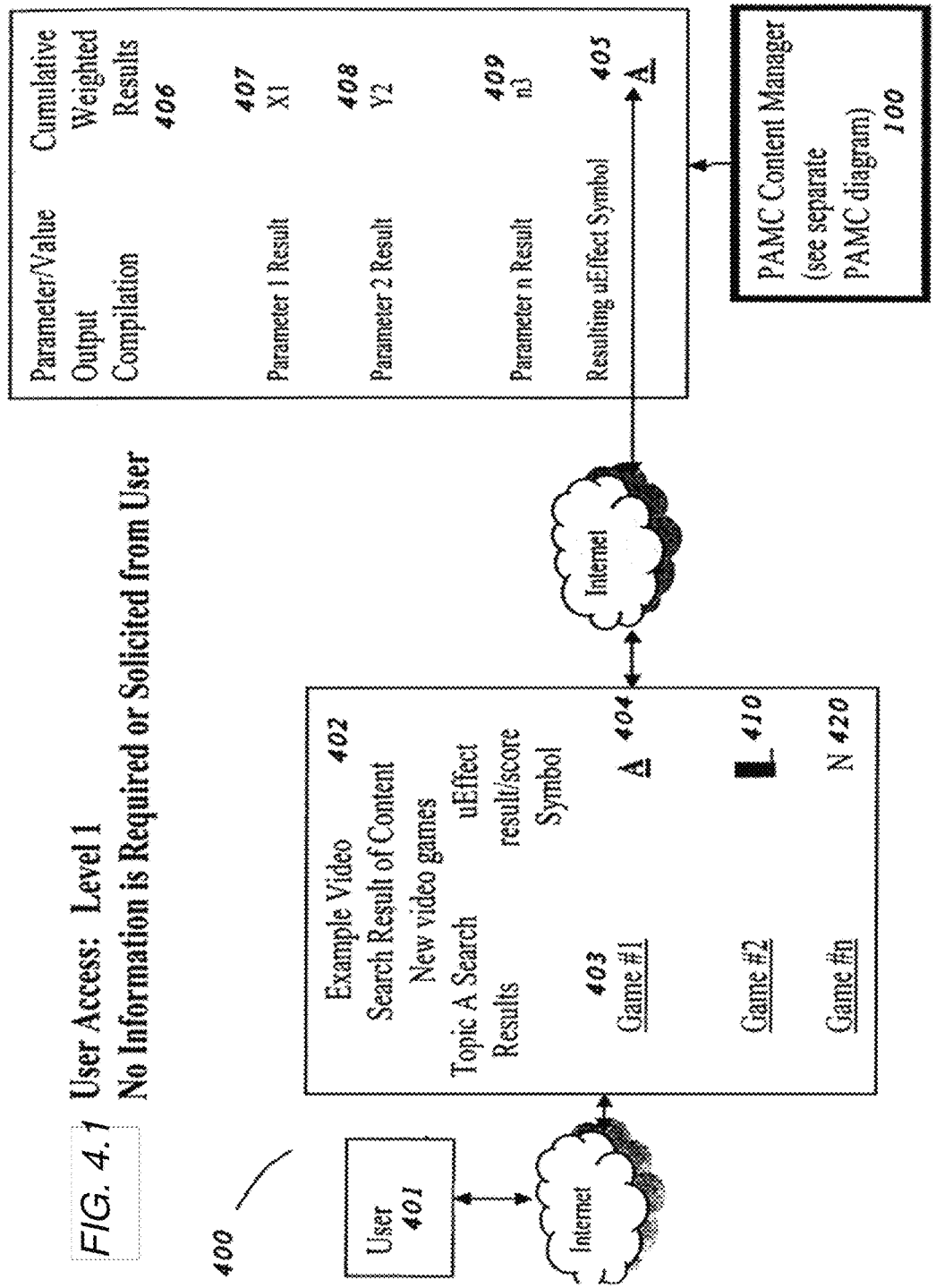

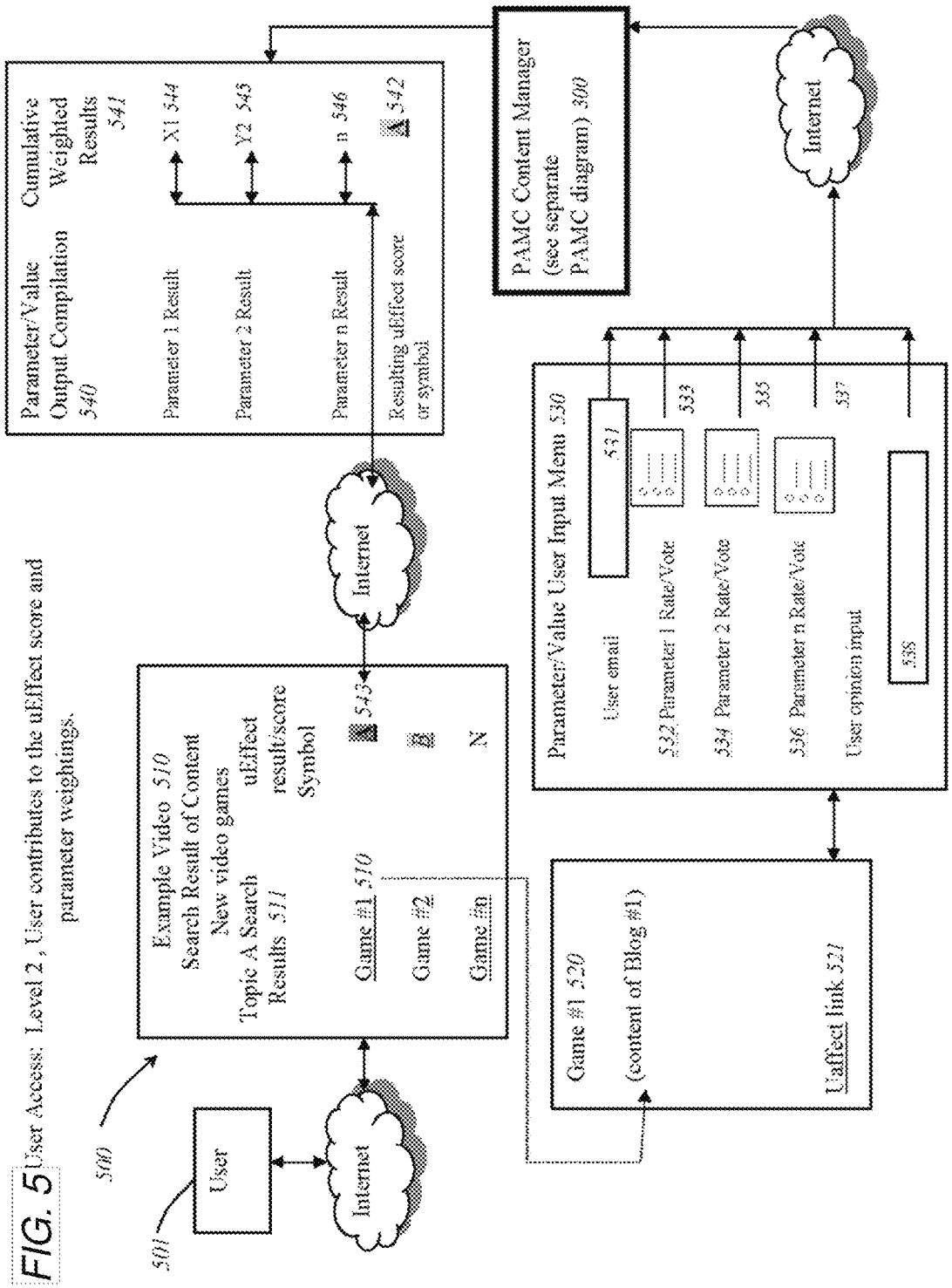

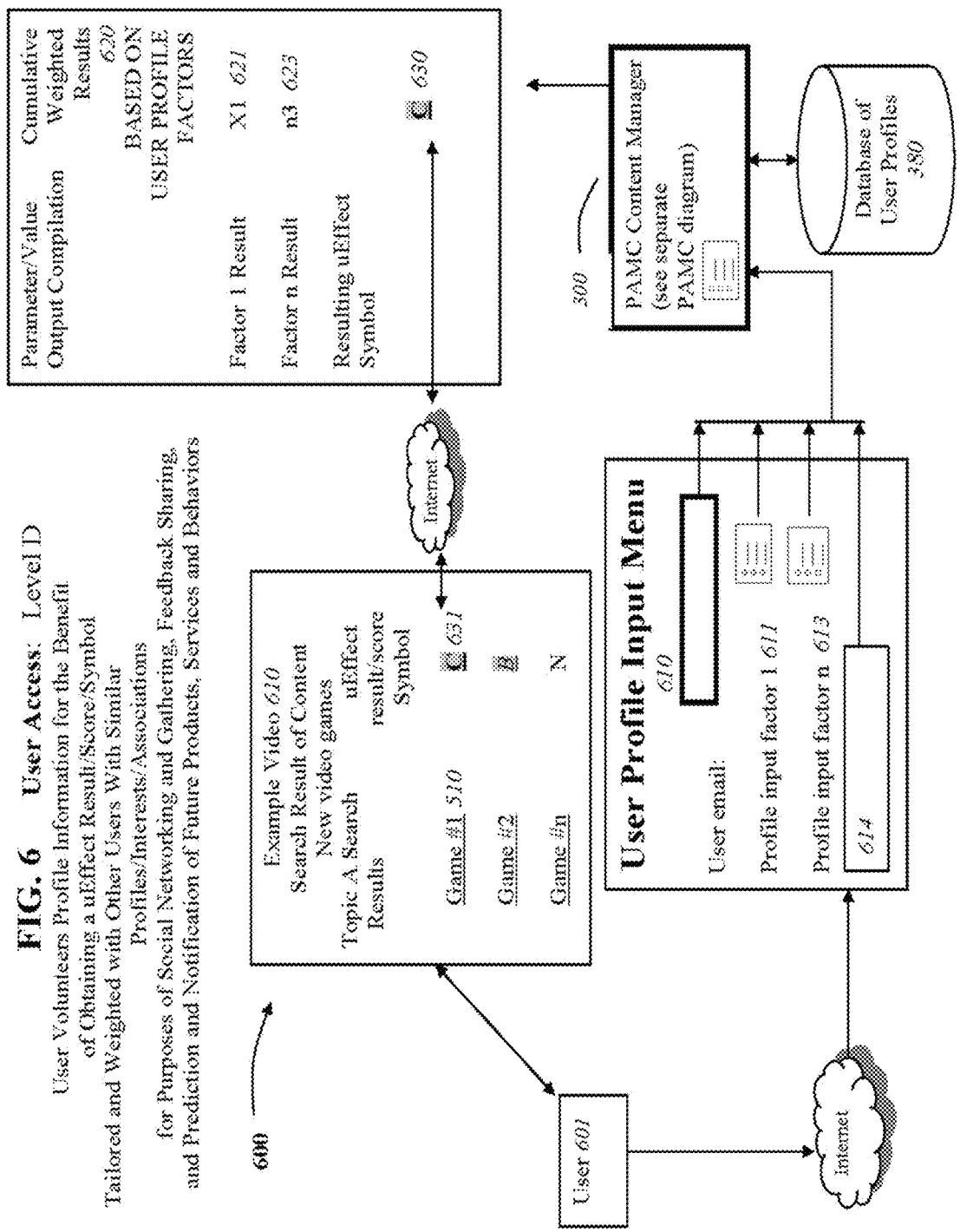
FIG. 6 User Access: Level D
User Volunteers Profile Information for the Benefit of Obtaining a uEffect Result/Score/Symbol Tailored and Weighted with Other Users With Similar Profiles/Interests/Associations for Purposes of Social Networking and Gathering, Feedback Sharing, and Prediction and Notification of Future Products, Services and Behaviors FIG. 9  Embodiment illustrating momentum theory (MT) by charting momentum trend analysis (MTA) of customized, weighted, search parameters with specific rules and algorithms.

FIG. 12 Flow chart of one embodiment.

FIG. 13 *Example of one embodiment of the system.*

FIG. 14
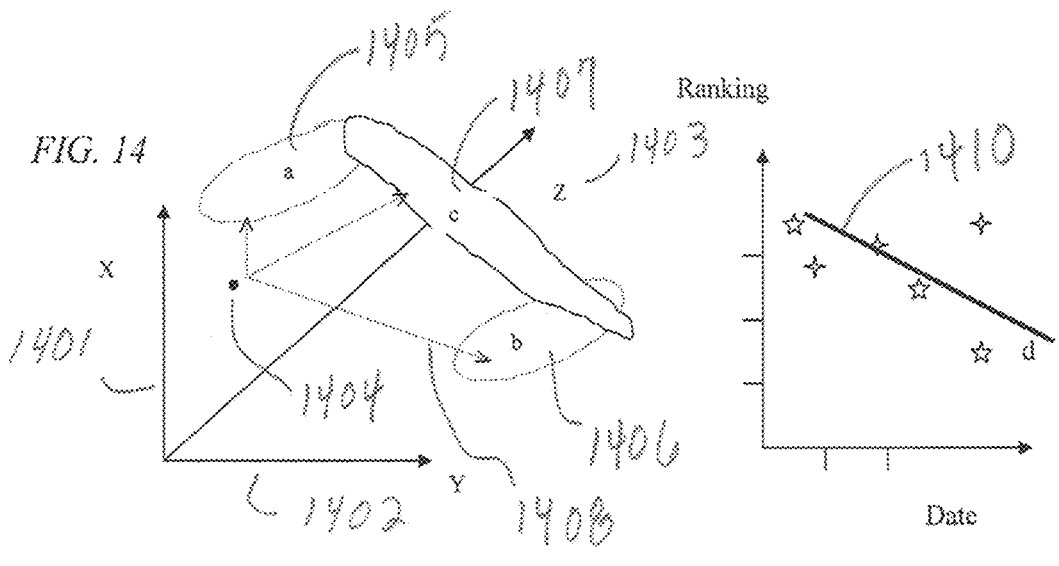
- User
- X Location
- Y Cost
- Z Traffic
a traffic sensitive average
b cost sensitive average
c location sensitive average
d ranking slope or
   purchase slope
   contributing to
   momentum
   quotient
User groups:
1 – N Members — 1411
of
1 – N User Groups
of
1 – N User Group Classifications
of
1 – N Associations
Game Example
User Group
Classifications
    Personal
    Entertainment
    Eating
    Travel
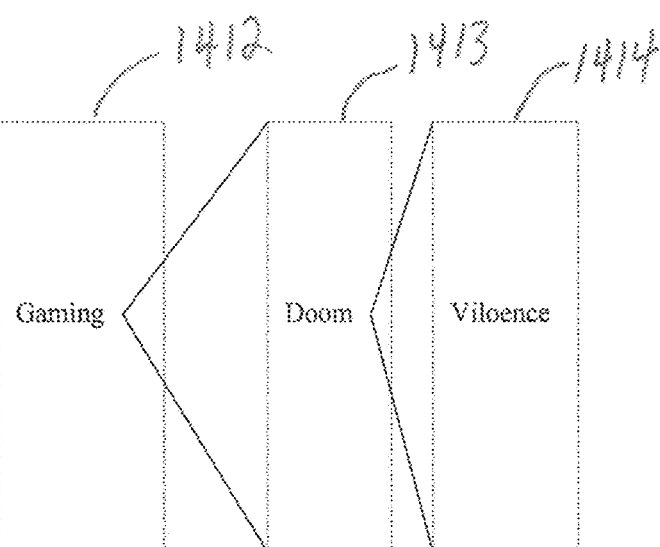

FIG. 15 Flow chart of one embodiment of the system.

FIG. 17 Network System Overview

FIG. 19 One Embodiment of an Initial User Set-up

One Embodiment of Generating a Summary Symbol (SS)

One Embodiment of System Frame Work

One Embodiment of the System Wherein the User Adds a New Parameter

One Embodiment of User Interaction with the System Contributing Data

FIG. 25

Resulting Score Symbol = (∑                         ) * W * R
                                      (Data from Defined Group(s))
                                      (Individual User Data)
                                      parameter 1
                                      p 2                      x W 1
                                      .
                                      .
                                      p n                      x W n p = Parameters incorporating individual user's feedback data
W = Weightings (Weightings of the individual parameters and also including the weightings defined by the group as a whole.
R = Rules and algorithms defined by the user group association.
∑ = the Sum of Resulting Score Symbol = ((∑                        ) * ∑W * R * ($t_{time}$))
                                      (Data from Defined Group(s))
                                      (Individual User Data)
                                      parameter 1
                                      p 2                   x W 1
                                      .
                                      .
                                      p n                  x W n t = incorporating a time parameter (or filter)
p = Parameters incorporating individual user's feedback data
W = Weightings (Weightings of the individual parameters and also including the weightings defined by the group as a whole.
R = Rules and algorithms defined by the user group association.
∑ = the Sum of

FIG. 26

Resulting Score Symbol = (($\sum$            ) * $\sum W * R * (t_{time}) * (u_{ility}) * (n_{user\ defined})$)

(Data from Defined Group(s))
      (Individual User Data)
      parameter a : 98 (1 –100)     W a = 8 (1-10)
      p b : 82                                  W b = 4
      .
      p n                                     W n $t$ = incorporating a time parameter (or filter)
$p$ = Parameters incorporating individual user's feedback data
$W$ = Weightings (Weightings of the individual parameters and also including the weightings defined by the group as a whole.
$R$ = Rules and algorithms defined by the user, or the user group association or both.
$\sum$ = the Sum of
$u$ = Utility factor or parameter
$n$ = Additional user defined factor, rule, algorithms, filter, tuning process or parameter Resulting Score Symbol = (($\sum$ Group Results +       $\sum$ Individual Results + W      ) * $\sum W * R * (t_{time}) * (u_{ility}) * (n_{user\ defined})$
     (Data from Defined Group(s))    (Data from Defined Group(s))
     ($\sum$ Individual User Data)          (Individual User Data)

parameter a : 98 (1 –100)       parameter a : 98 (1 –100) + W     W a = 5 (1-10)
     p b : 82                         p b : 43 + W                    W b = 4
     .
     p n                              p n + W                       W n $t$ = incorporating a time parameter (or filter)
$p$ = Parameters incorporating individual user's feedback data
$W$ = Weightings (Weightings of the individual parameters and also including the weightings defined by the group as a whole.
$R$ = Rules and algorithms defined by the user, or the user group association or both.
$\sum$ = the Sum of
$u$ = Utility factor or parameter
$n$ = Additional user defined factor, rule, algorithms or parameter

RELEVANT SOCIAL SEARCHING AND USER CENTRIC DATA ANALYSIS VIA USER AND PEER GROUP PARAMETERS VIA A DYNAMIC INTERFACE

CROSS-REFERENCE TO RELATED APPLICATIONS

This patent application Ser. No. 13/848,715, is a divisional of U.S. patent application Ser. Nos. 13/453,990 and 11/964,703 entitled "USER-CENTRIC, USER-WEIGHTED METHOD AND APPARATUS FOR IMPROVING RELEVANCE AND ANALYSIS OF INFORMATION SHARING AND SEARCHING" filed on Dec. 26, 2007 (which issued as U.S. Pat. No. 8,166,026 on Apr. 24, 2012), which claims benefit to U.S. Provisional Patent Application No. 60/877,047 filed on Dec. 26, 2006, each of which is hereby incorporated by reference in its entirety for all purposes.

FIELD OF THE INVENTION

This invention relates to computerized methods and apparatus for searching, analyzing, and presenting data, and more particularly to personalizing meaningful and relevant data using a user-defined, user-weighted, and a user-profile-driven method to obtain relevant data and feedback tuning for searching, comparing, and analyzing historical, current, and predicting future momentum data.

BACKGROUND OF THE INVENTION

Conventional systems may define relevancy as the number of hits, the number of checkouts and other past and behavioral information gathered for user activity. In some instances, a simple input, or score, from the user is collected and summarized as a number or another set of symbols like 'stars'. However, for most people, this type of scoring, or relevancy, of the inquiry or search result lacks the specific information that would most benefit the user. To complicate the issue further, finding relevant information has become increasing more difficult with the sheer volume of information now available on the internet combined with the information being made available on a daily basis on companies' intranet and other systems.

Several traditional, known approaches have been employed in an attempt to improve the relevancy of user input opinions or other data. One approach comprises devising mechanisms to map a user's query to document and concept-based query expansion, while another approach identifies each concept and is expanded to a disjunctive set or group of concepts on the basis of relationships identified by the user. Another known idea is proposed in, "Incremental Relevance Feedback for Information Filtering", by J. Allen, Center for Intelligent Information Retrieval Dept. of Computer Science, Univ. of Mass., Amherst, Mass. This concept relates to feedback techniques that factors in shifts of the user interest patterns over a period of time.

Various publications provide certain aspects used in some embodiments of the present invention. These include:

- "Incremental Relevance Feedback for Information Filtering", by J. Allan, Center for Intelligent Information Retrieval Dept. of Computer Science, University of Massachusetts, Amherst, Mass.
- "Using faces to represent points in k-dimensional space graphically", Herman Chernoff (1973), Journal of the *American Statistical Association* 68 (342): 361-368.

U.S. PATENT PUBLICATION NUMBER 2006/0235860 A1 (which issued as U.S. Pat. No. 7,596,558 on Sep. 29, 2009), by BRETT BREWER, TITLED "SYSTEM AND METHOD FOR OBTAINING USER FEEDBACK FOR RELEVANCE TUNING" is hereby incorporated by reference. It describes a system and method for facilitating user feedback pertaining to search results produced by a search system in response to an input user query. The system may include an edit mode activation option provided in conjunction with the search results. The system may additionally include result manipulation tools triggered in response to a user selection of the edit mode activation option, the result manipulation tools allowing the user to manipulate the search results. The result manipulation tools may include a sorting interface for allowing a user to sort search results. The system may further include a feedback receiving mechanism for receiving and storing the user-manipulated search results for future ranking input or search result personalization input. In some embodiments; the sorting interface allows the user to drag and drop results in the selected descending order. Some embodiments further include providing a re-ordering interface including drag and drop capability that allows the user to re-order the search results in descending order based on relevance.

U.S. PATENT PUBLICATION NUMBER 2006/0112099 A1 (which issued as U.S. Pat. No. 7,698,279 on Apr. 13, 2010), by TIMOTHY MUSGROVE, PRODUCT FEATURE AND RELATION COMPARISON SYSTEM is hereby incorporated by reference. It describes a method of presenting data regarding products. Feature categories are assigned to each product category based on available data. A weighted importance is assigned to each feature category of each product category based on the available data. The items in the product category are ranked according to the weighted importance of the feature categories of each item, and the evaluation metrics of each feature category.

U.S. Pat. No. 6,256,633, to SHANDA DHARAP, "CONTEXT BASED AND USER PROFILE DRIVEN INFORMATION RETRIEVAL" is hereby incorporated by reference. It describes that a user is enabled to navigate through an electronic data base in a personalized manner. A context is created based on a profile of the user, the profile being at least partly formed in advance. Candidate data is selected from the data base under control of the context and the user is enabled to interact with the candidates. The profile is based on topical information supplied by the user in advance and a history of previous accesses from the user to the data base.

U.S. Pat. No. 7,089,237, to DONALD TURNBULL, "INTERFACE AND SYSTEM FOR PROVIDING PERSISTENT CONTEXTUAL RELEVANCE FOR COMMERCE ACTIVITIES IN A NETWORKED ENVIRONMENT" is hereby incorporated by reference. It describes a search and recommendation system that employs the preferences and profiles of individual users and groups within a community of users, as well as information derived from categorically organized content pointers, to augment electronic commerce related searches, re-rank search results, and provide recommendations for commerce related objects based on an initial subject-matter query and an interaction history of a user. The search and recommendation system operates in the context of a content pointer manager, which stores individual users' content pointers (some of which may be published or shared for group use) on a centralized content pointer database connected to a network. The shared content pointer manager is implemented as a distributed program, portions of which operate on users' terminals and other portions of which operate on the centralized content pointer database. A user's content pointers are organized in accordance with a local topical categorical hierarchy. The hierarchical organization is used to define a relevance context within which returned objects are evaluated and ordered.

U.S. PATENT PUBLICATION NUMBER 2006/0101017 A1 (which issued as U.S. Pat. No. 7,426,499 on Sep. 16, 2008), by JEFFREY EDER, "SEARCH RANKING SYSTEM" is hereby incorporated by reference. It describes a computer-based media, method and system for prioritizing search results for an individual, a group, a team, a division, an organization or some combination thereof.

U.S. Pat. No. 7,096,214, to KRISHNA BHARAT, "SYSTEM AND METHOD FOR SUPPORTING EDITORIAL OPINION IN THE RANKING OF SEARCH RESULTS" is hereby incorporated by reference. It describes a server that improves the ranking of search results. The server includes a processor and a memory that stores instructions and a group of query themes. The processor receives a search query containing at least one search term, retrieves one or more objects based on the at least one search term and determines whether the search query corresponds to at least one of the group of query themes. The processor then ranks the one or more objects based on whether the search query corresponds to at least one of the group of query themes and provides the ranked one or more objects to a user.

U.S. Pat. No. 7,031,961, to JAMES PITKOW, "SYSTEM AND METHOD FOR SEARCHING AND RECOMMENDING OBJECTS FROM A CATEGORICALLY ORGANIZED INFORMATION REPOSITORY" is hereby incorporated by reference. It describes a search and recommendation system employs the preferences and profiles of individual users and groups within a community of users, as well as information derived from categorically organized content pointers, to augment Internet searches, re-rank search results, and provide recommendations for objects based on an initial subject-matter query. The search and recommendation system operates in the context of a content pointer manager, which stores individual users' content pointers (some of which may be published or shared for group use) on a centralized content pointer database connected to the Internet. The shared content pointer manager is implemented as a distributed program, portions of which operate on users' terminals and other portions of which operate on the centralized content pointer database. A user's content pointers are organized in accordance with a local topical categorical hierarchy. The hierarchical organization is used to define a relevance context within which returned objects are evaluated and ordered.

U.S. PATENT PUBLICATION NUMBER 2006/0218146, ELAN BITAN, "INTERACTIVE USER CONTROLLED RELEVANCE RANKING INFORMATION IN AN INFORMATION SEARCH SYSTEM" is hereby incorporated by reference. It describes an apparatus and system for providing an ability to conduct a secondary search using results provided by a first search capability. This secondary search is integrated with the first search and functions as an added tool or accessory. The present invention allows for user control of search ranking, search viewing and search presentations thus affording more relevant information retrieval. Searchers can dynamically and interactively examine and manipulate the search results to improve relevance and quickly satisfy their search objectives.

U.S. PATENT PUBLICATION NUMBER 2006/0206505 (which issued as U.S. Pat. No. 7,680,855 on Mar. 16, 2010), by ADAM HYDER, "SYSTEM AND METHOD FOR MANAGING LISTINGS" is hereby incorporated by reference. It describes a computer system and method for capture, managing and presenting data obtained from various often unrelated postings via the Internet for examination by a user. This system includes a scraping module having one or more scraping engines operable to scrape information data sets from listings on the corporate sites and web sites, direct feeds, and other sources, wherein the scraping module receives and stores the scraped listing information data sets in a database. The system also has a management platform coordinating all operation of and communication between the sources, system administrators and processing modules. The processing modules in the platform include scraping management module analyzing selected scraped data stored in the database, and a categorization module that examines and categorizes each data set stored in the database into one or more of a predetermined set of categories and returns categorized data sets to the database.

U.S. Pat. No. 6,904,455, to ROBERT YEN, "METHOD AND SYSTEM FOR PROVIDING LOCAL CONTENT FOR USE IN PARTIALLY SATISFYING INTERNET DATA REQUESTS FROM REMOTE SERVERS" is hereby incorporated by reference. It describes improved techniques for data delivery from a server machine to client machines through a network. The techniques reduce the demands on connection bandwidth between the client machines and the network, and thus enable media-rich data to be delivered with reduced amounts of network bandwidth. The techniques also reduce the bandwidth demands on network servers and overall network infrastructure.

Other background for the present invention can be found in U.S. Pat. No. 6,256,633 "CONTEXT-BASED AND USER-PROFILE DRIVEN INFORMATION RETRIEVAL," and U.S. Pat. No. 6,735,568 "METHOD AND SYSTEM FOR IDENTIFYING PEOPLE WHO ARE LIKELY TO HAVE A SUCCESSFUL RELATIONSHIP," which are hereby incorporated by reference.

What is needed is an improved method and apparatus to increase the relevancy of search results and to allow improved analysis of data that is collected.

SUMMARY OF THE INVENTION

In some embodiments, the present invention provides a computerized method and apparatus for searching, analyzing, and presenting data, and more particularly to personalizing meaningful and relevant data using a user-defined, user-weighted, and a user-profile-driven method to obtain relevant data and feedback tuning for searching, comparing, and analyzing historical, current, and predicting future momentum data. Some embodiments further include enabling user-centric meaningful and relevant information in the form of input data or feedback. Some embodiments enable and facilitate sharing of data and user defined and user weighted feedback and decisions with regards to purchasing, evaluating, comparing, predicting, searching and browsing a particular product, service, individual event or other user-defined topic. Some embodiments define the methods of eliciting, collecting, organizing, processing, weighting and retrieving meaningful and relevant content provided by the input of individual weighted and group weighted parameters for the benefit of subsequent users and groups of users as a shared community.

The invention improves upon shared environments such as Hypertext Transport Protocol ("http") and directory indexing or 'bookmarking', to benefit clients who desire to obtain meaningful user input data (or feedback) from other users by providing a tailored search result. In addition to incorporating user profile information, the method includes adding user (and user group) defined parameters, rules (algorithms) or metrics and feedback that, in some embodiment, involve weighted criteria or parameters provided by the user. Data gathered (in one embodiment referred to as the uAffect input) is then weighted and configured by criteria and/or parameters provided by the community of users as a group with user profile information factored into the results, based upon user definitions, rules, parameters and 'use' or utility context. Results then display a cumulative, weighted and tailored result to the user and user group as a whole (in one embodiment referred to as the uEffect output). In some embodiments, this invention can be used to track data about topics, businesses, products and other information to determine trending, prediction and historical analysis of the topic, person, event, business, product, or service. The user-defined and user-contributed data can be organized as such to determine and track the momentum quotient.

This invention provides a system and method that enables the user to search and identify meaningful and relevant information, based upon the weighted, custom parameters provided by the user and parameters or rules defined by the community of users as a group, with the option of utilizing user profile information to tune or detune searching, comparing or contrasting, and predicting. User profile information is collected and organized with data and feedback collected from other users. The results are then tailored to a weighted, cumulative summary result, for display that benefits the contributing user and subsequent future community or user group associations (UGAs). The methods provide a summary, or result, that can be tailored specifically to the user based upon weighted rules (algorithms) and parameters defined by the user (or a user group as a whole), and the weighted rules and parameters defined as meaningful by the user (group). The resulting cumulative and weighted results provide more meaningful and relevant data. User input data and summary results are displayed, in some embodiments, in a dynamic, linked, multivariate symbol, graph or figure for ready access via computer or mobile device.

Capturing the data within the system and method of this invention, relevant and specific data can be collected, analyzed and tailored the searching user. The user contributing data and feedback will belong typically to more then one user group or association, for example, a user may belong to the 'over 40 years old' association, and also belong to the 'professional photographer' and the 'amateur guitar player' associations. When analyzing or searching for feedback, the searching query can weight certain parameters optimizing the search, and also include or exclude feedback from certain associations further tuning the search result generating a more meaningful and relevant result. For statistical modeling, this can be used to analyze historical trends, determine and predict future trends and to define and determine the momentum quotient of the topic, product or other subject from the priorities, weighting, and perspectives of defined associations or user groups.

In general terms, meaningful and relevant information for users attempting to search, compare, analyze and predict trends of data is best obtained from information provided by other users, potentially by users with similar profiles and 'use' of data context. In most instances, the concept of viewing pulled or 'demanded' data, feedback or information (relevancy determined by the users, a user group, community or a peer group) as opposed to viewing pushed or 'supplied' data or feedback (provided by the promoters, authors of information and other content providers or search engines) is considered more meaningful and relevant for the users as a whole.

Key components to effective information and data search, analysis and retrieval lies in enabling the individual users, in conjunction with the user groups, to configure the user centric, user defined and user weighted parameters, rules (algorithms), factors, 'use' of data context, tools and mechanisms. This unique approach optimizes searching, comparing or contrasting, analyzing, and predicting trends, markets, behaviors and other information gathered from a user defined criteria of organizing the data. One of the unique aspects of this invention is that it allows the users to determine the parameters or factors that are important to them as individuals, and define the parameters and factors important to the user community or group as a whole, and then weight the relevance of all factors and parameters to be considered in the feedback, scores or other data. Searching, comparing or analyzing data within a dashboard application provides the user with the ability to define and prioritize the topics and parameters important to the search query. Cumulative results provide meaningful and relevant feedback and are displayed in a weighted, cumulative result in a meaningful summary of the data set or symbol with multiple variables indicated within the displayed symbol. The symbols, in some embodiments, are dynamically linked to display, elicit, and receive information.

The present system and method maintains a centralized database of meaningful data pertaining to users. Information that is gathered and information that is provided by the user beyond 'scores' or 'ratings' include, in some embodiments; the individual profile information of the user, individual meaningful feedback (regarding a person, product, service or event), the weighted parameters, weighted factors and rules in which to categorize and prioritize the information provided, stored, displayed and analyzed. Using the system that provides and hosts a sharing and communication platform, the user can also have the option of providing meaningful information to the community group, or association as a whole including the categorizing and prioritizing the relevant parameters, scores and rules about a topic for defining more meaningful and relevant information (or feedback).

In maintaining a centralized database, the system has the ability of harnessing user-centric data to organize and manage the input information collected by the users (in some embodiments to include the individual user profile information, implicit, explicit, implied data to include user feedback on various topics and user input including ratings or scores and other information, on each of the group or community parameters that reference each topic). Data is available in the present invention as an integrated data input and feedback interface. This apparatus allows for several operations to be performed, including enhanced meaningful data search and retrieval, enhanced meaningful results, data analysis and data predictability outputs and summaries. Manipulated data search results, according to user and UGA definitions, are stored for additional analysis by a ranking system. Outputs are displayed and made available to the users in a predefined format or symbol defined by the user, or the UGA as a whole.

The method herein in one embodiment includes a dashboard for the functions of searching, comparing, collecting and analyzing data. The dashboard (see FIG. 7 and PDA figure) are fully integrated, real-time user interface(s) with edit functions that can utilize several tools, defined and weighted by the user, to manipulate and optimize the functions described above and other customized functions defined by the user or the user group. The dashboard or other input apparatus enables the user to easily switch from a standard search function to the user defined and weighted search function. The apparatus has the ability to display multivariate results that can graphically represent several variables, factors, scores, rankings and parameters. The results can be displayed by the display and notification preferences defined by the searching user or the parameters recommended by a collective user group, community or association.

Analyzing trends or tuning of the heuristics and algorithms, includes evaluating the topics and weighted parameters defined by the user and communities, combined with user profile information and the feedback and scoring data gathered over time. The system benefits users by providing powerful trending and prediction analysis when economic models and statistical tools are employed for modeling tools and techniques including momentum analysis. To enhance the relevancy of search or data analysis, a user can search parameters and profiles from the perspective of a UGA that the searcher may or may not directly belong to.

BRIEF DESCRIPTION OF THE DRAWINGS

FIG. 2 is an illustration of one embodiment of the system where a user contributes data and can view the cumulative summary result. FIG. 2.1 outlines another embodiment of the invention.

FIG. 3 is an illustration of one embodiment of the system and invention and the database supporting the system.

FIG. 4.1 outlines another embodiment of the invention.

FIG. 5, is an illustration of one embodiment wherein the User contributes to the uEffect score and parameter weightings.

FIG. 6 is an illustration of one embodiment wherein the User Volunteers Profile Information for the Benefit of Obtaining a uEffect Result/Score/Symbol Tailored and Weighted with Other Users With Similar Profiles/Interests/Associations for Purposes of Social Networking and Gathering, Feedback Sharing, and Prediction and Notification of Future Products, Services and Behaviors.

FIG. 14 is a flow chart of one embodiment and a chart of classifying and ordering collected data.

FIG. 25 illustrates two embodiments in formulas.

FIG. 26 illustrates two embodiments in formulas.

DESCRIPTION OF THE INVENTION

I. System Overview

Figure 1:
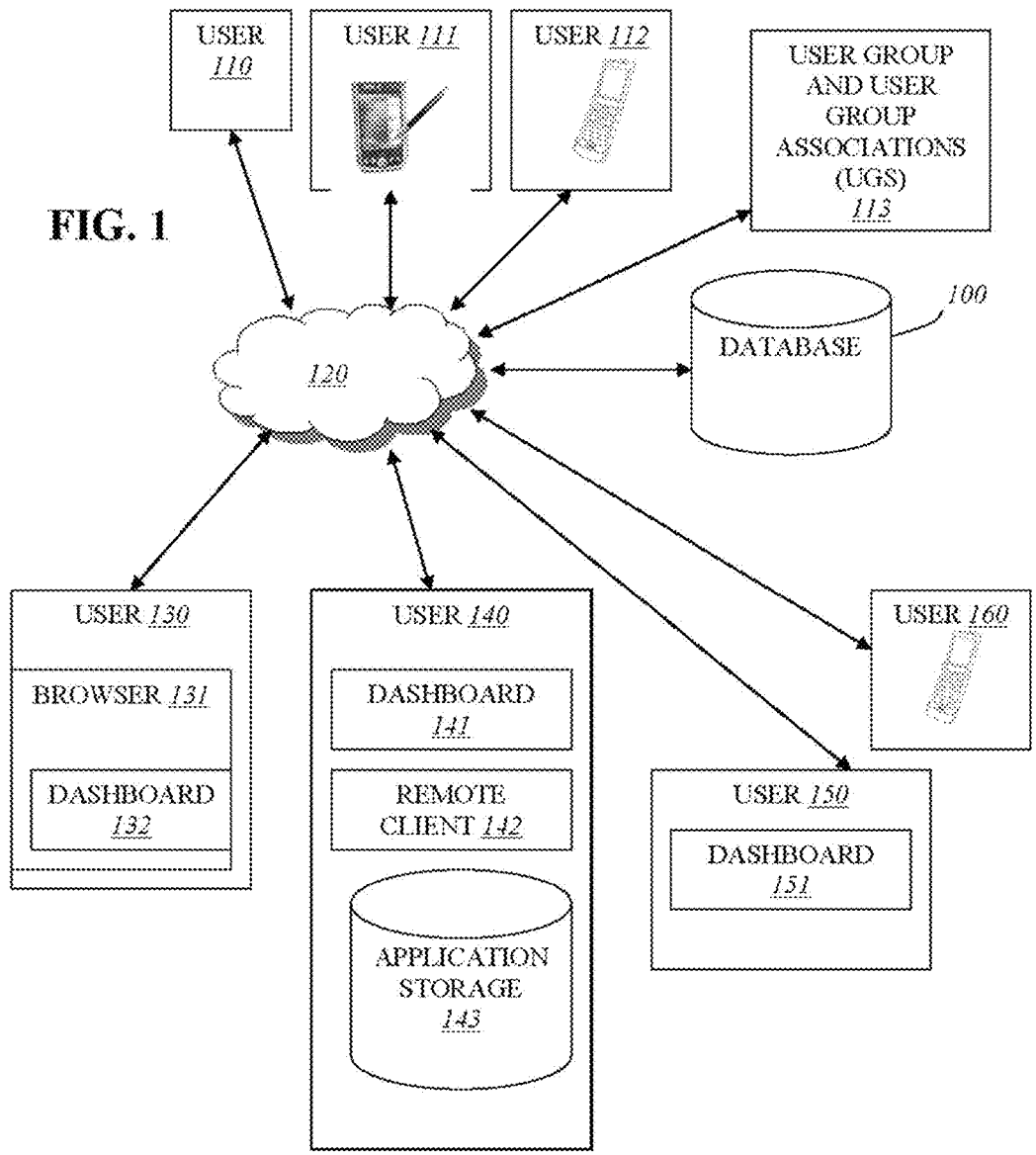
FIG. 1 is a system overview illustrating remote users accessing the database.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Currently there is a disconnect in acquiring the meaningful and relevant information from stored data resources and utilizing the internet or other communication network, such a as cell phones, to collect the relevant feedback about specific topics from other users or groups of users. Beyond the large amount of general information and feedback, people are interested in acquiring relevant information and feedback about certain topics or subjects, (such as movies, theater, restaurant reviews, political information, products, services, events, people, hobbies and other topics) that is deemed relevant by the searching user. Currently, content that relates to determining relevant information is delivered via the internet (including websites, blogs, video and audio streaming and more) as well as offline sources (some examples being theater critics, movie critics, radio personalities, newspaper editors and other staff). What is lacking is an organized, user-centric system and method that delivers relevant information to the user and user communities wherein the users themselves define the weightings, parameters and factors that determine meaningful feedback information.

To further enhance the relevancy of the user input, the users need an apparatus and environment where they determine the weighting and the priority of the relevant parameters and factors that define the feedback matrix for the individual user and the user group and topic as a whole. Obviously in some embodiments, media content aggregators such as search engines provide a wealth of information regarding certain topics that provide user feedback in the form of search results. Yahoo, Google, Alta Vista and IBM's CLEVER utilize several tools to "crawl" the web, compare documents, key-word searches, pattern matching analysis, number of links, page content searches, past user behavior and other collected data and other tools to monitor the behavior of users to help determine relevance. Searches results are typically limited in usefulness because the results do not reflect the user's weighted preferences and often generate an overwhelming number of results. Search results often are skewed to the ranking algorithms defined by the author, provider or content aggregator sometimes for the benefit of an advertiser or other influential person or media concern that have defined the search parameters.

Complicating matters, the accessibility of the internet has enabled millions of people to access and post information online. This is an opportunity to access relevant content, however, the advantages of the internet are not yet fully realized because of several reasons. Two pertinent reasons are: the sheer amount of information and search results available online oftentimes is overwhelming and too difficult to discern meaningful information. Relevant content is not easily accessed, and the content source is at times unknown. Trying to determine relevant information is distorted by the person or entity that posts content. Accordingly, there is a need for a system that more completely searches, obtains and organizes information from a user-centric platform. To optimize this platform, the invention provides the database, system, method and apparatus to easily and efficiently combine the results from general search functions (for comparing and analyzing) from current sources like Google, Yahoo and MSN, with search functions from the system using custom tailored parameters, combined with user profile and feedback data obtained from other sources of input data over the communications network (cell phones, RFID, online and offline sources).

An apparatus and method are provided for eliciting and facilitating user generated data (in some embodiments to include user profile information, feedback, scores, ratings, weightings, search parameters, timing, 'use' of data context and, or other meaningful data defined as useful by the user and/or the user groups, communities, or associations). The system provides the method, apparatus and mechanism in which the data is elicited, collected, stored, and retrieved via a communications network. The system is designed to work independently, or in cooperation and collaboration, with other data content aggregators and providers, search engines, or media outlets.

FIG. 1 is an illustration that outlines one such embodiment of the invention. Users can access the internet, intranet or other communications network 120, using various means from a computer or other networking device 110, a mobile consumer electronic device 111 or other mobile phone device 112. The system database 100, will be included in the network. Some users who are seeking to access system data can do so in a variety of embodiments including a remote access 130, in conjunction with a browser 131, and a dashboard for input and display of output information 132. In another example, a user 140, can customize a dashboard 141 that works with a remote client 142, with storage for the application 143. Other users 150 can access data through a dashboard 151, or other type of mobile device optimized to connect to the network 160.

FIG. 2 outlines one embodiment of the invention. FIG. 2.1 outlines another embodiment of the invention where a user 201, can input data or feedback, in this example referred to as a uAffect input, contributing to the overall summary result of a particular topic, in this example referred to as a uEffect result. A user can access a search result list of websites or blogs from a search engine 200. Searches typically refer to a topic 210, and result in a list of search-recommended blogs 211, that incorporate the search query. By clicking on a link, the user can access the content of the blog or website 220. To provide feedback and scoring data, the user can access a uAffect link, in this example, a link at the bottom of the blog #1 page 221.

FIG. 2.1 outlines the parameter/value user input menu 230, is a data input page that collects various scores 231, votes 232, user profile information and user input data 233. This information is collected, managed, organized and stored in system database that accessible over a network connection 300 (see FIG. 3). Referring again to FIG. 2.1, the information is organized by the topics, parameters and factors 240, and the cumulative, weighted results 241. The results 242, 243, and 244 are then computed to obtain a resulting uEffect score 245. The resulting score can be a symbol or a combination of symbols, numbers, letters, visual effects, audio effects and other digits to convey multiple variables is a concise, summary form.

Further referring to FIG. 2.1, the resulting uEffect symbol 245, can be then displayed on the system or in a remote environment, at times in a list format 246.

FIG. 3 shows one embodiment of the system and method described herein incorporates in one example what is referred to as a Platform of Advanced Meaningful Content (PAMC) that incorporates a software platform for managing relevant feedback tools for any kind of content data FIG. 3. An example of data may include (but not limited to) product, art, movie and creative content reviews, service feedback, event feedback (shows, campaigns), consumer and business feedback, educational and government (politics) reviews, media articles, blogs, websites, etc. The system is fully distributable among several machines and is scalable for access of both online and offline content and users. In some embodiments a remote client and database are hosted on a remote mobile phone, computer or other device. Each module described below within the software system is scalable and may include multiple instances dictated by the amount of data to be handled and processed therein.

One embodiment of the system, referencing FIG. 3, for implementing the invention, includes a general purpose computing device with processing units and system buses that couples various system components including the system memory and database. Typical computer storage media in the form of volatile and/or nonvolatile memory and databases with random access memory (RAM) coupled with a basic input/output system (BIOS) and random access memory (RAM). Data is stored in this example in a hard drive but other embodiments may include storage devices such as removable media, remotely via the communications network to other storage devices including handheld user's devices. The computer in this invention operates in a networked environment using logical connections to one or more remote computers or other input/output devices.

The embodiment of the PAMC 300, in this illustration in FIG. 3, the system described is a computer software system for managing the collection, processing and distribution of generated feedback information provided by users and the user profiles of those accessing the database(s). The System allows for a data capture from a plurality of sources such as the internet 99, for compilation into a searchable and easily obtained data structure for meaningful and relevant information. The System includes an administrative portal module 310, providing system administration and operation control via a network interface accessing the data content manager. The administrative module includes the various administration functions of access control. The master task scheduler and manager 320, provides the security and the gateway in which data is acquired and accessed.

The Data Input and Source Manager module 330, is the embodiment of an exemplary system operating through the use of any available means of accessing feedback content data including direct feeds, web based feeds, XML feeds, mobile and telephony feeds. The module is functionality described is applicable to any distributed information environment whereby information can be obtained by manual or automated systems.

The Rule Base and Quality Engine (RBQE) 340, compiles the data from the Input Source and processes the data based upon predefined parameters for data storage in the database. Applying the rules set for the various sources of data, the RBQE checks the accuracy of the input data and prepares the data for storage.

The Business Rules and Data Processing Manager 350, provides the gateway in which the feedback profiles are administered and displayed remotely, via internet or server, to various search systems and sites.

The Data Output, Content and Symbol Engine 360, enables access to the stored database feedback and other content, and applies the predetermined rules set to display the results of the data in raw form and symbolic, abbreviated form.

The User Profile Manager 370, provides the log in, authentication and validation process for the user community and the administrative community. User data (volunteered information) is organized and stored in the database of User Profiles. The user data can be accessed by permission and can be combined when providing feedback information to various interested parties. The PAMC profile manager works in conjunction with the PAMC Task Master Scheduler and the Business Rules and Data Processing manager to; retrieve, display, search, compare, analyze queries. The system will alert users who have requested notification options based upon predefined parameters that the user has provided.

The PAMC database(s) 380, illustrates one embodiment of the storage of the information. The staging database collects the incoming raw data, the cleansed and categorized database stores the input data in the organized fashion determined by the processing managers. The user profile information managed by the profile manager and stored in the user profile and stored parameters, weightings and values.

Although many other internal and external components, applications, configurations and methods are not shown, those of ordinary skill in the art will appreciate that such components, applications and methods can deployed in a plurality of configurations.

The invention is described in the general context of computer executable instructions. This invention may be implemented with other computer or communication system configurations, including but not inclusive of hand-held devices, microprocessor-based or programmable consumer electronics or other devices. The system may also be implemented in a distributed networked environment where tasks are performed by remote processing devices that are linked through a network via the internet, intranet or other communications network. The program modules may be located in both local and remote computer storage media including memory storage devices.

Figure 4:
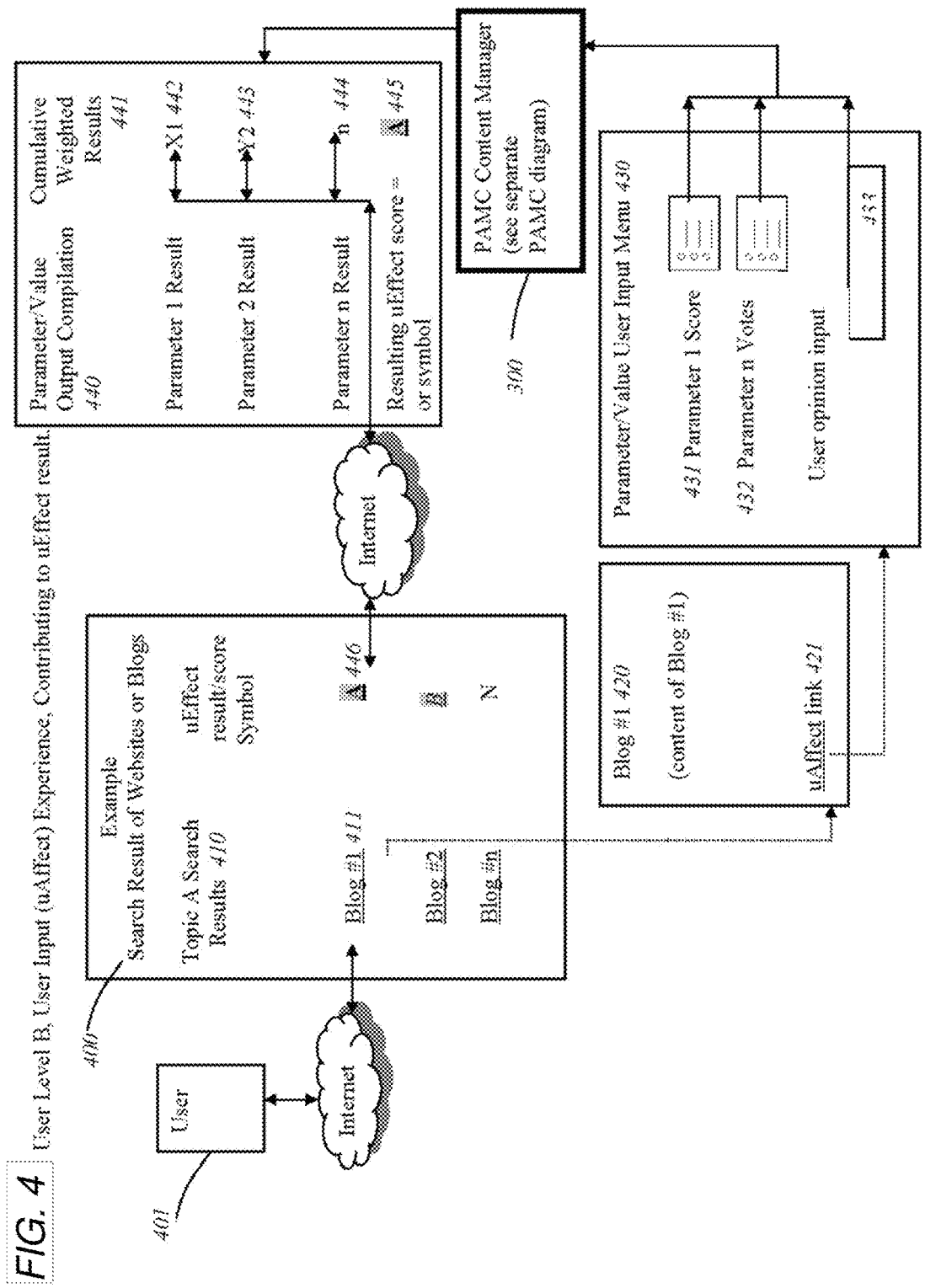
FIG. 4 is an illustration of one embodiment wherein the user, with an access of Level B, inputs data contributing to a (uAffect) Experience and Contributing to uEffect result.

FIG. 4 shows an embodiment, illustrating a user accessing the system data 400. The user is not required to provide any information. Referring now to FIG. 4.1, for this illustration, we can define this method as user access: level 1. The user in this example 401, who has a search query inquiring about new video games 402, may view the third party search engine results 403, (or in other embodiments results from generated directly or in conjunction with the system). In this example, a uEffect resulting symbol or score generated by the PAMC 300 is displayed 404. The output compilation and weighted results that generate the values displayed 404, can be viewed by clicking on the symbol 404 to display the resulting eEffect symbol parameters. The output compilation page 405, will list the individual factors or parameters and results 406, 407, 408, which define the resulting symbol or score 404.

For this example, because the user has not contributed profile and other information, the resulting score doesn't reflect any personal profile information of the searching user. Nor does this level of system access allow for tailored uEffect results wherein the user can weigh and prioritize the parameters that are meaningful and relevant to the user.

FIG. 5, is an illustration of one embodiment wherein the User contributes to the uEffect score and parameter weightings. By clicking on Game #1 (510) the user can access the content of the blog, view the parameters within the system and can suggest a new parameter to evaluate Game #1 (538).

FIG. 6 is an illustration of one embodiment wherein the User Volunteers Profile Information for the Benefit of Obtaining a uEffect Result/Score/Symbol Tailored and Weighted with Other Users With Similar Profiles/Interests/Associations for Purposes of Social Networking and Gathering, Feedback Sharing, and Prediction and Notification of Future Products, Services and Behaviors.

Figure 7:
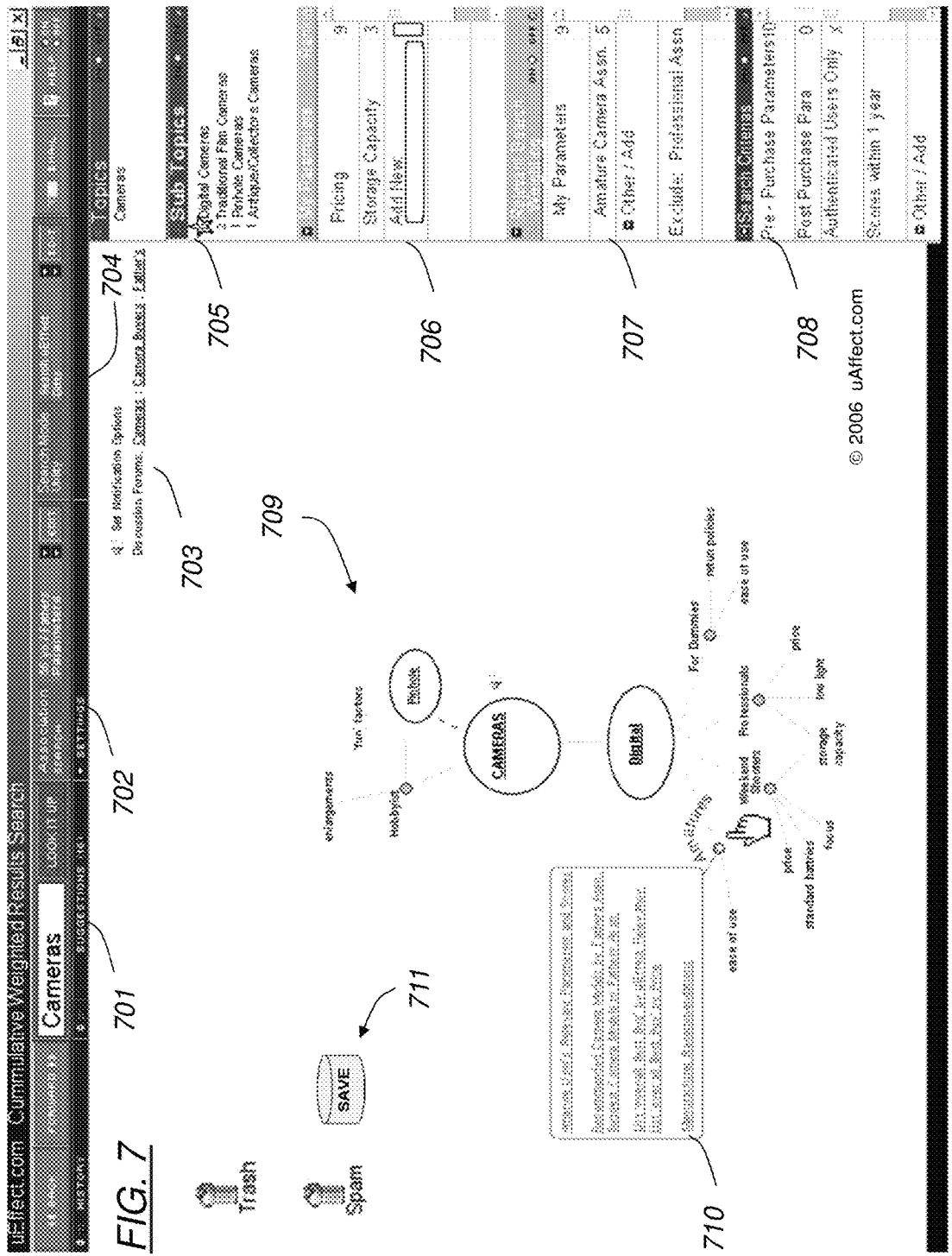
FIG. 7 is an illustration of one embodiment wherein the user utilizes a dash board to search, compare and analyze data via the user group's and the user's weighted parameters.

FIG. 7 is a dash board that illustrates how a user can search the system to compare products, which, in this example, are cameras. There are input parameters such as system suggestions (701), user group association parameters such as 55 year old fathers (702), a utility or a use parameter such as 'gift' (704) and user weighted and defined search parameters defined by the user (705-708). The result is a dynamic graphical interface that illustrates the summary results from the search displaying the various camera associations, user groups and parameters within the user associations and groups (708).

Figure 8:
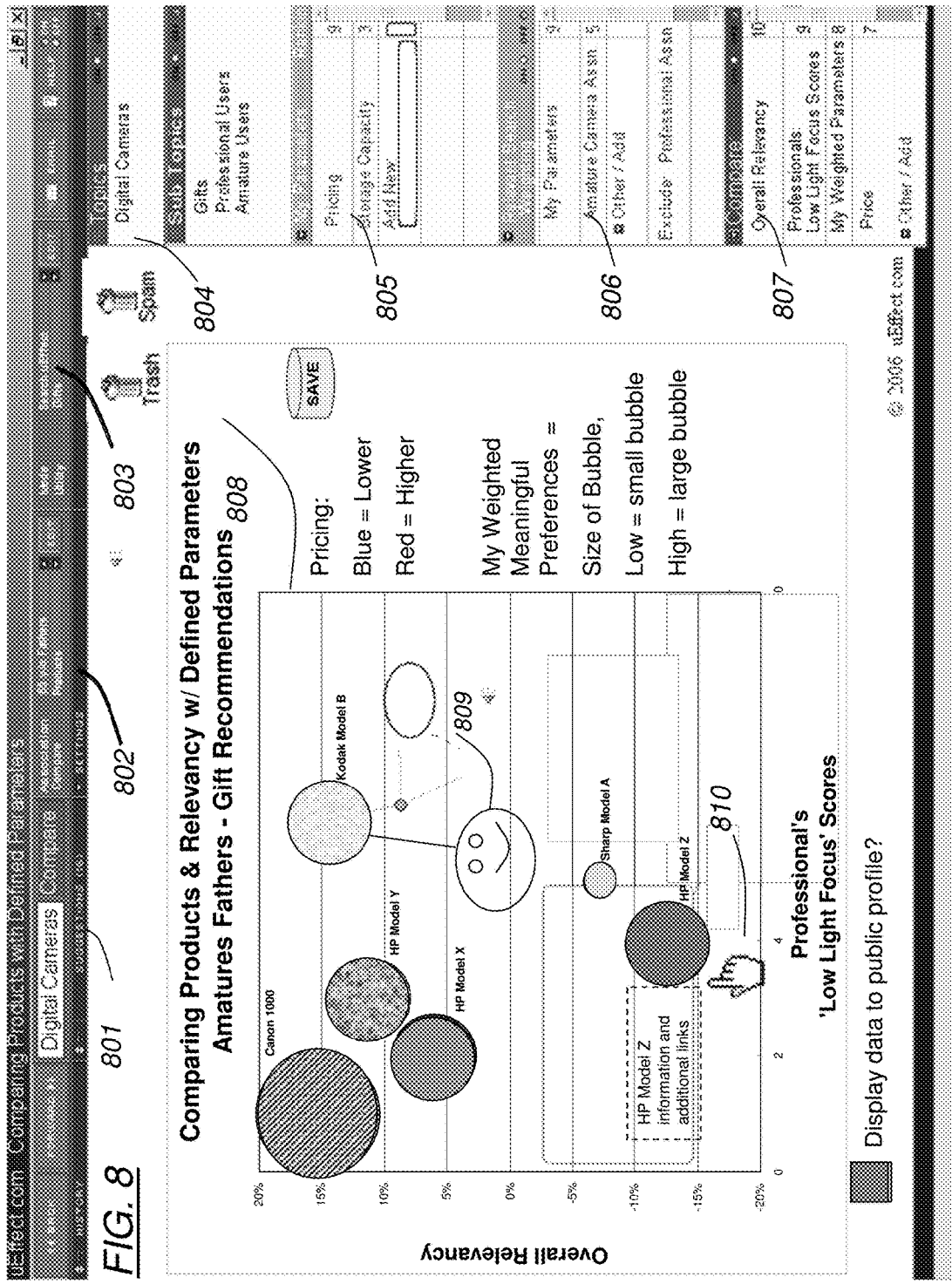
FIG. 8 is an illustration of one embodiment wherein the user utilizes a dash board to compare products that the system recommends based upon weighted relevant search parameters defined by the user.

FIG. 8 is an example of a dash board created by a user to visualize a product comparison based upon the criteria set by the user (801-803) and the weighted parameters defined by the user (804-807). The various parameters are displayed on the graph and exhibit various symbols that highlight the underlining value of the parameters, e.g., the color of the circles, the size of the circles, the placement of the circles and other defined data points (808).

Figure 9:
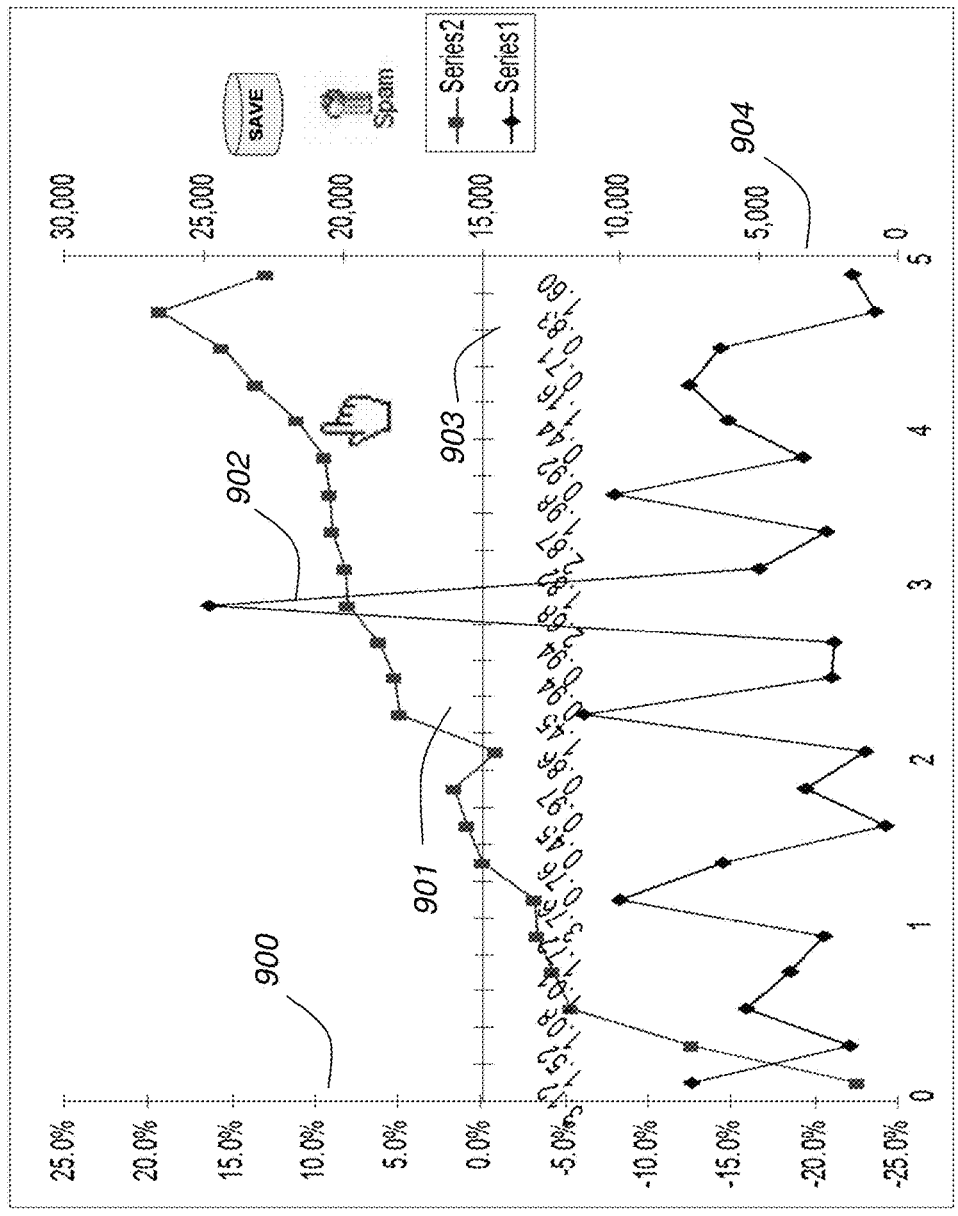
FIG. 9 is an illustration of one embodiment that demonstrates momentum trend analysis (MTA).

FIG. 9 is an illustration of momentum trend analysis wherein parameters can be tracked and visually displayed by inputting parameters, topics and the weightings by specifying certain criteria (900, 904). A momentum quotient (MQ) can be quantified. In one embodiment, this system can predict the momentum trending analysis (MTA) which can predict which small businesses will be successful. One topic, for an example, would be coffee retail establishments, with a sub-topic of independent (non-franchise) stores with several parameters tracked and followed by the suggestion of the user group and the individual users. Parameters can then be isolated for search, trending and prediction. In this example, stores with month-by-month cash flow (increase or decrease) (900, 901) can be charted against average monthly income (904, 902) with a calculated momentum quotient (MQ) displayed on the horizontal line in the middle 903. From the perspective of the 'owner's' user group, parameters that may be more relevant may include monthly sales trending data, coupled with a formula to determine the location effectiveness (parking, location next to a larger retail store, downtown, etc.). However, from the perspective of a banker who loans money to coffee retail stores, the cash flow trending data may be more relevant to the success of the store. Factors, parameters, topics can be evaluated and the cumulative result generates the momentum trending data that can be correlated to the actual performance of the individual stores.

Figure 10:
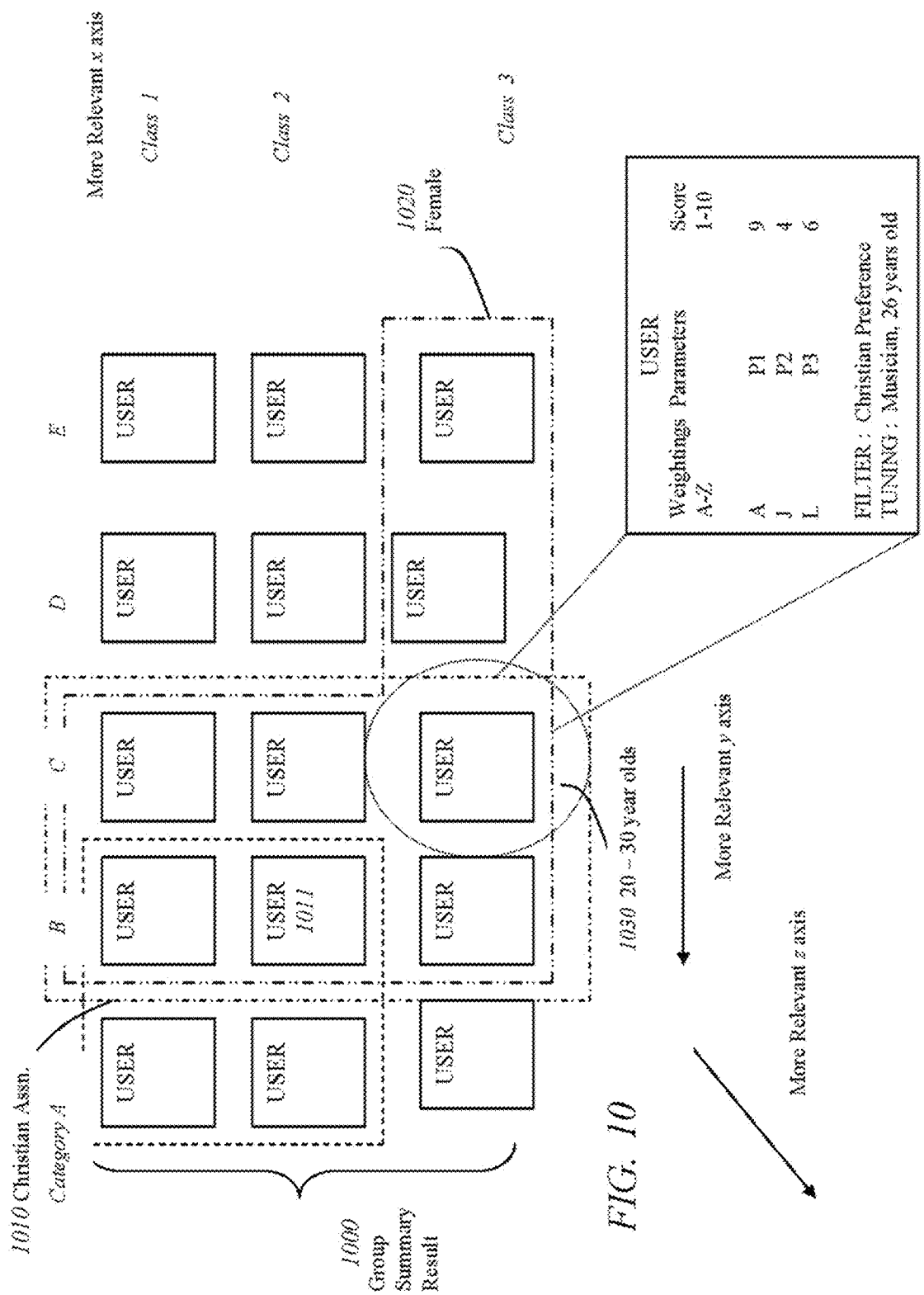
FIG. 10 is an illustration of one embodiment wherein the individual user's weightings, parameters, filters, tunings, and other search criteria are grouped into user group associations (UGA).

FIG. 10 illustrates how users can belong to various groups and associations and how the parameters within each user is weighted and scored to generate a summary result and a more tuned search. For example, a Christian 28 year old female may search for feedback parameters about a particular movie. The system may provide a group summary resulting symbol (1000). The searcher may then filter and tune the search by parameters set by the searcher based upon her own criteria and criteria suggested by the system. Such filter and tuning may include feedback about a particular move with the following user defined parameters as P1, P2 and P3, with certain specific weighting and algorithms with filters including female and Christian user feedback and a further tuning of 20-30 year olds.

The system can then correlate the search request and organize the users into groupings of Christian, Female and 20-30 year olds (1010-1030). The system can further organize by incorporating weightings into classifications and classes and can further organize by placing the users and different axis wherein the closest, left-most, highest users providing (scoring) the most relevant feedback for the searching user.

Figure 11:
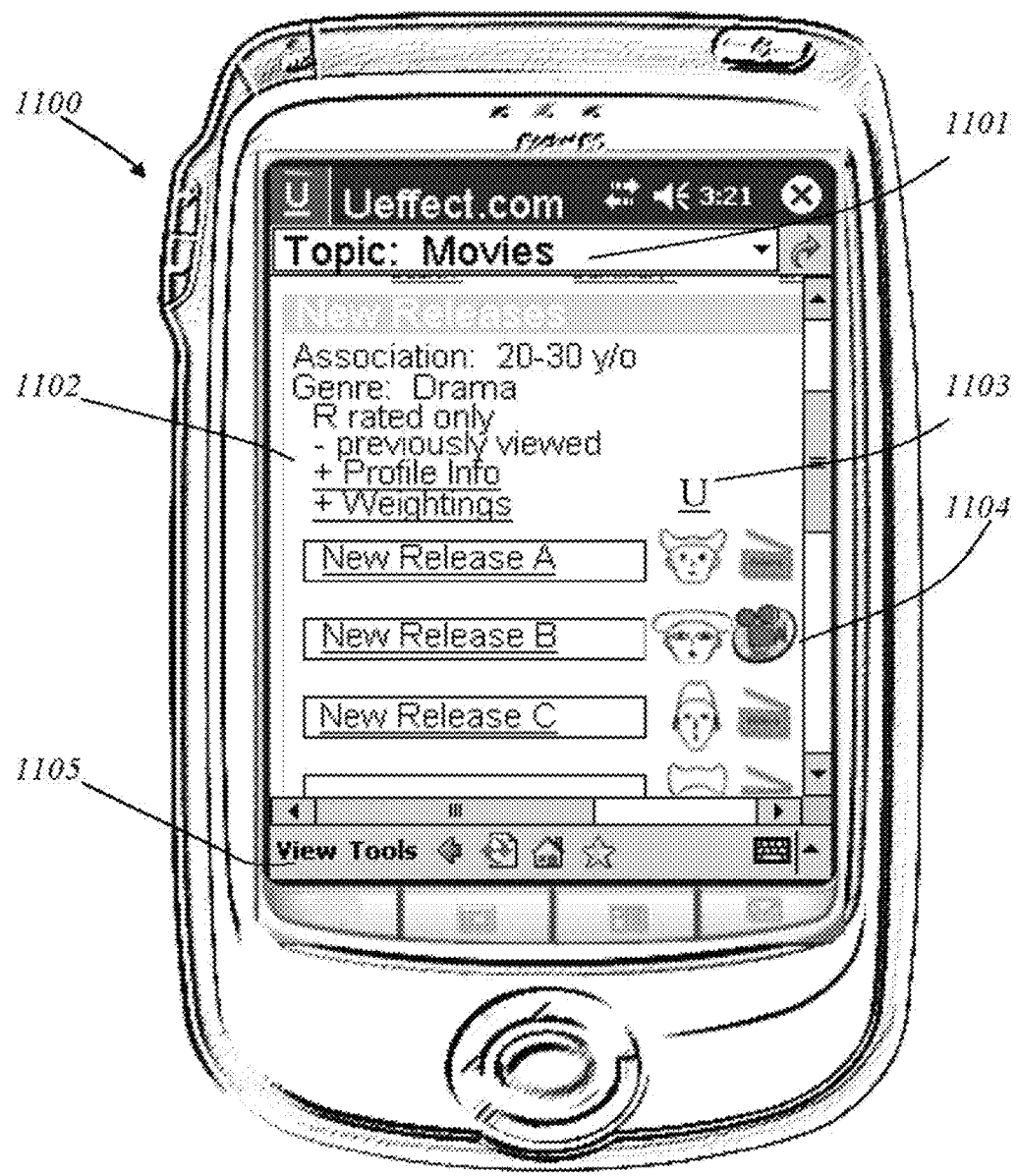
FIG. 11 is an illustration of one embodiment wherein a user accesses the system via a personal communication device to access summary results of suggested and searched movies via user defined parameters and search criteria.

FIG. 11 is an illustration of one embodiment of the system wherein a user has accessed the network via a personal communication device (1100). In this example, the user has previously entered in their profile information, their search parameters, and the weightings of their search parameters and has configured the system to display feedback from a particular user group or a user association, in this example, 20-30-year-old females. This embodiment is a search for recommended movies (1101). The user has a filter of 'previously viewed' movies wherein any of the movies the user has seen will not be displayed (1102). The user has searched the feedback recommendations from the search parameters and criteria for a particular movie grouping, in this example new releases that meet her search criteria. The 'resulting symbol score' is displayed (1103). The individual, dynamic feedback summary scores, (uFECT.com or uEffect.com score or ranking) is displayed as faces. Upon clicking on the symbols, the underlying scores, votes, feedback and other data can be viewed. The symbols next to the uEffect symbols are symbols are links to the content provider's (in this example the movie industry) movie trailers and other 'pushed' information generated and provided by the manufacturer or the author of the movie (1104). Other user defined and system suggested search and comparison tools are available (1105) to help tune the search, compare and analyze functions (SCAF) of the system to make the SCAF more relevant.

Figure 12:
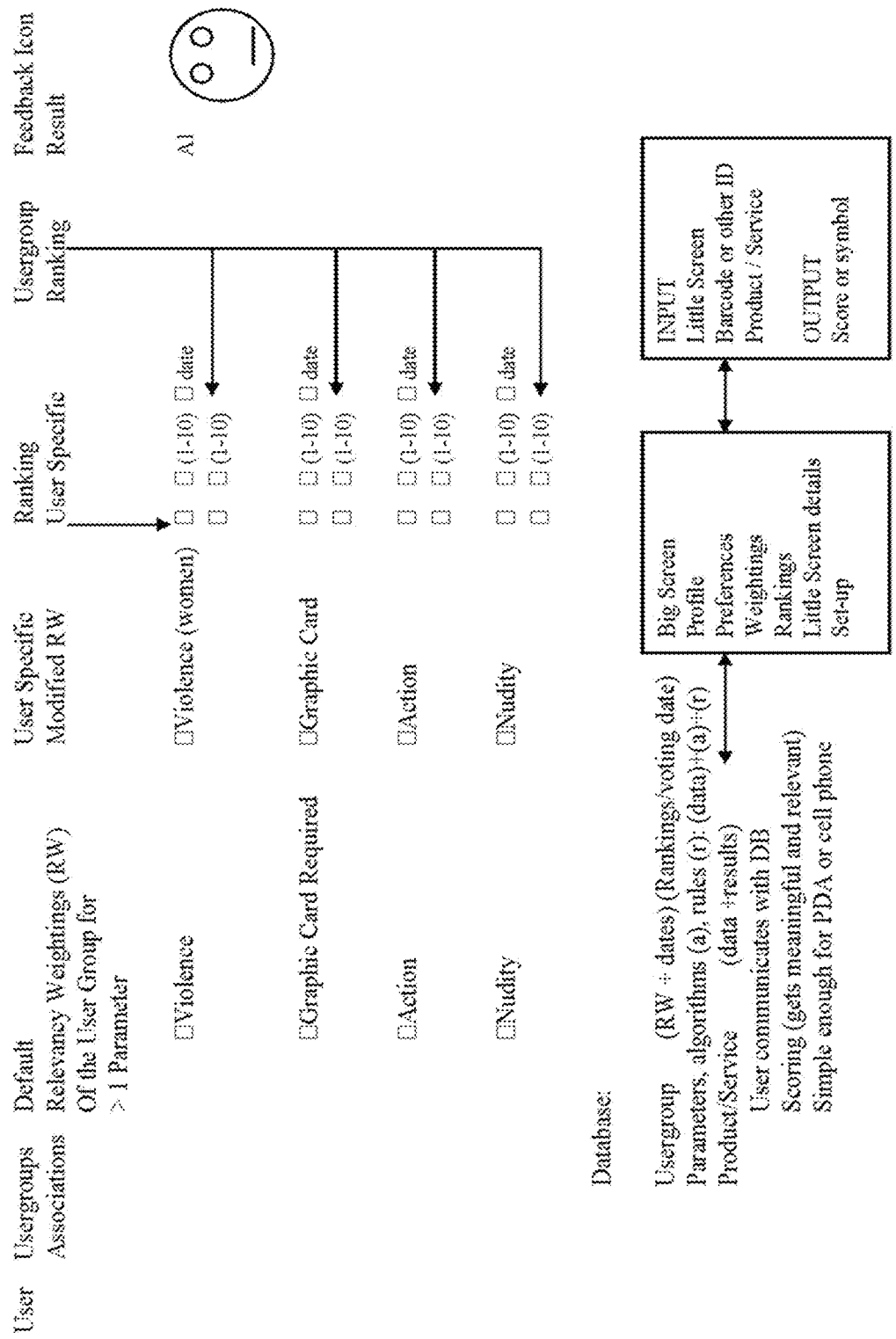
FIG. 12 is an illustration of one embodiment of a data collection and analysis of user parameters generating a summary symbol.

FIG. 12 is another embodiment of the system wherein the usergroups and user associations outline and define the parameters and the relevancy weighting (RW) of the parameters. The data input fields are available to accept user input and feedback to contribute to the feedback icon result.

Figure 13:
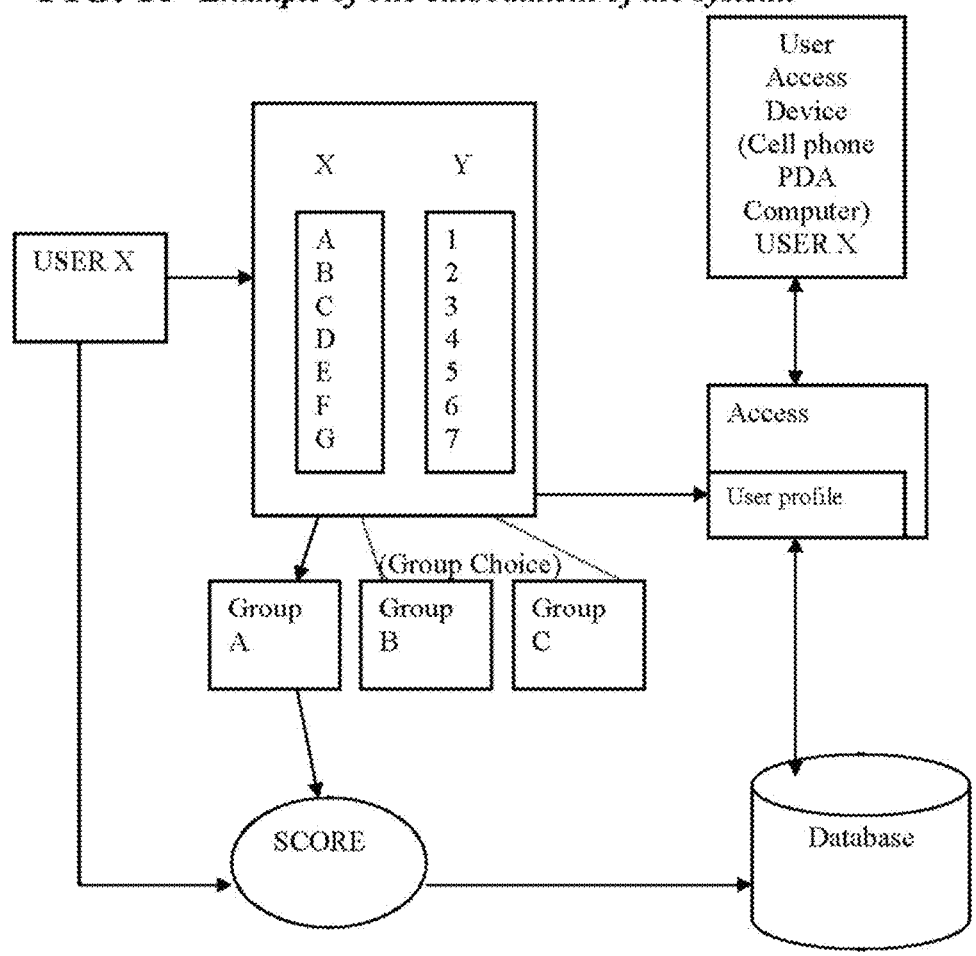
FIG. 13 is an illustration of one embodiment illustrating momentum trends, a three dimensional display of the results in different quadrants, and various elements of user group associations (UGA).

FIG. 13 is an example of one embodiment of the system illustrated as a flow chart. In this example USER X initially accesses the system and inputs data. Data in some instances includes a system suggestion or prediction, in this example a user group association, wherein the user chooses one or more associations as a 'default' parameter. When the USER X then accesses the system via a cell phone, the defaults are stored within the system data base, the defaults become part of the SCAF process wherein the parameters, weightings, filters and tuning mechanisms are employed.

FIG. 14 illustrates in a three dimensional graphical interface the cumulative summary results of the parameters, X, Y, Z, with factors of a, b, c, in combination with stored user feedback and other data (1401-1403, 1404-1408). The system suggestion of a SCAF results in a SCAF resulting positioning placement (RPP) of a point in the graph (1404). 1410 represents user parameters of ranking and date, with a line depicting the purchasing momentum based upon ranking slope and/or purchase slope contributing to a momentum quotient. Users can implement SCAF results utilizing various group members, user groups, group classifications, associations, and other groupings or orderings, with various defined parameters within the groups (1411-1414).

Figure 15:
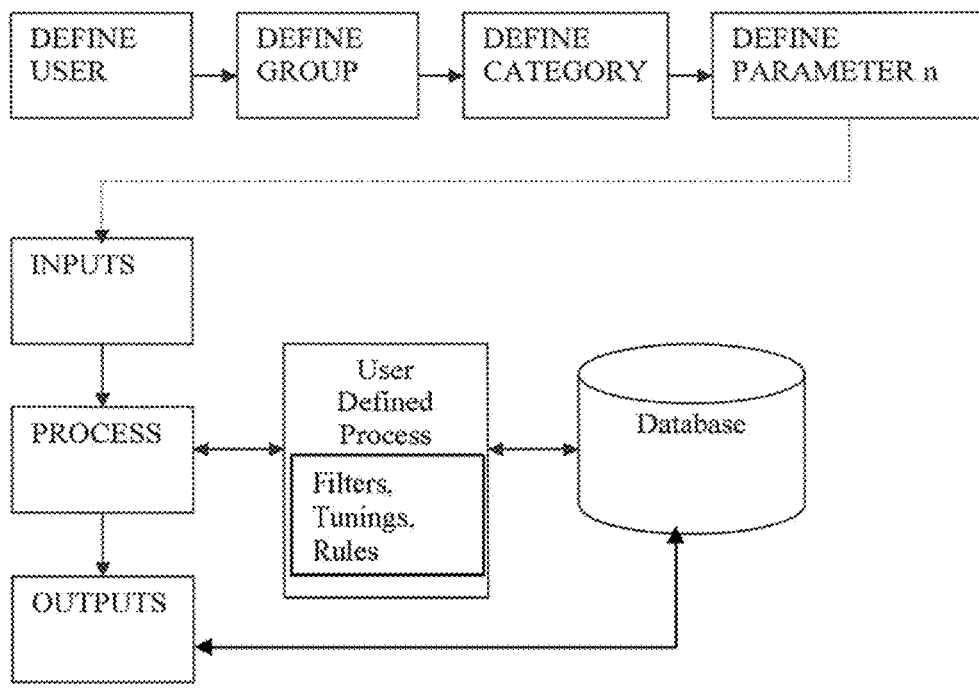
FIG. 15 is an example of one embodiment of the system.

FIG. 15 is a flow chart illustration wherein a user, or a user group, defines groups of users, categories, parameters associated with the groups, user input and profile data (1510), and defines the processes that incorporate the data. The system can also incorporate the searching user defined processes and the database can then generate custom results combining the user group specifications with the rules, algorithms, filtering, tuning and parameter specifications of the user (1500). Topics are elicited and/or suggested.

Figure 16:
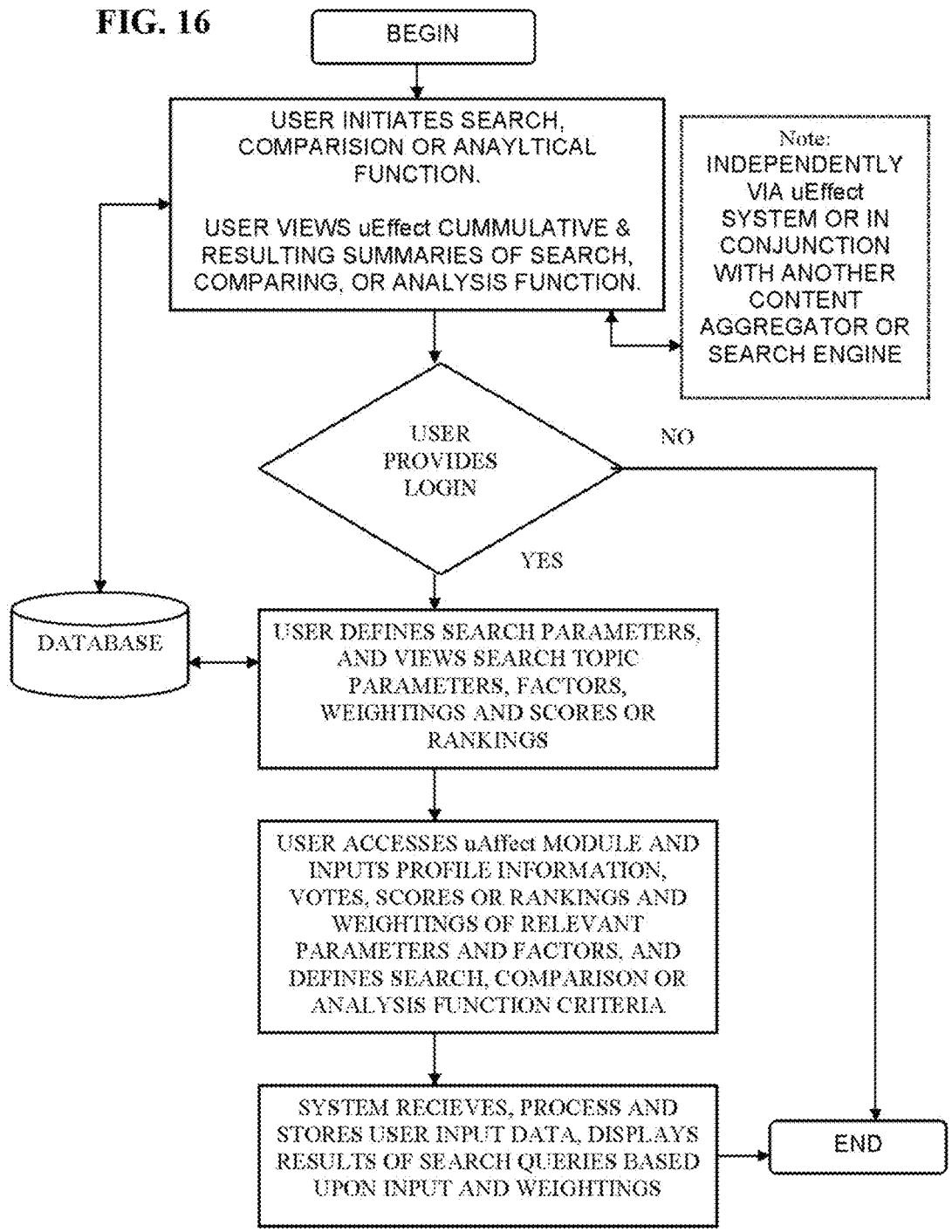
FIG. 16 is an example of one embodiment of the system wherein the user accesses the system.

FIG. 16 is a flow chart illustration of the system. In this example, data from $3^{rd}$ party, external sources is combined with the system data.

Figure 17:
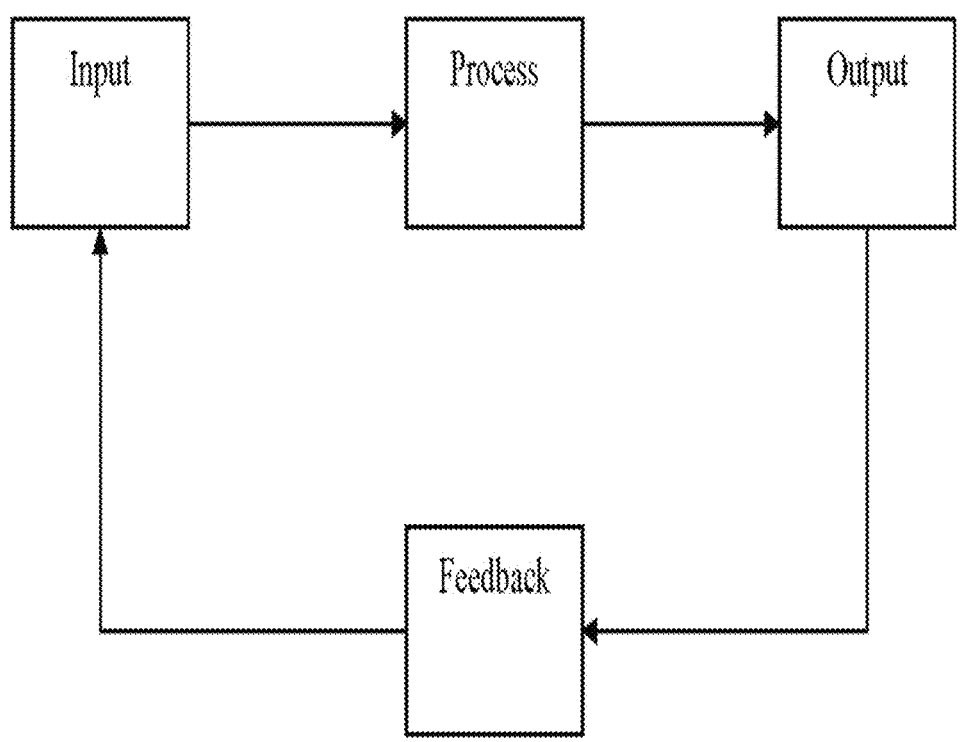
FIG. 17 is an example of one embodiment of the network system overview.

FIG. 17 is a basic system overview that illustrates user input, process, output and a feedback loop.

Figure 18:
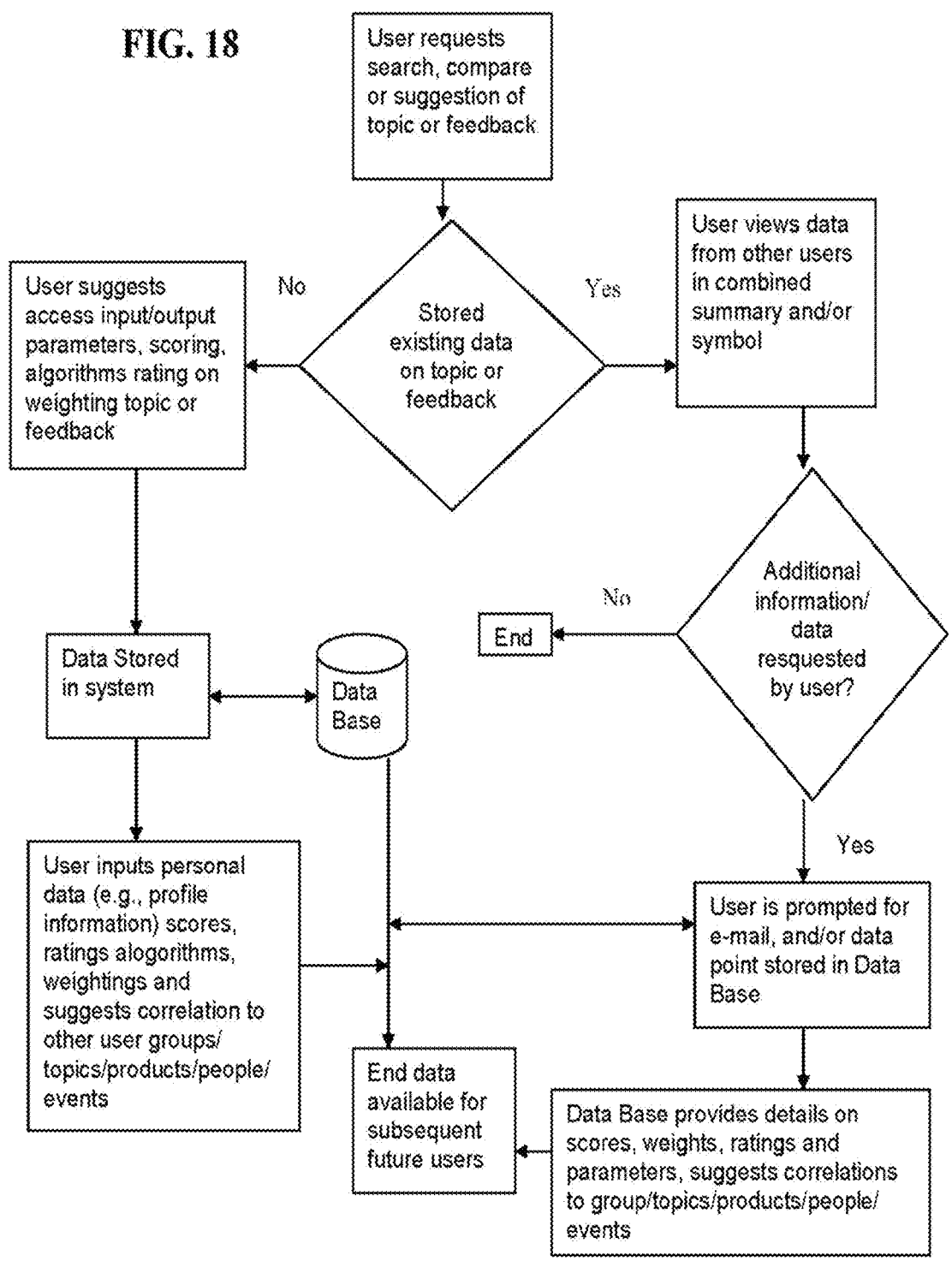
FIG. 18 is one embodiment of a first time user, topic feedback set-up of the system network (e.g., Internet).

FIG. 18 is a flow chart illustration of the system wherein a first-time user inputs data about a topic, product, service, person, place, or event.

Figure 19:
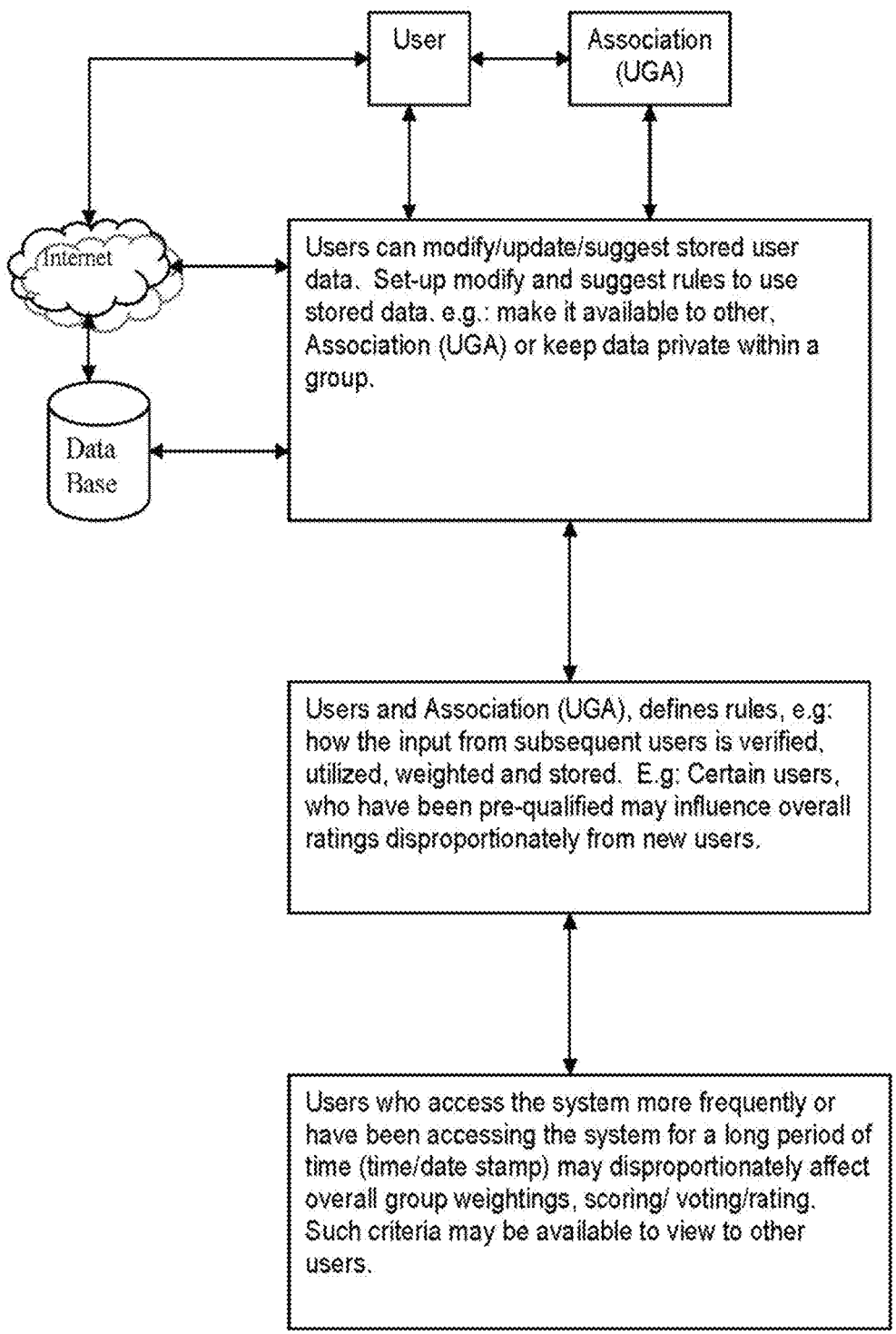
FIG. 19 is one embodiment of an initial user set-up of a user group association.

FIG. 19 is a flow chart illustration of the system wherein a user initiates a user group association, and inputs suggestions that being the process of defining rules and parameters and other processes.

Figure 20:
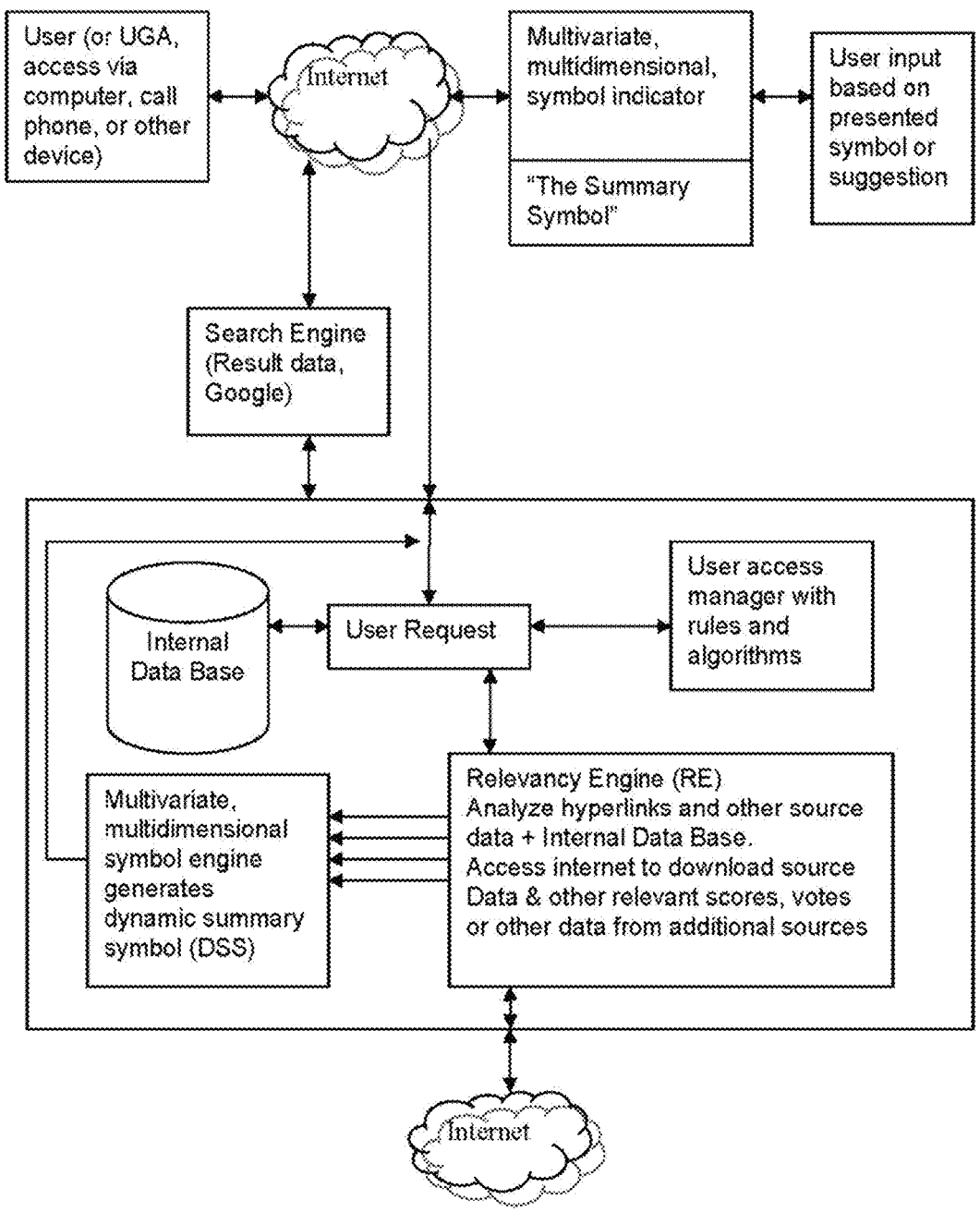
FIG. 20 is one embodiment of generating a summary symbol (SS).

FIG. 20 is a flow chart illustration of the system that incorporates the user data input and processes the information to result in a cumulative summary symbol.

Figure 21:
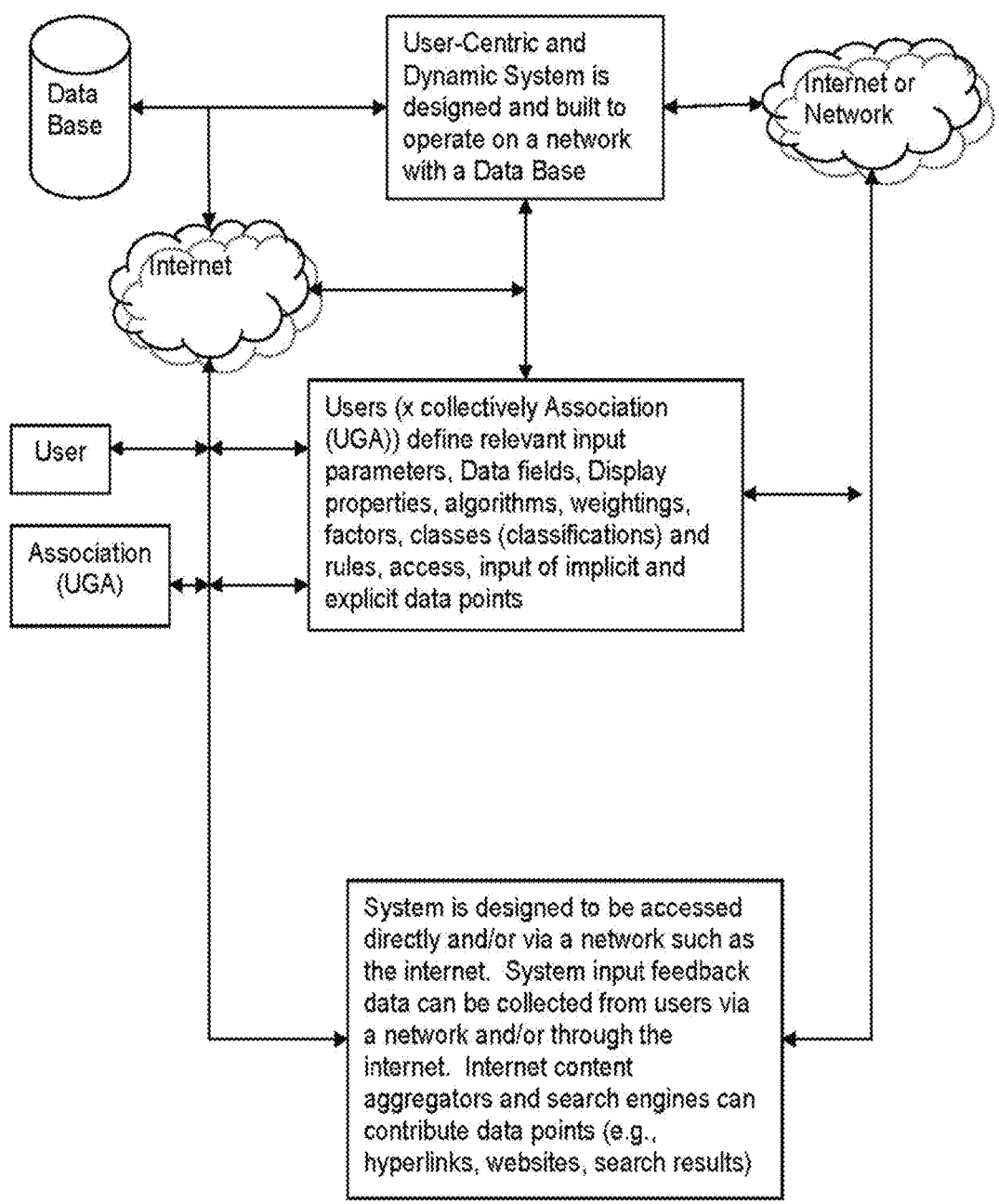
FIG. 21 is one embodiment of a system framework.

FIG. 21 is a flow chart illustration of the system that outlines one embodiment of the system wherein the users and the system access the internet.

Figure 22:
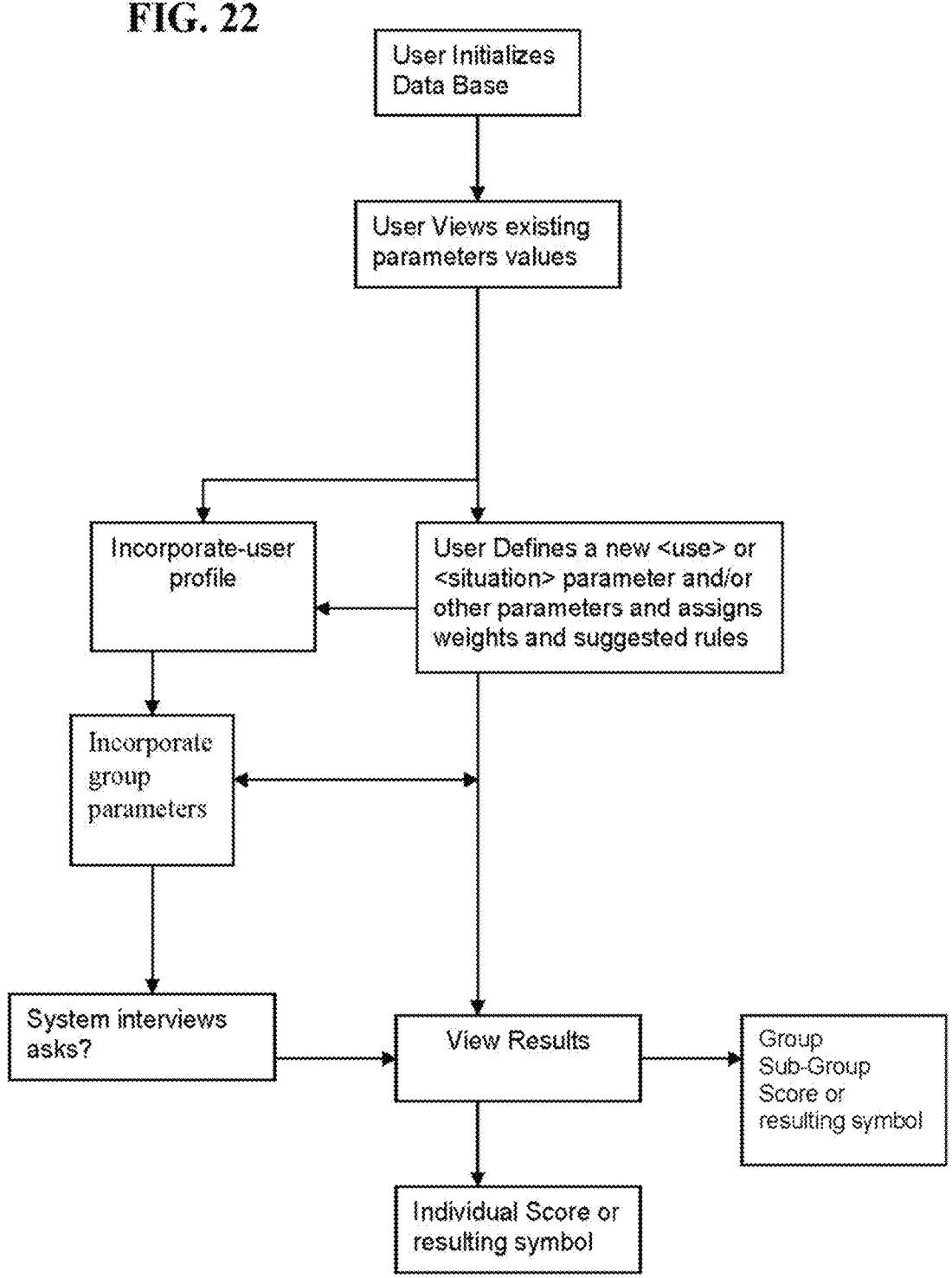
FIG. 22 is one embodiment of a user adding a new parameter.

FIG. 22 is a flow chart illustration of the system enables a user to add a new parameter.

Figure 23:
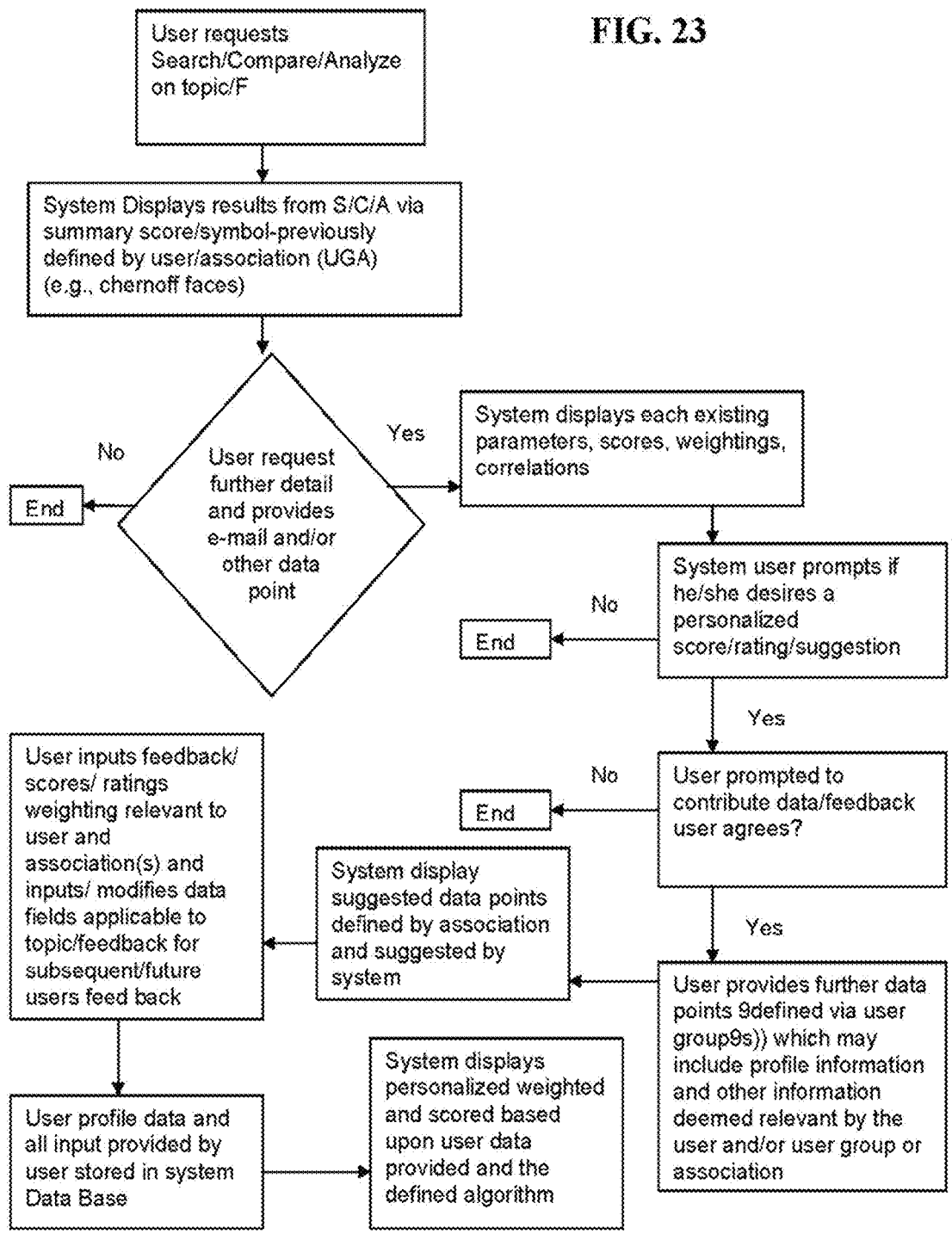
FIG. 23 is one embodiment wherein the user has interaction with the system contributing to data input and feedback.

FIG. 23 is a flow chart illustration of the system that illustrates one embodiment wherein a user interacts with the system network while performing a SCAF.

Figure 24:
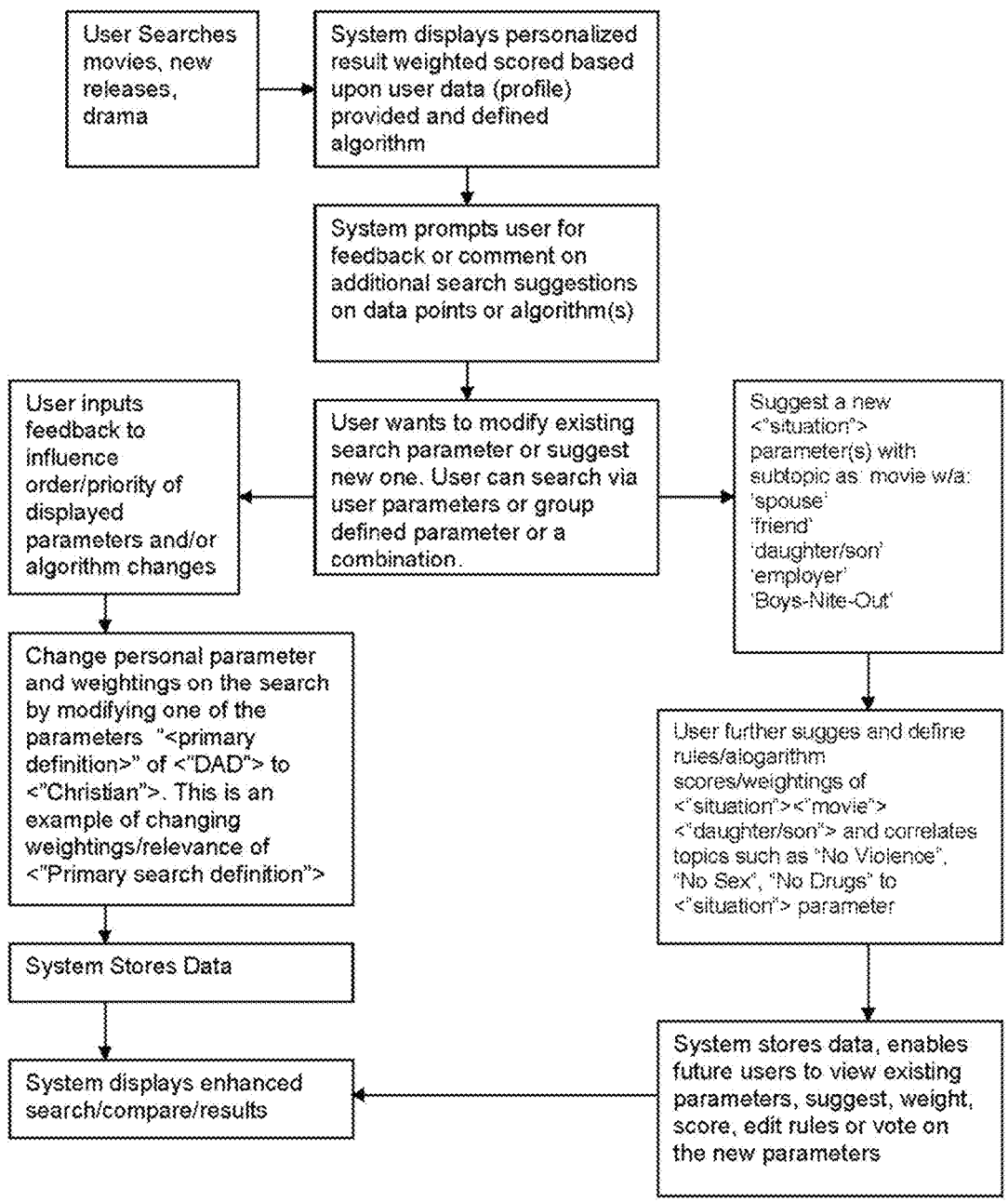
FIG. 24 is one embodiment wherein the user modifies and adds (or "suggests") a search parameter.

FIG. 24 is a flow chart illustration of the system that illustrates one embodiment wherein a user interacts with the system network in creating or suggesting a new search parameter.

FIG. 25 illustrates two embodiments of the system performing a SCAF illustrated by formulas. The second formula includes an added parameter or filter that represents a 'time' or date stamp.

FIG. 26 illustrates two embodiments of the system performing a SCAF illustrated by formulas. The formulas incorporate different group and user defined formulas. The formulas include data from user feedback input and have a specific criteria in which to process the data with the various user (and user group) parameters, weightings, rules, algorithms, filters, and tuning variables.

Examples of Some Embodiments

Several examples and embodiments of the invention are herein described to provide an illustration of the implementing the invention and realizing the results of the unique characteristics of the invention.

One example of the difficulties of obtaining and determining meaningful feedback might be a topic of critical theater reviews. It's a known fact that certain theater critics in major markets such as New York City, wield an inordinately large influence on whether a new production is successful by writing a positive or a negative review and publishing the review in a newspaper, other online media outlets, TV and radio. Some theater critics have admitted that negative reviews are more 'fun' to write, and are more read, remembered and talked about then positive reviews benefiting the author, the branding of the newspaper and advertisers. This highlights an important point, that there are several factors that influence a feedback opinion in ALL areas of content review and validation. Influencing factors include (but are not limited to) economics, politics, business and personal factors (such as keeping a job, or personally knowing a person to benefit or be negatively influenced by a review). 'Supply' generated content described as feedback has influenced many people and industries.

For the above example, the invention would elicit input from users who have seen a particular play. The users would individually input information about this topic (theater, with a sub-topic being the name of the new play) including the parameters that they have deemed relevant for feedback and review. Individual parameters, weightings and scores will be stored along with suggested parameters and weightings for a community or user group as a whole. Community parameters may be general parameters to review such as 'overall rating', 'story line', 'humor', and 'acting talent'. Individual parameters may be 'recommendation for others', 'nudity' and 'language'. The user may suggest to the user group that the new play is most appropriate for a 'use' context such as a 'guy's night out'.

Subsequent user(s) who attend the new play may access the parameters and provide rating or scoring data on the user groups suggested parameters, and may weigh the parameters in a different priority, such as 'story line' being the dominant driving parameter. In addition, the subsequent user may further suggest additional individual parameters such as 'musical talent' and 'extent of the pre-performance expectations having been met after post-performance'.

Still more subsequent users, can access the user group community to view the currently rated parameters and the scores of each parameter with the data displayed as a cumulative summary result. Subsequent users can specify search criteria that might include other user's profile information and weightings of parameters relevant to the searching user. For this example, users who view displayed data are viewing the cumulative summary results of a uEffect score or rating. The user may search using general parameters such as other male theater goers, over the age of 35, who rate the new plays as ones with the highest ranking of most 'humor'. More specific search can result in how a particular new play was rated in general, and then give a priority weighting to how the play was rated by a specific user group such as theater goers over the age of 35, driving down to more detail to compare the rating results of a new play with the ratings of theater goers who are 'casual' theater goers compared with the ratings of the theater goers who represent themselves as 'avid' theater goers. Users that contribute data and feedback contribute to a uAffect score or rating, generating a Universal Affect Result (UAR).

Another example is music—it's been well documented that certain producers and record companies have engaged in a practice called 'payola' where certain new song releases get air play based upon the financial kickbacks that the producers offer the radio station programmers. This is but one example that illustrates an artificial endorsement where by the general public is sometimes unaware of the relevant nature of the content delivered.

The invention described herein is a system and method for improving the method of gathering relevant feedback from meaningful sources that include the users and user groups and communities (UGC) that surround the topic. The method includes a tool to identify contributing users and the profiles and behaviors of each user. Users identify the parameters that determine what information is considered relevant and meaningful to him or her. The user then can prioritize, categorize, and assign a weighting matrix to the parameters and factors that make up the meaningful feedback surrounding a particular topic. User profile information, user feedback input values and parameter weightings are stored in a database.

A 45 year old male can search the topic of new music, and weigh and prioritize the preferences identified by the 18 to 25 year old users. By excluding his own user group or association (in this example "over 40 year old males", the searching party can identify the parameters, weightings and ratings that the 18 to 25 year old association of users has defined as relevant, and further search what new music is arriving on the market that has been evaluated as more relevant or positive. The searching party could then further search by more heavily weighing the feedback from guitar player/musicians who are listening to new music. A mechanism within the apparatus provides a forum that suggests other users with similar parameters and/or weightings, and enables the user to contact (at times anonymously) other users who have a particular profile and has posted similar weightings and parameters on certain topics. In this example, users of similar profiles may belong to a multitude of associations, including 'age group', 'male' or 'female', 'new music enthusiasts', 'country-rock genre' primary, 'folk genre secondary, 'armature music industry purveyors', 'electric-guitar players'.

Users further enhance the feedback matrix by defining rules and algorithms, and initiating, prioritizing, categorizing and assigning weighting values that define the parameters and factors for the UGC as a whole regarding a topic. This illustrates how the system manages collecting, organizing, managing and weighing the relevant factors on individual users and the overall parameters of the user group using a user-centric, predetermined formula to generate a cumulative summary, score or result. Such a technique in some embodiments is similar in nature to the Delphi technique.

In some instances, gathering input information when initially defining parameters to benefit the community or group as a whole, the process may include such tools as the Delphi technique. The Delphi technique is a method for obtaining forecasts from a panel of independent experts over two or more rounds. Experts are asked to predict trends, quantities or other data. After each round, an administrator provides an anonymous summary of the experts' forecasts and their reasons for them. When experts' forecasts have changed little between rounds, the process is stopped and the final round forecasts are combined by averaging. Delphi is based on well-researched principles and provides forecasts that are more accurate than those from unstructured groups (Rowe and Wright 1999, Rowe and Wright 2001). Such a technique can be implemented in the invention with the 'administrators' defined as a user or a group or community of users.

Generating a score that more effectively reflects the relevancy of the content is predetermined by the user group and can be summarized in a symbol that reflects multivariate parameters and values. A resulting symbol is generated by the system and is configured to best serve the user group in an easily recognized fashion whether accessing the data from a computer, mobile phone or other communication device. Such a configuration may take the form of a line-association and/or a bubble graph that represents several, multivariate, weighted variables according to the underlying values or scores.

Using any communications device that can access the internet, users can at any time log on to the system and have displayed the resulting symbol and have interactive system access to the details that determine the resulting symbol. By clicking through on the symbol, the user can view the determining parameters that make up the result, and the cumulative values assigned to each of the parameters. Symbols or results can be displayed in a simple format in one embodiment for cell phones wherein only the space of one or two digits is used.

For example, if the output is a symbol in the form of a capital letter 'A', and multivariate parameters and scores can be identified using different display options, then an underlined '<u>A</u>' may represent the cumulative search summary result of the most relevant feedback from the perspective of the user group as whole. The color of the digit 'A' may represent cumulative search summary result (CSSR) of the most relevant feedback from the perspective of the defined and weighted parameters set by the searching user with red being most relevant, blue being the least relevant. Other display options that may represent additional data in this example is an italic or bold font, the background color of the digit, and other audio and visual adaptations of display. Other types of multivariate symbols that might be applicable for a cumulative, weighted summary result (CWSR) display on a PDA or cell phone include the sunflower plots and the Chernoff Faces. Chernoff faces display multivariate data in the shape of a human face. The individual parts, such as eyes, ears, mouth and nose represent values of the variables by their shape, size, placement and orientation. The idea behind using faces is that humans easily recognize faces and notice small changes without difficulty. Chernoff faces handle each variable differently. Because the features of the faces vary in perceived importance, the way in which variables are mapped to the features should be carefully chosen (Herman Chernoff (1973). "Using faces to represent points in k-dimensional space graphically". *Journal of the American Statistical Association* 68 (342): 361-368.)

Online user community example: One illustrative example involves the field of new product launches. The challenge in this illustration is specific to a 28 year-old female video game player. When a new software video game is released there is a frenzy of people that provide information and feedback to review the game. However, the reviews offered and posted by people, communities and businesses are often influenced by several factors, not the least of which can be economical, political, personal, business interests and more. In this embodiment, a video game manufacturer may target market most new video game products to audiences that include the 14 to 28 year old males. This invention helps this female video game player to best determine if this specific release matches her preferences and would merit purchasing over other video game options. The female gamer can view general scores, ratings and feedback from various user groups or data collectively, but the female gamer would benefit most to hear or read feedback from individual users that better match her profile and her defined and weighted parameters of relevant feedback or reviews. Examples may include feedback from other 28 to 30 year-old females who enjoy the same or similar types of video games, and excluding feedback from other user groups and associations such as males under the age of 28. Such feedback is welcomed as more meaningful and relevant information then from a male magazine critic or blogger who may be a 21 years old.

The invention enables the CSSR and CWSR symbol(s) to be active dynamic link to the network. Consequently, in some embodiments, the CSSR and CWSR symbol displays elicits and receives information. In one embodiment, the CSSR and CWSR symbol is a real-time, interactive link via the internet (e.g., an internet enabled cell phone or PDA).

There are a number of searching tools available to such a gamer looking for relevant information, but the sheer amount of feedback and information is often times overwhelming. There may be a list of blogs for example that are displayed from a search result. But which blog is more relevant to the female gamers group. Currently 'relevant' content is rated on just a couple of factors that include factors such as the number of downloads or visitors to a site/blog with some examples of consumer or searching behaviors are tracked and influence a result based upon criteria defined by the website author, content aggregator or search engine. However, these numbers are often skewed by using several tactics including hiring marketing promoters who hire people to artificially inflate these factors by clicking through or downloading content for no other reason but to generate activity that is then artificially reflected in the 'relevancy' of the ratings.

The invention is a system that is described herein, providing a method where feedback is gathered from other users (to further illustrate the example above, other female games who are 28 years of age). The feedback generated and collected by the other gamers is rated and scored based upon parameters that have been previously determined, by an association of users (in this example a user group of 28 year-old female gamers), to be meaningful and important. This data is then enhanced by the profile information offered by the individual users and stored in a database. One example of a parameter within this topic may be 'nudity', a parameter that may have a different relevance priority to 28 year old female gamers when compared to 18 year old male gamers as a group. There may be sub-topics associated to nudity such as male nudity, female nudity, sexual acts between nude males and nude females, violence associated with nudity and others sub-topics or factors defined by the user or the user group.

The feedback values, or scores, from the various factors within a topic are solicited from the individual users. Feedback values about the relevance priority of the individual parameters are solicited from the individual users. This data is then combined with the profile information from the female, 28 year-old user group, is then organized based upon the previously determined rules, matrix and factors, and then is displayed via a number, symbol or other easily recognizable marker that also can be determined by the user, user group, or the association as a whole. This marker is then available for display on a website and is available as a software code script for downloads and display on other personal computers, websites, web pages, blogs, search result engines and other content aggregators media outlets. The notification feature of the system will enable the 28 year-old female gamer to be notified of feedback, or changes to feedback, based upon the rules provided by her previously. In this example, one rule set may include a notification if there is a new product release that receives positive feedback that meets her requirements and the requirements of the female gaming user group or community. Notification may take the form of an e-mail or text message on her cell phone (or other preferred notification option defined by her) of the status of the rating and/or the status of a resulting symbol. The notification script can be downloaded onto a personal computer or other communication device, or it can be hosted within the system and network.

Offline user community example: An example of an offline topic (or a non-internet or web-driven) example might be live comedy feedback and content reviews. Take for example a business traveler on the road who will be spending a couple of days in Chicago. This traveler enjoys live stand-up comedy, but is adverse to profanity used by comics. The system described herein will have a portal assessable via cell phone or other communication or input device that displays feedback about comedians and their routines. The traveler will be able to view and access feedback generated by his predefined parameters to determine which comedian with performances in Chicago may be more appropriate for the traveler. Continued searching within the system incorporated with this invention would further provide feedback to the traveler, from other users, as to the appropriateness of a specific comedy routine for a particular user, in this example a 'use' or 'utility' mode, may be defined as a guest (romantic date) or employer of the traveler to attend the comedy routine with. Based upon feedback and content gathered from others in his user group, the traveler may feel comfortable to invite a co-worker or a date to the comedy routine. The content will have the resulting summary symbol, and will also have access to the profanity factor values that are easily displayed on a web enabled cell phone screen.

Users can provide and input feedback on each of the factors within a topic and can also input and create additional factors within a topic. In this example, the business traveler may access the system, and input an additional factor within the 'comic routines' topic, and for this example the traveler enters in a 'use' or 'purpose' parameter, creating a different factor for other users to be aware of, and for other users to have the opportunity to provide feedback values. The traveler may create sub-topics to include: 'purpose: guy's night out', 'purpose: first dates', 'purpose: out with employer', 'purpose: out with son/daughter', 'purpose: date with wife'. After attending the comic routine, the traveler may provide a high scoring, weighting or value to the 'purpose: guys night out' because the routine included funny jokes with sexual innuendoes that guys enjoyed, but may provide a low scoring to the factor of 'purpose: out with son/daughter', and 'purpose: out with employer'.

The system and method enables the users to benefit from the stored user profile information of the individual users and the user groups and communities as a whole with the ability for a user to change their user profile to benefit subsequent searches by the user and for the benefit of predictability tools. In one embodiment, a 45 year-old male may not be interested in the new movie reviews that other 45 year-old males are more inclined to provide feedback scores on. Instead, while preferring action movies with a particular young actress that typically attracts a younger move going audience, the 45 year-old user may tune his search the cumulative results of movie reviews from the younger 20 to 25 year-old group, with a sub-topic of a particular actress, with another sub-topic to further tune the result to the name of the actress.

To further this example, the 45 year-old user finds the feedback from the younger 20 to 25 year-old age group to be more meaningful then what the 45 year-old age group provides. If however, the 45 year-old user has a religious experience and no longer is interested in the feedback reviews from the 20 to 25 year-old movie goers, he can change his personal profile and weightings to reflect his religious aspirations and change his search queries to reflect this change. The user may decide to search for new movie releases that move goers in the 30 to 40 year-old group who prefer family orientated, and religious themed movies that have provided positive feedback. The user would also have the ability to incorporate, with defined parameters and weightings, in his searching, comparing (and contrasting), and analyzing feedback with the input and factors of another user group or association such as a family religious group.

To further tune and enhance the relevancy of a search result, the user (or a UGA as a collective) can change the matrix and the algorithm of the values assigned to the parameters and topics and how the values are then reflected in a CSSR or CWSR.

Utilizing the predictability tools, the system and method may generate search results and notification text messages to the user that the system may recommend based upon the user profiles and parameters that the user specifies. Correlating user profile and feedback information data in this example is then organized to provide other recommendations that the user may benefit from. In this example, the 45 year-old user, after changing his personal profile values for 'religion', may search or be automatically notified of new music CDs released by Christian artists that have received favorable reviews from both the 30 to 40 year-old group and the 45 year-old group and is recommended by the family religious group.

A further enhancement of searching for meaningful feedback would be the same 45 year-old movie goer searching for suggested movies by other 40 to 50 year-old users who recommend new movie releases for a specific occasion. For example, new releases that would be appropriate for first dates, taking a son or daughter out, or a 'guy's night out' type of movie based upon the predetermined parameters deemed meaningful and relevant to the 45 year-old movie purveyor and the relevant parameters deemed meaningful from the user group or association of 40 to 50 year old movie goers.

To further highlight the unique aspects of this invention specific to product searching and reviewing, the user can specify search characteristics to include parameters that the user deems meaningful for product searches. To initiate a search for cameras, the user would bring up a dashboard like input screen, see FIG. 7, the uEffect.com cumulative weighted results search page (CWRS). The input topic, parameters and factors would be inputted in this embodiment as follows;

The topic is inputted at 701, and the search function 'look it up' is selected.

The association the user belongs to and the searching function is the parameters in 702. Editing capabilities exist to change the data input profile. Note that in this example, the searching user is not comparing products, see FIG. 8, but searching relevant feedback information about parameters identified by other users and user groups as relevant.

Options to ask questions, and or elicit feedback from other users with similar profiles or other predefined parameters inputted by the user can be found with the function items in 703.

704 identifies the search mode and a utility function, for this example 'gifts' is inputted. Search results will tailor the results for the user based upon collected information from other users and user groups about the relevant parameters involved in the topic of cameras, for the "utility" of a "gift".

705 represents the resulting sub-topics that the system suggests and predicts as meaningful and relevant and is displayed with links to the underlying information that formulates the suggestion.

706 is a data input and weightings for the 'My Parameters' function of the invention. Drop-down menus provide historical parameters that the user has used in the past and the system then also suggests and predicts parameters that may be relevant based upon previous searches from this user and other users with similar profiles who belong to a similar user group or association. In this example the user group may have weighted the parameter of storage capacity as a more relevant factor in considering a purchasing decision.

In this example, 706 pricing is weighted as a '9' on a scale of 1 to 10 with 10 being the most relevant. Storage capacity is a meaningful component of the search and is weighted as a '3'. New parameters can be entered and weighted.

707 formulates other user defined search criteria. Drop-down menus enable the user to easily identify relevant search criteria with help from the system and apparatus. The system suggests and predicts parameters based upon several factors, previously defined by the user or the user group, from information stored in the database. In this example, 'My Parameters' are rated as a '9' in a scale from 1 to 10, with 10 being the most relevant. Other influencing search filter criteria includes the 'Amateur Camera Assn.' feedback and input and is weighted as a '3' by the user. The user has the capability to exclude specific input data or parameters and in this example, the data gathered by the 'Professional Camera User' association is omitted.

708 Profile and additional search criteria can by configured by the user. In this example, 'Pre-Purchase Parameters' are highly weighted as a '10', 'Post Purchase' parameters are omitted with a '0' weighting, the search is optimized and filtered to include only users who have been authenticated by the system (authentication includes different levels of user data access and permissions based upon criteria that the user commits to upon the varying levels of authentication). This filter then will only include the feedback data from the users who have been authenticated by the system as meeting and committing to certain levels of participation with the uEffect/uAffect system. A time element is further added to tune the search in 708, by searching only feedback has been provided within 1 year.

709 represents a tailored, customized and weighted search result from the parameters and definitions supplied by the user. In this example, the user has opted to have the results displayed with a graphical line and object representation. Users can opt to view data in a system prediction and suggested format or the user can define in their profile a specific representation style, graph, symbol, audio attributes and other embodiments, see FIG. 8 for a bubble graph option. In 709, the size of the circles represent the output relevancy of the topics and parameters. Other weighted attributes are colors, font size, sounds, font styles, line types (dotted or solid) and sizes and other visual aids.

The resulting 709 search illustrates that there are sub-topics relates to cameras, including pinhole cameras and digital cameras. Clearly, the digital camera results are more relevant than the smaller circle that represents pinhole cameras results.

709 also represents the relevant associations that have been formed by other users and are affiliated with cameras including 'Hobbyists', 'Amateurs', 'Weekend Shooters', 'Dummies' and 'Professionals'. Parameters have been identified within each of the associated groups, and some parameters, such as 'price' are linked as relevant to more then one association of user groups. 'Amateurs' is highlighted for the searching user and 'ease of use' is a relevant factor that is identified as important to this user group, just as 'focus' is identified by 'Weekend Shooters' as a factor to be considered relevant along with 'standard battery' options. The users identified as having little or no knowledge of cameras and have feedback relevant for future users attempting to gift a camera to someone have identified 'return policies' as a meaningful parameter.

When the searching user moves the cursor on his screen to the 'Amateurs' circle, a pop-up window appears with links to other relevant information that the system has suggested and predicted to be meaningful to the searching user. In this example, the following links are provided in 710; Amateur Users Relevant Parameters and Scores, Recommended Cameras Models by Father's Association, Suggest Camera Models to Father's Association, List 'over-all Best Buy' by uEffect relevancy, List 'over-all Best Buy' by Price, and Manufacturer Recommendations. Each of these links represent links to collected and stored information from other user groups that have identified, defined and weighted relevant parameters based upon their respective backgrounds. Users, in this example, are identified as individuals as well as industry members as 'Manufacturers'.

In this embodiment, the 'manufacturers' link is connected to data about the cameras that have been authorized by the manufacturer of each of the cameras. This data includes the details of the camera specifications and also includes the marketing and sales information the manufacturer decides to provide. The source data can be hosted on the manufacturer's website or database or can be uploaded to the uEffect system and database by the manufacturer or by a uEffect user or automatically by the uEffect system.

For this illustration, the multiple editing functions also include an easy user interactive interface that enables the user to tune and optimize a search result. 711 is a list of icons that enable the user to organize the resulting items. In this example the drag and drop features enable the resulting search items to be placed into a trashcan, a spam "can" or similar folder, or a clipboard to save items.

For example, if a 45 year-old is trying to find relevant feedback about new digital cameras on a commercial retail website, and the website employs the system and method contained in this invention, the 45 year-old user can specify searchable parameters important from his perspective. The user can search for meaningful feedback that entails searching for cameras that have easy-to-use navigation of the onboard menu options—from the perspective of users whose profiles indicate that they are novice camera users—and search results that address the auto focusing feedback from users who indicate that they are professional users in their profiles.

Advertising feedback for businesses example: The commercial component module includes the ability for advertisers to gather feedback from individuals associated with the System. In the example above of the female gamer, the system will provide an opportunity for feedback of a particular ad or advertising campaign. The feedback will come complete with the user profile and other such information that is voluntarily offered (the female gamer could vote or rate an ad based upon predefined parameters and the advertiser would be able to garner the feedback as well as the user profile with or without information including male/female, age, location and more).

If the advertiser of a new video game release displays a prominent ad online at a particular website, there would be included at the bottom of the ad a link to the system feedback module (SFM). If the 28 year old female gamer came upon the ad, and wished to provide feedback to the advertiser, she would click on the link, and rate or vote on the parameters set by the advertiser (example parameters might be: rate the effectiveness of this ad over other video game ads, based upon the ad, would you recommend this video to a friend?). The option will exist for the female gamer (or the UGA) to suggest and create a parameter of her own, potentially including a rating on the effectiveness of violent or sexually explicit graphics. If voluntarily offered by the female gamer, the advertiser would have access to the feedback provided by the female gamer as well as background information embedded in the female gamer's system profile including such information as age, location user group affiliations, previous behaviors and scoring patterns, and other user (or UGA) data.

Commercial feedback example: Another application of the System would be for consumers to rate businesses (products and/or services) and the reverse: businesses rating or scoring consumers (e.g., BetterConsumerBureau.com).

One example would be for the system database to gather and collect rating, voting, scoring on relevant information collected by businesses/consumers on their experiences with their respective consumers/businesses. A 'credit score', a 'behavioral rating' (BR) score, or a combined 'credit and behavioral score' (CBS) is created with previously determined parameters defined by the users (consumers/businesses) with the results posted for access to other users. The user community would then have the opportunity to provide feedback on their experiences with the particular consumer/business. Users in this example may have different verification levels that enable the user to access and contribute data at different levels, depending up their respective verification level. A combined and weighted output measurement can be determined with the output being a symbol that combines the underlying rating or score of the particular consumer/business.

Statistical and modeling tools and algorithms can then analyze the collected information and provide prediction and trending data for the particular consumer, business, product or service being evaluated by the users. A momentum quotient (MQ) can then be defined and displayed in a summary symbol for access and display to users and user groups upon a predefined user access and validation rules set. In some instances, the MQ may be defined as the slope of a trending line or a space distance on a chart.

The invention can be utilized to determine a uEffect Momentum Quotient for an event such as a music concert that is being performed in several locations throughout the year, a show or a campaign like a political campaign. In a political campaign, users can post the issues, topics and important parameters that are important to them, and then rate and score the candidates responses to the issues and parameters. The priority and the weighting of the user's issues and parameters can be compared and contrasted to the candidates' posted priority and weightings of their own identified issues and parameters. The cumulative summaries, through a user defined algorithm, can be then displayed as a momentum quotient of the various candidates as well as the specific issues and parameters.

Various levels of validation, access and input can be identified in a political campaign embodiment of the invention. For example, the general public may have access to the momentum quotient of the candidates and the general parameters. For users to desire to view additional information, they may be required to become validated by a rules set defined by a user group or an association of users. Once validated, the user can then have access to information from a uEffect momentum result (MR) including the issues and parameters detailed scorings and ratings. A user, for example, may have access to details of what males in the 40+ year old association have identified as their first priority issue such as the economy. This information can be compared and contrasted to information about females under the age of 40 who have noted social security as their number one priority issue.

Information about how certain groups are providing feedback about different candidates can be accessed, such as the uEffect Momentum quotient for each of the candidates for the over 65 year olds, versus the uEffect quotient for each of the candidates from the 18 to 40 year olds.

In the above example, Paul Sadler, an individual user, may view a summary symbol of the momentum quotient for a particular candidate. By validating himself as a user according to predefined rules, he may provide his e-mail address to validate himself to a level 1 access. This access may enable him to view more detailed information such as the underlying details that make up the summary momentum quotient for the candidate he is interested in. Details of each of the issues that the candidate have posted, weighted and has prioritized, and the issues that the user groups and associations have posted, weighted and prioritized. By further validating himself, Paul would have access to more information and would be able to contribute to the scores and ratings. For example, according to the predefined rules set, if Paul would provide his zip code, age, and gender, he would be permitted to access an input screen to provide ratings or scoring information on the various candidates and issues currently displayed. He may also have the ability to score and weight the various issues according to his own priorities and have the scores and weights contribute to the overall scores and feedback about each of the candidates and the issues surrounding each of the candidates and the general issues that have been identified by the user community.

Further validating his user status, Paul would have access to other users who have elected to be included in the system forum and social interaction component of the invention. This would enable Paul to associate himself with other users who have a similar profile, other users in his home community and others who have similar weightings of the issues and candidates. Paul will have access to an association page wherein discussion forums are hosted by the system's apparatus and he will be able to post, chat and communicate with other individual users and post comments to the discussion bulletin board.

If the UGA of the above example wants to offer an option to solicit candidate information from subsequent users, the UGA may configure the system to first ask for the candidate the user supports. Then the user can specify the issues and weight, score and vote on issues and other parameters. The user then has the option to compare the user's preferences to other UGA(s) (e.g., UGAs that incorporate user profiles and other inputted information, to also include the summary result from the composite UGAs combined).

Method of Claim AA—business Momentum Analysis example. An example of a system and method to evaluate the success of a business model employing the tools of Momentum Analysis would be independent coffee retail stores. User groups, including store owners, academics from universities, professionals such as accountants and bankers, would define the parameters that define successful operations based upon their respective profiles. As time passes and data is collected, the individual factors within the parameters are evaluated by all parties. The method is configured to obtain data and forecasting information with several, real-time updates. Summaries of the relevancy of the parameters and the values of each of the factors within each parameter are displayed of the relevancy of the parameters and factors weighted as an overall average and weighted to each of the user groups. Statistical analysis is then employed to determine an overall, cumulative summary result or score.

For store owners, relevant parameters may begin as location, service and quality. As additional data is collected from additional store owners, and as the store owners evaluate the parameters, some parameters may emerge as more relevant, in this example, quality may eventually surpass service.

For professionals including bankers and accountants, working capital and cash flow may be more relevant parameters then service. Cumulative results and values are displayed to each of the user group according to their individual profiles, as well as a cumulative summary of all users.

As additional users continue to further define the parameters, the relevancy of each parameter, the individual factors within each parameter and the overall scores contributed by each user, the data becomes statistically more accurate for user-centric momentum analysis (MA) and momentum predictions (MP).

Method of Claim AA—business peer evaluation example. An example of the system and method is in peer evaluation techniques. Take in this embodiment mid-level managers at a large company and their supervisors. The desired result is the evaluation and forecasting of leadership skills in individuals at both the mid-level management level and the supervisory level. Each mid-level manager and supervisor would input his or her individual profiles into a database. The parameters of an evaluation can be collected by both sets of users, the mid-level managers and the parameters of the supervisors. Parameters can be organized where the system and method, or an individual or a group, act as a facilitator of the collected data, displaying the weighted results of the parameters of the mid-level managers compared and contrasted to the weighted parameters of the supervisors. Parameter sets are then evaluated on two or more rounds to eventually settle on a predetermined set of weighted parameters in a priory list.

All users can then score or set a value to each factor within the parameters. For example, the mid-level managers evaluating supervisor's leadership skills may begin with predefined parameters in a weighted priority of: listening skills; over-all attitude; and collaboration skills. Each mid-level manager would then score their supervisors, upon a facilitator or user-defined rating scale (or suggesting an improved rating scale), detailing how their supervisor measures up with each of the factors. Overall results can be displayed as well as specific queries weighted and organized collectively with input from the individual user's profiles. One specific query would be the summaries of what mid-level managers under the age of 40 collectively considered the most important parameters, compared with mid-level manager's parameters over the age of 40.

Conversely, supervisors could detail the parameters that they consider key characteristics of identifying leadership skills necessary to develop into upper management. Parameters are solicited from all supervisors, organized and weighted by the system or a facilitator, for display for further evaluation of all supervisors. Collectively, as a user group with the aid of the system and facilitator, the supervisors would agree on the priority and weightings of the parameters for each topic and/or category. Individual factors and a rating or scoring scale would be agreed upon collectively by the group or provided by the facilitator. Scores for each of the supervisors can be then collected based upon their experience with managing their respective mid-level managers.

Overall results pertaining to the mid-level managers can be displayed as well as specific queries weighted and organized collectively and influenced by including the individual profiles (and the respective weightings and ranks of the user) of the mid-level managers. Data can be optimized by further evaluating the collected information, data-mining key information and trends to establish different parameters, factors and/or rating systems. Information can be collected and compared against data collected by other divisions within the company, and compared to data collected by other companies in the same or different industries.

The relevancy of the data collected can be enhanced by factors such as the amount of data, the time elapsed between data collection and input, and other analytical tools to continue to further define relevant and meaningful feedback. Historical data can be compared against actual results obtained, for example, of the mid-level managers that ended up obtaining an upper management position, what we're the parameters, factors and scores that the individual had previous to obtaining the upper management position. Comparing the results to others who have achieved upper management positions would then be collected and displayed as a cumulative result with the ability to query results based upon the profiles of the individuals involved.

Method of Claim AA—individual user and a retail experience using RFID. If an individual user chooses to provide profile information and relevant and meaningful parameters to be stored in the system and to further to stored in a communication device, in this embodiment an MP3 music player with RFID, then the predetermined relevant and meaningful information defined by the user can be communicated to a retail store input device.

If a retail store utilizes an input device that can read the profile information, in this example via RFID, and relevant and meaningful content defined by the user, the retail store's input device can respond. One such response is a real-time video display of products that maybe on sale that best matches the score of the incoming individual at the entrance to the store. In this example, a 45 year-old movie goer with one son who owns a Sony PlayStation video game console, may be shown the sale price of a new release of a video game, with the suggestion of a potential birthday gift for the upcoming birthday of his son.

Anti-Fraud Measures

In some embodiments, anti-fraud checks and measures are applied to the system to that incorrect or maliciously data isn't intentionally passed into the database. Typically users are entering the system resources and tuning their search, comparing and analyzing results and trends of determining relevancy are identified by the system. If however, multiple users provide conflicting feedback and data, an arbitration system may be employed to determine the validation of the users and their purpose for providing the data and the feedback. The system may maintain IP addresses within the user profile information and the historical information provided by the users to ensure the consistency and the absence of fraud. Another measure is the system performing a comparison analysis of the user with other heuristic data to determine if that particular user is attempting to decrease or increase a score, weighting or ranking of a user group result or a user association result.

The user (or group users) may suggest and implement via the system and network other available external sources and methods to help mitigate fraud. User profile information can be checked against a telephone number or credit card database. Behavioral tools, such as bonding users or insuring users and agreements may be utilized. Other technology, hardware and software can be user suggested and implemented within the system.

Detailed Description of the Invention the System and Method

The inventions in some embodiments comprises of a computer server configured to gather data from a plurality of sources for compilation into at least one searchable database that is accessible through a communications network. Wherein the computer server is communicatively coupled to a plurality of clients over the communications network, and wherein the server includes:

a data input device;
a business rules and data processor;
a data base;
a data output content device (and/or a display manager); and
profile management device wherein the data input device, the business rules and data processor, and the data output content device and profile management device are coupled together with at least one database.

Some embodiments of the invention include an apparatus that includes a computer server configured to gather data from a plurality of sources for compilation into at least one searchable database that is accessible through a communications network, wherein the computer server is communicatively coupled to a plurality of clients over the communications network, and wherein the server includes: a data input device configured to elicit and receive input data from the plurality of clients, wherein the input data includes both a user profile that includes relevancy weights for each of a plurality of ((topics, parameters, factors, elements or other subject headings)), and user ((ranking data associated with each of a plurality of entities)); a database configured to store the input data in a manner that retains an output device that gathers data from the database and presents refilled data to the user based on the user's profile; and a data output content device (and/or a display manager) and profile management device.

In some embodiments, the system supports the method and functions of managing meaningful data content, including; collecting, searching, organizing, processing, compiling, computing, categorizing, storing and displaying distributing meaningful content that is provided and inputted by the users (or a group of users sometimes referred to as a community of users or an association of users). The system and method benefits clients and other users who desire to search and obtain meaningful feedback authored by other users with the ability to remain connected with users who have a similar, correlated user profile through a social networking environment. Wherein the social networking aspects of the invention are facilitated and managed by the system based upon rules and instructions predetermined by the user and/or the user groups.

The system that embodies the invention utilizes a communications network, commonly referred to in one embodiment as the internet. A communications network may also include an intranet, wireless and mobile networks and other input and display devices using a variety of methods of communication often times utilized with consumer electronic products.

Another aspect of the invention is a system comprising a computer server communicatively coupled to remote clients over the communications network, wherein the system gathers and captures data for a plurality of sources for compilation into a searchable, comparable, analyzable and easily accessible database server, that is either locally or remotely hosted, and connected through the communications network.

In some embodiments, the system includes methods comprising: managing (relevancy ranking in a user defined and user weighted method) and searching and comparing meaningful data or content is a user defined and user weighted method.

In some embodiments, the system and method performs a variety of functions including;

a. Eliciting and receiving relevancy-weight data from a user; and adjusting relevancy weights of ranking data based on an age (time element or parameter) of the ranking data;

b. Eliciting and receiving relevancy-weight data from a user; and adjusting relevancy weights of ranking data based on a plurality of user-defined distances within a parameter space.

c. Eliciting and receiving relevancy-weight data from a user; and means for adjusting relevancy weights of ranking data based on a plurality of distances within a user-defined parameter space.

d. Eliciting and receiving relevancy-weight data from a user; and means for adjusting relevancy weights of ranking data based on a context of the proposed use of the relevancy-weighting ranking.

e. Providing access to users who can access and input topics, parameters, factors, elements, scoring and other meaningful, data into the database(s), for immediate display of processed results for the benefit of other users or user groups who desire to obtain meaningful content and feedback in a user defined weighted method.

f. Prediction and suggesting content based upon user profile and inputted and previously inputted data authored by the user.

g. Hosting a networking and communicative environment to link users with other users who have identified similar parameters, weightings, profiles, scores and rankings.

The invention incorporates an apparatus wherein each of a plurality of users can adjust relevancy weights of ranking data based on which of a plurality of user-selected usergroups the ranking data came from. In another embodiment, the apparatus can enable each of a plurality of users to adjust relevancy weights of ranking data based on a context of the proposed use of the relevancy-weighting ranking. The apparatus enables each of a plurality of users who can adjust relevancy weights of ranking data based on a plurality of user-defined distances within a parameter space. Thus enabling each of a plurality of users who can adjust relevancy weights of ranking data based on a plurality of distances within a user-defined parameter space.

In yet another embodiment, the apparatus of the system allows for user-selected relevancy weights to include selections from a predefined list of relevancy weights. This also includes embodiments wherein the list is based on a defined usergroup of like-situated users determined by an apparatus from parameters obtained from the user's profile (system puts the user into a group).

In some embodiments, the apparatus enables: the user-selected relevancy weights to include selections from a predefined list of relevancy weights that is based on a defined usergroup of like-situated users, determined by the user from a list of groups supplied by the apparatus (user puts himself or herself into a group); the display and modification of user-selected relevancy weights that are inputted by the user and user-selected relevancy weights that are generated by the system to form a list that can be modified by the user.

In some embodiments, as the user begins a search, a comparison, or analyzing function, the system can present, suggest and predict meaningful content based upon predefined logarithms and heuristics methods that incorporated previous data the user (and the user group's data) has inputted including profile information, past user behavioral searches and comparisons, weightings and priority settings of user defined parameters and scoring (or rating, voting or other valuation symbols). The system searches, elicits, receives and displays content and scoring results that incorporate user inputted parameters and weightings of parameters, and profile information in a weighted format and method. Data is presented, displayed, and stored in a reciprocal, weighted method demonstrating the relevant results from topics or categories inclusive or exclusive of corresponding user or user group profile information. Displayed data in some embodiments represent a cumulative summary that can be represented in a graphic symbol, visual, or audio means with some graphical symbols representing multivariate data.

Some embodiments of the invention include a method where the input data provided by users can be managed by the system server, for managing the collecting, organizing, processing, compiling, computing, categorizing, searching, comparing, storing and displaying distributing meaningful content provided and inputted by the users, or a group of users as a whole. The system then combines and stores this data with data collected by other users who are affiliated as a small or large group, or who are random in relationship to the inputting users.

In some embodiments of this method, the weightings of each parameter are defined and assigned by the user, and are stored in the database along with other pertinent user profile information, with the following method and functions:

The system can elicit, receive and store the user defined parameters, rules (algorithms), and definitions of what constitutes as meaningful feedback, of a particular topic, subtopic, element or factor, from the perspective of the individual user. The user-centric, user-controlled and user-defined definitions of each parameter is stored in a interactive profile database of the user to be compared, combined or excluded with other users' profiles and parameters of the same or similar topics.

The invention embodies a method in one example, wherein a user (from a predefined user group, from a randomly affiliated user group, an organized user group, or a content provider, author, or managing entity) has the option and capabilities of predefining the data collected including the data fields, parameters, formulas, and rules set of gathering the specific data to be inputted for current and future contributing users of the data. Inputting user(s), in defining the rules and or parameters, provide details of the formulas and/or rules set for the purpose of further defining meaningful and relevant content and feedback managed with the help of data input task scheduler (DITS). Formulas and/or rules that outline the parameters of obtaining, organizing, processing, compiling, computing, categorizing, and storing of the inputted data are for the benefit of future users who desire access to the feedback to improve their meaningful and relevant search results.

The method in one embodiment of the invention includes facilitating user feedback pertaining to searching and comparing meaningful and relevant feedback from other users. Contributing method and tools for users to provide feedback is triggered in response to a users selection of the input mode (uAffect mode) which activates the user interface with the database and the user profile information, The search and comparison results can then be manipulated in real time and interactively, based upon the user-defined parameters using a re-ordering interface, and can then be organized based upon the rules provided by the user or the user group(s).

A method can employ some embodiments that integrates user scoring and feedback data in conjunction with the searchers' user profile with a search and/or comparison query. Results are then sorted, displayed and stored in accordance with user input. An interactive user interface enables a user to drag and drop, preview, and organize results in a relevant and meaningful way.

The system, in some embodiments, can elicit and receive definitions of what constitutes as relevant, meaningful parameters and factors in which to evaluate topics or parameters of a subject matter, from the perspective of the user (or from the perspective of another user type or group), for the purpose of defining and creating a weighted, categorical, comparative and evaluative matrix of such topic for the benefit, search and display to the user, user group and community as a whole.

The system, in some embodiments, can elicit and receive input information from the user(s) including scores, values, and other relevant and meaningful information that correspond to the user-defined, user-weighted definitions and parameters of topic or subject. Data is stored in such a method that enables the data to be correlated to the values presented with the weighted user profile information in the inputting or searching user, incorporating the user defined and user weighted topic information, to be included, excluding and/or compared or contrasted with the results of other users and the weighting(s) each of the other users have defined for the benefit of searching such repository in a customized, user-centric, user-weighted, hierarchical, and evaluative method(s).

The system, in some embodiments, can enable an author or other provider of content and data and/or the user can specify input and/or search parameters that dictate a relevant and meaningful result from the perspective of the source, based upon criteria of user profiles, weighted definitions, and based upon user defined input values. This benefits authors or advertisers who desire input from a targeted user source with specific weighting characteristics and/or profiles.

The system, in some embodiments, enables the results of the data (collected, managed and stored by the system) collected by a method utilizing the processing and management algorithms of the business rules and data processing manager (BRDPM), for display by the system for the benefit of future users and user groups.

The system, in some embodiments, enables subsequent users and user groups to search, view, compare, contrast and have access to the weighted parameters, formulas, and/or rules set. Subsequent users will have the option to further provide and contribute input about the parameters, formulas and/or rules set via the data input task scheduler. Such input will be collected by the server and will be added to the stored data based using a weighted and predefined formula provided by the initial user(s) or user group(s) managed by the system and the business rules and data processing manager. In some examples, the user (or UGA) may require future user to provide data (e.g., profile information or e-mail address) to gain access to system and system data.

The system, in some embodiments, includes a method wherein a user can remotely (via a communications network), provide volunteered data specific to the values, score, or relevancy to each previously defined parameter(s) or data field(s) specific to a particular subject matter. The inputted data from the user will be collected by the Data Input Manager and will be added and combined with data provided by other users by the System. Inputted data will be managed by the business rules and data processing manager and will be stored in the database according to the weighted and predefined formulas provided by the initial user(s) or user group(s).

The system, in some embodiments, incorporates a method of wherein a user can remotely provide and input specific and volunteered profile information about him/herself directly into the User Profile Manager and Database for purposes of validation. User profile information will be stored in the database for the benefit of providing and enhancing the weighted, relevant and meaningful content of the specific parameters and data fields of all collected data for the benefit of the user and subsequent users and user groups. Further validation of the user enables the user greater access to data and uAffect modules to contribute feedback, scores, ratings and other user input.

The system, in some embodiments, includes a method wherein the user or user group can predefine the formula that defines the extent of the weightings specific to the collected user profile information and define the rules that influence and contributes (or contrasts) to the parameters of the specific data set to be collected by the rule base and quality engine (RBQE) and processed by the business rules and data processing manager. User profile information will contribute to the formulas (predefined by the user or user groups) of determining meaningful feedback for subsequent and future users and the display of the cumulative results of inputted data.

The system, in some embodiments, incorporates a method wherein the previously defined parameters and data fields of a specific subject are displayed by the system's data output content and symbol engine to subsequent users. Data input from the subsequent users from the parameters and data fields of a specific subject, are then collected by the system via the communication network, and managed by the business rules and data processing manager. The data output content and symbol engine (DOCSE) assigns values to the resulting cumulative and weighted data based upon the users' predefined rules set that includes weighting, rules, scoring and storing the data in the database.

The system, in some embodiments, includes a method where in the stored inputted, data form the users is organized and managed to display the cumulative results of the stored data. Results are processed by the output content and symbol engine based upon previously user-defined parameters that detail the weight and influence of each data field collected and how the data is then to be reflected in the final result. A single or multivariate score, symbol or marker is the end result that is displayed by the system for the benefit of future users.

The system, in some embodiments, includes a method wherein those users who have provided user profile information, can benefit from optimized search results when the user profile manager incorporates the user profile information and weightings priority ranking of the user defined parameters, enhancing the meaningful search result generated by the data output content and symbol engine. The users profile information is processed by the business rules and data processing manager that provides the previously defined weighted formula, to the data output content and symbol engine. The output content and symbol engine (OCSM) gathers the stored data sets from the database provided by previous users (including or excluding users with similar profile information) about a specific topic, parameter or subject, combines this information with the user profile information and process the information for display to the user as a customized, weighted, resulting score (or a symbol or marker) specific for the user. The benefit of one application is a result that is displayed to the user that is the cumulative, and/or weighted, result from other users with similar user profiles.

The system, in some embodiments, includes a method where data from the system can be remotely accessible to a user who can search, compare or contrast and have displayed a meaningful and relevant result. The result being a set of data comprising of feedback from the user specified group that is stored in a database according to predefined data formulas managed by the rule base and quality engine (RBQE) and the business rules and data processing manager (BRDPM). Feedback data from previous users stored in the database, is collected and displayed for the user. Data displayed includes the separate parameters or data fields about a specific subject of inquiry, and the weighted, combined, collected inputted data, or the values or scores, of each parameter or data field.

One embodiment of the system includes a method of wherein the output content and symbol engine (OCSE) displays the univariate or multivariate data from each parameter from the feedback (inputted data) and values or scores provided by the users collectively. Feedback typically comprising of two or more parameters with each parameter having different combined values or scores to generate a consolidated symbol or marker defined by the authors of the data and/or the user(s) and/or user groups.

One embodiment of the system uses a method wherein the output values from each parameter can be summarized and incorporated into the form of a proprietary symbol or other easily recognizable markers such as faces, colors, graphs, lines in any combination incorporating numbers and letters and/or with any type of motion including flashing or text to audio conversion. This method provides a result that is created and managed by the data output content and symbol engine (DOSE) managed by the business rules and data processing manager. Combining the output of multivariate values into a symbol or other summarized marker, benefits subsequent users by displaying a multivariate result that summarizes meaningful content that is weighted and customized to the searching user.

One embodiment of the system incorporates a method wherein the output symbol comprises the parameter/value output compilation and the cumulative weighted results summary data of each parameter into a symbol or combination of symbols that display the value results of each of the parameters according to the formula provided by either one user or a user group, or a formula that is the weighted, cumulative result of a user or a user group. This information is collected, stored and managed by the business rules and data processing manager (BRDPM). This method incorporates a resulting output symbol that is dynamically hot-linked to display the details of the parameter/value output compilation and the cumulative weighted results summary page generated by system's data output content and symbol engine. A user can click on the symbol or marker described in this example and can access the specific parameters of the stored data set (feedback from other users) and the cumulative, and/or weighted, values of each parameter.

One embodiment of the system utilizes a method enabling the system to generate custom and weighted search results and to have the results displayed as a corresponding symbol or marker with a unique and consistent look in list form defined by the user and/or the user group. Parameters predefined by the user and/or the user groups is displayed next to corresponding search results from a search engine, generated by the business rules and data processing manager and the data output content and symbol engine (DOSE).

One embodiment of the system incorporates a method wherein a user can be notified of resulting weighted scores or search results via notification options that have been predefined by a user, administrator or a user group. Notification can be via e-mail, wireless mobile, RFID, webpage, blog (i.e., a web log on the internet) or other computer audio/visual aids. Some embodiments of this method include notification options with the ability to easily access and view the parameter/value output compilation and the cumulative weighted results summary page generated by systems' data output content and symbol engine and the user profile manager.

One embodiment of the system incorporates the method where a monetary charging mechanism is operative, based on the request to access data, to charge an access fee or a subscription, to access the data and/or post data managed by the administrative module and the business rules and data processing manager of the system.

One embodiment of the system uses a method wherein a user or user group that is an author, manufacturer, promoter or any other entity with commercial interest, can solicit feedback from the users by providing data fields and defining parameters and topics for meaningful feedback interfacing. Relevant feedback is collected in the form of questions, comments or other meaningful feedback, during the method and process and managed by the administrative module within the system and provided by the data input task scheduler, and the data input manager.

One embodiment of the system utilizes a method of wherein a user(s) can provide solicited and unsolicited feedback that automatically integrates the user's profile information and the user's weightings of parameters and other user input data, to another user, user group, author, manufacturer, promoter or other commercial interest using the system with assistance from the data input manager of the system.

One embodiment of the system uses a method using the system in such a fashion wherein the business rules and data processing manager uses a plurality of tools to analyze the user provided feedback and attempts to find relationships with the user-centric and user-defined input data including historical trends, prediction analysis, and other economic and statistical modeling tools.

One embodiment of the system utilizes a method that incorporates statistical analysis tools including (but not limited to) regression analysis, general linear model, principal components analysis, linear discriminant analysis, discriminant function or canonical-variate analysis, logistic regression, multivariate analysis of variance, artificial neural networks, multidimensional scaling, canonical correlation analysis managed by the administrative module and the business rules and data processing manager.

One embodiment of the system uses a method that can employ tools for momentum analysis (MA) utilizing the system and the database of user inputted data. Evaluation of user profiles, user defined factors, user defined weightings of the parameters and variables, coefficients, principals, characteristics, formulas and correlations combined with other information including micro and macro data such as overall market trends, will further define momentum analysis to characterize momentum theory, momentum behavior and momentum predictions of users, user groups and defined entities. Momentum analysis is utilized for organizing data including market, user, product or service status trends. The data is then compiled with user-centric definitions, organized and stored based upon predetermined user or user group parameters, for the purpose of displaying the results in summary and multivariate symbol format using the parameter/value output compilation and the cumulative weighted results summary, generated by the data output content and symbol engine within the System.

One embodiment of the system uses a method that formulates a user defined (or user group defined) cumulative, and/or weighted, user-centric prediction result(s) generated and displayed by a summary symbol(s) based upon pre-defined parameters, managed by the system components described above.

In some embodiments, the present invention provides an apparatus that includes a computer server, wherein the computer server is communicatively coupled to a plurality of clients over the communications network, and wherein the server includes: a data input device configured to elicit and receive input data from the plurality of clients, wherein the input data includes both a user profile that includes user-selected relevancy weights for each of a plurality of ((parameters)), and user ((ranking data associated with each of a plurality of entities)); a classifier that classifies each user into a plurality of usergroups selected from a superset of usergroups based on the user profile of that respective user; a database configured to store the ranking data in a manner that retains a separation of ranking data of different usergroups; and an output device that gathers data from the database and presents refined data to the user based on relevancy weights from the user's profile.

In other embodiments, each usergroup can be considered a group or an association of which the user is a member. For example, a usergroup could include just a single user (in some embodiments, each user forms a usergroup of just that single user). A user is typically a member of a plurality of usergroups, for example, a user could be a member of usergroup "musicians", usergroup "men" (male or female), usergroup "married" (or single, widowed or divorced), usergroup "30-something years old", usergroup "operating system preference" (e.g., PC or Macintosh), usergroup "economic class" (e.g., poor, middle class, or wealthy), usergroup "video game player", usergroup "buying preferences" (e.g., internet or brick-and-mortar, or cash vs. credit card), usergroup "daylily grower", usergroup "member of the Sadler family", and the like.

In some embodiments, the usergroups can also be overall preferences, such as entertainment: usergroup "clean-humor preference of comedians", or usergroup "accepts comedian who use innuendo" or usergroup "insulting and put-down comedians"; products: usergroup "film cameras", usergroup "point-and-shoot digital cameras", or usergroup "high-function single-lens reflex (SLR) digital cameras". Other classifications can include eating, traveling, durable goods.

In some embodiments of the apparatus, each of a plurality of users is automatically a member of a single-user usergroup for just that user. This allows the system to handle individual users as one type of usergroup, rather than separate classifications.

In some embodiments of the apparatus, each of a plurality of users can define additional usergroups to be added to the superset of usergroups. In contrast, conventional systems have limited ability to define additional usergroups.

In some embodiments of the apparatus, each of a plurality of users can classify that respective user into a usergroup that was not automatically selected by the classifier.

In some embodiments of the apparatus, each of a plurality of users can remove that respective user from a usergroup that was automatically selected by the classifier.

In some embodiments of the apparatus, each of a plurality of users can adjust relevancy weights of ranking data based on which of a plurality of user-selected usergroups the ranking data came from.

In some embodiments of the apparatus, each of a plurality of users can adjust relevancy weights of ranking data based on an age {{time element or parameter}} of the ranking data.

In some embodiments of the apparatus, each of a plurality of users can adjust relevancy weights of ranking data based on a plurality of user-defined distances within a parameter space.

In some embodiments of the apparatus, each of a plurality of users can adjust relevancy weights of ranking data based on a plurality of distances within a user-defined parameter space.

In some embodiments of the apparatus, each of a plurality of users can adjust relevancy weights of ranking data based on a context of the proposed use of the relevancy-weighting ranking.

In some embodiments, the present invention provides a method implemented at least in part in a computer server, wherein the computer server is communicatively coupled to a plurality of clients over the communications network. This method includes eliciting and receiving input data from the plurality of clients, wherein the input data includes both a user profile that includes user-selected relevancy weights for each of a plurality of ((parameters)), and user ((ranking data associated with each of a plurality of entities)); initially classifying each user into a plurality of usergroups selected from a superset of usergroups based on the user profile of that respective user; storing the ranking data into a database in a manner that retains a separation of ranking data of different usergroups; and gathering data from the database and presenting refined data to the user based on relevancy weights from the user's profile.

In some embodiments of the method, the classifying includes classifying each of a plurality of users as a member of a single-user usergroup for just that user.

Some embodiments of the method further include eliciting and receiving usergroup-definition; and defining additional usergroups to be added to the superset of usergroups.

Some embodiments of the method further include eliciting and receiving usergroup-classification data from a user; and further classifying that respective user into a usergroup that was not automatically selected by the initially classifying.

Some embodiments of the method further include eliciting and receiving usergroup-declassification data from a user; and removing that respective user from a usergroup that was automatically selected by the initially classifying.

Some embodiments of the method further include eliciting and receiving relevancy-weight data from a user; and adjusting relevancy weights of ranking data based on which of a plurality of user-selected usergroups the ranking data came from.

Some embodiments of the method further include eliciting and receiving relevancy-weight data from a user; and adjusting relevancy weights of ranking data based on an age {{time element or parameter}} of the ranking data.

Some embodiments of the method further include eliciting and receiving relevancy-weight data from a user; and adjusting relevancy weights of ranking data based on a plurality of user-defined distances within a parameter space.

Some embodiments of the method further include eliciting and receiving relevancy-weight data from a user; and adjusting relevancy weights of ranking data based on a plurality of distances within a user-defined parameter space.

Some embodiments of the method further include eliciting and receiving relevancy-weight data from a user; and adjusting relevancy weights of ranking data based on a context of the proposed use of the relevancy-weighting ranking.

Some embodiments of the invention include an apparatus that includes: a computer server configured to gather data from a plurality of sources for compilation into at least one searchable database that is accessible through a communications network, wherein the computer server is communicatively coupled to a plurality of clients over the communications network, and wherein the server includes: a data input device configured to elicit and receive input data from the plurality of clients, wherein the input data includes both a user profile that includes relevancy weights for each of a plurality of ((parameters)), and user ((ranking data associated with each of a plurality of entities)); a database configured to store the input data in a manner that retains an identification of a particular user associated with each of a plurality of the stored ranking data and/or weighting data; and an output device that gathers data from the database and presents refined data to the user based on the user's profile.

Some embodiments further include a data output content device (DOCD) (and/or a display manager).

Some embodiments further include a profile-management device

In some embodiments, the present invention provides an apparatus that includes a computer server, wherein the computer server is communicatively coupled to a plurality of clients over the communications network. The server further includes a source of search-engine-result data (i.e., hyperlinks); a relevancy engine/program (PAMC) that analyzes source data indexed by the search-engine-result data for relevance to a selected user, wherein the relevancy engine's analysis is at least in part based on a plurality of relevancy parameters, yields a multivariate analysis result; [also include group characteristics] an output engine (DOC-SAM) that transmits the multivariate analysis result to the specified user.

In some embodiments, the relevancy engine/program is configured to receive from the selected user additional parameters to be analyzed by the relevancy engine/program.

Some embodiments further include a presentation engine that receives the multivariate analysis result and presents to the specified user a plurality of multivariate icons selected based on the multivariate analysis result.

In some embodiments, the relevancy engine/program includes a graphical-user interface that elicits and receives a further inquiry from the selected user to obtain a list of the relevancy parameters associated with one of the plurality of multivariate icons and respective relevancy-interpretation rules associated with each of the listed relevancy parameters. In some such embodiments, the relevancy-interpretation rules include weightings for each one of a plurality of the relevancy parameters individually. In other embodiments, the relevancy-interpretation rules include combinatoric relevancy rules (CRR) susceptible of combinatoric analysis (CA) by the relevancy engine of at least one combination of a plurality of the relevancy parameters. In some embodiments, the apparatus includes a graphical-user interface that elicits and receives input data from the selected user to define or modify at least one of the combinatoric rules.

As used herein, combinitoricals are combinatoric relevancy rules, combinatorics, algorithms, metadata (i.e., data about other data) and/or the like that are used or usable (beyond simple individual weightings) to provide a relevancy result based on a plurality of relevancy parameters.

As used herein, MUFT are relevancy parameters that include one or more of modes, utilities, functions and topics (MUFT).

As used herein, relevancy factors include one or more of parameters, values, algorithms, combinatorics, and classifications. In some embodiments, each of a plurality of the relevancy factors include a time parameter associated with a search comparison or data analysis query.

In some embodiments, individual users input data that define additional relevancy factors and modify existing relevancy factors. In some embodiments, user group input is used to define additional relevancy factors and modify existing relevancy factors.

In some embodiments, the present invention is applied to a dating-program (and/or social networking) system, and allows individual users and groups of users to define and modify relevancy factors used to analyze interpersonal compatibility and or suggest hookups. In some embodiments, the system allows individual users to define relevancy factors, apply these to a search for a compatibly person or group of persons, and to contact one or more persons through the system based on relevancy analysis results.

The present invention provides a user-centric approach for users to create and/or join user groups, wherein each user group is associated (in the computer) with a default user-group set of relevance factors. In some embodiments, each default user-group set of relevance factors is correlated to a user-specific set of data (e.g., based on answers provided to the system by a specific user. The user-group set of relevance factors can then be examined by each user, and modified by additional preferences of that user to obtain a user-specific-modified user-group set of relevance factors. In some embodiments, the user-specific-modified user-group set of relevance factors can be used in a feedback manner to update/modify the default user-group set of relevance factors (e.g., by adding additional factors to the default user-group set of relevance factors or by modifying existing factors). In some embodiments, user-specific-modifications to a user-group set of relevance factors is collected and aggregated into the default user-group set of relevance factors.

In some embodiments, a new user group is definable by user input, wherein the new user group is associated with an initial user-group set of relevance factors. Over time and use, the initial user-group set of relevance factors, initially presented to additional users, is modified over time to provide a dynamically updated default user-group set of relevance factors. For example, a movie-enthusiast user group can be created by one or more users, and the initial user-group set of relevance factors could include only the movie industries rating system of G, PG, PG13, R and X, for example. This overly simplistic set of relevancy factors are inadequate for a movie-enthusiast user group, who then add additional relevancy factors, such as nudity, language, violence and the like. Other users could add parameters such as genre (westerns, romance, comedy, musicals and the like). Over time, a large number of relevancy factors (which are input to the system) are obtained that are important in one way or another to a wide variety of movie enthusiasts. Each movie is rated by the various members of the movie-enthusiast user group according to the various relevancy factors that have been added over time.

Movie-Enthusiast Example

Some users could then define subgroups or spin-off groups that have an interest in one specific genre of film, or a type of media, or a particular director or actress. These spin-off user groups could be started using the default user-group set of relevance factors from the movie-enthusiast user group, but that spin-off group's set of relevance factors would then evolve over time in a manner that is distinct and different from the default user-group set of relevance factors of the generic movie-enthusiast user group. For example, in some embodiments, the present invention provides a computerized method that includes defining a first user group (e.g., movie-enthusiast user group) that includes a plurality of users (e.g., its initial set of users); providing a first default user-group set of relevance factors (e.g., the movie industries rating system of G, PG, PG13, R and X) and associating the first default user-group set of relevance factors (G, PG, PG13, R and X) with the first user group (the movie-enthusiast user group); defining a second user group (e.g., persons who enjoy satire); deriving an second default user-group set of relevance factors based from the first default user-group set of relevance factors (e.g., starting with (G, PG, PG13, R and X)) and associating the second default user-group set of relevance factors with the second user group (i.e., the satire movie enthusiasts user group); modifying the first default user-group set of relevance factors; and modifying the second default user-group set of relevance factors (e.g., by adding a parameter that rates the amount of satire) in a manner different than the modifying of the first default user-group set of relevance factors (e.g., by adding a parameter that rates the amount of violence). Over time, other relevancy factors could be added to either to all movie-enthusiast user groups (e.g., whether each rated movie is available on a HD DVD, which may be of interest to all) or to a specified subset (e.g., the amount of dark humor or offensive satire, which could be more applicable to the satire movie-enthusiast user group). In some embodiments, the additional relevancy factors are fed back into one or more (e.g., a selected plurality of) the user-group sets of relevance factors.

Additional Examples of Some Embodiments of the Invention

Individuals choose to relocate for many different reasons. Choosing a new local can be very intimidating and frustrating. Trying to find the best place to live to fit your lifestyle can be overwhelming. Some individuals use third party media endorsements such as magazine rankings or news print ranking as a guide in their decision making process. Unfortunately media editors and others use criteria and weighting of factors for choosing a good place to live that can be much different than individual's relocation criteria. For example in "Money" magazines annual rankings of the best place to live, "weather" is a major weighting factor. Traditionally, northern Midwest plain cities are scored negatively because of their cold winters. For some individuals attempting to relocate, they may like the cold. Because "Money" magazine ranks Midwest plain cities lower due to the cold, this individual would view "Money" magazines rankings as inaccurate. In another example other media sources have ranked Rochester Minn. as one of the best places in America to live because of it's proximity to the Mayo Clinic, because of it's excellent elementary school system, number of advanced degree professionals per the population, a great park system and is extremely safe from violent crime. On the surface if an individual was looking for a city to relocate to, Rochester Minn. would be an excellent choice. If you are an individual that has children, have health problems, or want to work in a health care environment with extremely educated individuals you might have found the right place to live. But Rochester Minn. is a family friendly town, no "Gentleman's Clubs", limited nightlife, and what some would say is extremely boring for singles and young adults. In Rochester over a third of its workforce works at the Mayo Clinic a health care facility. If the individual looking to relocate happened not to be interested in the Healthcare or related fields he or she would have been misled by Rochester's ranking as a best place to live in America, and may have relocated to an area not conducive to his lifestyle.

For the above example, the system would elicit input from users who live in, have lived in, visited, researched and evaluated Rochester. The individual choosing to relocate would list the parameters that they deemed to be important tailored to their specific relocation requirements. In the example above if a person used the invention and put in as their weighted parameters "Low Crime", "Elementary education", "Recreation" and "Healthcare Industry" then Rochester would come up as a top place to live in America. If the individual put in as their weighted parameters as, "Night Life", "Manufacturing", "Secondary Education" and "Single Life" Rochester Minn. would fall further down one's own personal weighted ranking list.

The invention will also help individuals who travel for business, recreation, or as tourists. One of the biggest problems with traveling is not knowing the restaurants or best tourist locations to visit. One of the most used modes of restaurant selection for an individual in an unfamiliar city is to ask the bellman at the hotel. Obviously bellmen recommend restaurants that they are familiar with or at worst being paid to recommend. These two facts alone make your selection of a restaurant in a new city risky.

In one embodiment, the system will analyze input from past patrons, and reviewers of selected restaurants and analyze and store the inputted data. The system will allow an individual to weigh the parameters that are most important to the patron and give them recommendations through any notification media such as cell phone, computer, and fax etc. The system would also allow restaurants to log on to the system and search as their weighted customer parameters to come up with potential customers that fit the selected weighted criteria. If a certain restaurant was going to have a special on prime rib for the weekend it could target those individuals that are prime rib connoisseurs. Restaurants could use the system to target customers directly using cell phone, computers and other media devices.

For example an individual visiting Chicago logs on to invention and enters in their personal weighted parameters, such as "Chicago", "Chinese Cuisine", "Casual attire", "Meal Price range $15-$25", "Full Bar". The system will take the individuals user defined weighted and selected parameters analyze imputed data from other past patrons and provide a personalized weighted relevancy list (1X, 2Y, 3Z, . . . ). If individual would have put "Location from Spot" as the first weighted parameter then the personalized weighted relevancy list may have changed to (1Z, 2X, . . . 15Y). Modifying the parameter after the initial personalized relevancy list may eliminate potential restaurants as ideal selections for a meal thus making choosing less risky.

Tourists or recreation travelers often face the challenges choosing the best sites to visit. Chambers of Commerce and tourist centers often are inundated with solicitations from tourist and usually funnel individual into the most popular or most visited destinations. These may not be the destinations that best fit the preferences of the individual seeking recommendations. Some individuals may not want to walk very far; some may prefer water attractions, or attractions that are kid friendly.

Our system will take information from individuals who have visited selected tourist sites and have used our invention to enter their weighted parameters and corresponding uEffect score, analyze it and compile the data. The individual tourist seeking recommendations for tourist destinations would enter in the user defined weighted parameters and would receive through a media source a corresponding list of tourist attractions tailored to their specific needs.

One example would be a person that logs on to our system through a computer terminal and puts in their user defined weighted parameters such as "location within 20 miles", "child friendly", "free admittance", and "water related". Being weighted and selected by the user, the individuals weighted relevancy list would comprise of destinations specifically tailored for the individual user that had "location" as the number one parameter, followed by "child Friendly" and so on until the list was complete.

Websites, Chat rooms and Blogs have become increasingly hard to navigate. When an individual types in a subject they are interested in hundreds if not hundreds of thousands of selections appear. The number one choice on a particular search engine may be the most visited Website, Chat room or Blog, but may not be the most relevant to the user. Third party entities can influence rankings on selected search engines by artificially inflating hits as an example in order to move up the rankings. An individual may not have time to view hundreds or hundreds of thousands of particular Websites, Chat rooms or Blogs to find the right fit. This is called "push internet". As defined as a third party such as a search engine that has arranged selections based on search engine criteria and listed the selections for the user.

In the invention the system would change the internet from a "push internet" to a "pull internet", as defined as a user based system that pulls the selections from the internet that the user defines as fitting their individual parameters and lists them according to personal weighted 1 preferences through a uEffect rating. A "pull internet" will save individuals time, and make the internet a personalized tool in the decision making process.

Today, a person looking for an internet site discussing the Presidents job approval rating would get a listing of over 200,000 hits. It would be a daunting task to try to find the site matching the individual user's preferences. The invention would elicit input from the readers of the 2000,000 sites and provide feedback through user weighted parameters. The system would then collect, analyze, compile and store the individuals weighted parameters. This would allow a new user to select and define her or his own weighted parameters to create an individualized relevant list.

An example of the invention would have a user log onto a system and through a device enter their weighted parameters. A user may define their weighted parameters as, "accuracy", "timeliness of information", "democratic slants", and "location Minnesota". With the user defined parameters the "pull internet" would search, combine, analyze and compile a list of sites for the user. The sites listed would then be listed according to the user defined weighted parameters. The list would exclude site that were "republican slanted", "inaccurate" or sites that have "outdated information" or not from the "location. Minnesota".

When choosing to purchase a retail product either from a retail store, an internet store or on a auction site such as EBay individuals can become overwhelmed or confused by the different choices. An individual with limited time may take an easy route and purchase the first observed or most conveniently located item. Advertisers overwhelm potential customers with print, television, radio, and internet advertising offering the same items at different prices or different brands and qualities making choosing difficult. In addition to the advertising confusion trying to find a gift or purchase an item for another individual not knowing an individuals personal preferences makes shopping for some individuals extremely time consuming, risky (someone may not like the gift) and an overall less then desirable activity.

The present invention will change the way we shop. The system will help individuals save time when shopping, find the perfect item according to their users and gift recipients personal parameters. The invention will also make purchasing a gift for another person less time consuming and less risky. The system will also help retailers by allowing then to directly target and advertise to individuals based on their purchase requirements.

An example of how the system will help deciding what to purchase and where to purchase starts with the individual logging on to the system and entering the user weighted parameters. If a person is looking to purchase a new television a user may enter weighted parameters such as "Made in the United States", "High Definition", "37 Inch or smaller", and "Price under $200.00". The system will then take the users weighted parameters search the system for the list of televisions on any type of media device such as a cell phone, fax, computer, Etc. that fit the users weighted parameters. In this example the user may change the weighted parameters, in order to compare different options such as making the weighted parameters "High Definition", "37 Inch or Smaller" and "Price under $200". This quarry and search would allow a user to compare United States-made High-Definition, 37-inch televisions priced under $200.00 to all High-Definition, 37-inch televisions under $200.00 made anywhere in the world. The user has the ability to shop for the items that meet his exact purchase requirements at the best available price.

Taking the previous example one step further, if a user has questions regarding the product to purchase, the individual may log onto the system and elicit and enter in weighted profile parameters such as "Male", "Age 25-40", "Sports Fan", and "Televisions". This would allow the user to connect with an individual to receive feedback back from a user group that matches his weighted profile parameters. In this example data collected, compiled, and analyzed from a user group that matches the individuals weighted profile parameters would then be transmitted to the user. The suggestion of a certain type of television such as a High Definition, 42 Inch, flat-screen would be displayed to the user. What makes the system powerful is the suggestion would come from a user group that exactly matches the user's profile of Males, age 25-40 who is a sports fan. This input from a user group would help reduce poor purchases. Once the user was able to define through user group suggestions on a television that would match his weighted profile parameters, he could then use the system as explained above and put in the weighted parameters such as "High definition", "42 Inch", "Flat Screen" and what ever additional parameters to get the best television that matches his purchase parameters.

The present invention outlines a system and method that can provide users, and groups of users, with an apparatus that can provide more relevant and meaningful search, comparison and data analysis. The system is a user-centric system that elicits and receives user data that enables the users, and the user group or association as a whole, to input data and define the elements that are relevant to searching, comparing or analyzing a topic, product, service, article, event, person, place or any other user defined topic.

Users and user groups can define the rules and algorithms that mine the stored feedback data, and can dynamically manipulate the search parameters, the weightings of the parameters and other filters or tuning mechanisms.

Cumulative summary scores can be displayed by the system in a system suggested or a user (or user group) defined process. Users (and user group associations) can further define the access levels within the system to access stored data. Data can be tracked, stored and displayed within the system that enables users to track trends, perform prediction analysis and define momentum quotients.

In some embodiments, the present invention provides a computer server, wherein the computer server is communicatively coupled to a plurality of clients over the communications network, and wherein the server includes: a source of search-engine-result pointers; optionally a source of internally stored data on a database; a relevancy-and-comparison engine (RACE) program that analyzes, for relevance to a selected user, source data indexed by the search-engine-result pointers, wherein the RACE program's analysis is at least in part based on a plurality of relevancy factors, and yields a multivariate analysis result; an output engine (DOC- SAM) that transmits the multivariate analysis result to the specified user. Some embodiments further include a database connected to the relevancy engine/program and configured to be searched and to return pointers to the database's internal data.

In some embodiments, the relevancy factors includes a time parameter for each of a plurality of MUFT (modes, utilities, functions and topics), and the RACE engine generates a momentum quotient (MQ) (e.g., trend analysis of the plurality of relevancy parameters).

In some embodiments, the relevancy factors includes the combinitorical characteristics of the MUFT parameters resulting is a list or graphical display of the momentum combinatoric analysis (MCA).

In some embodiments, the relevancy-and-comparison engine (RACE) program performs a grammar and/or syntax-based analysis of the source data indexed by the search-engine-result pointers to obtain results for a user-specified relevancy factor.

In some embodiments, the apparatus a relevancy-and-comparison engine (RACE) program that performs a context-sensitive analysis of the source data indexed by the search-engine-result pointers to obtain results for a user-specified relevancy factor. The relevancy engine/program can be configured to receive from the selected user additional parameters to be analyzed by the relevancy engine/program.

In some embodiments, a presentation engine receives the multivariate analysis result and presents to the specified user a plurality of multivariate icons selected based on the multivariate analysis result. In one example, the relevancy engine/program includes a dynamic graphical-user interface that elicits and receives a further inquiry from the selected user to obtain a list of the relevancy parameters associated with one of the plurality of multivariate icons and respective relevancy-interpretation rules associated with each of the listed relevancy parameters.

In some embodiments, the relevancy-interpretation rules include weightings for each one of a plurality of the relevancy parameters individually. In another example of the invention, the relevancy-interpretation rules include combinitoricals usable for a combinatoric analysis of at least one combination of a plurality of the relevancy parameters.

In some embodiments, the apparatus includes a graphical-user interface that elicits and receives input data from the selected user to define or modify at least one of the combinitoricals. The system and apparatus can be configured wherein at least one of the combinitoricals is based on one or more group characteristics.

In some embodiments, at least one of the combinitoricals is based on one or more group characteristics, wherein the selected user specifies a group from which to obtain the group characteristics.

In some embodiments, at least one of the combinitoricals is based on one or more group characteristics, wherein the selected user indirectly specifies a group by providing self-characterizing answers.

In some embodiments, the invention includes at least one of the relevancy parameters as a user-specified parameter to cause the analysis to be from a perspective of someone other than the user (e.g., a member of a group that does not include the user, the ability to influence the relevant search mechanism to be targeted for a person other than the specified user (different user—e.g., boy's night out vs. date with woman)).

In some embodiments, at least one of the relevancy parameters is a use and/or a utility mode for which the returned data is to be applied (the ability to specify a situation and/or add a situation and/or use parameter for the analysis (different uses for the restaurant e.g., boy's night out vs. date with woman)).

In some embodiments, the apparatus includes a database (e.g., an internal database having cached data (a local copy of data from elsewhere)) connected to the relevancy engine/program and configured to be searched and to return pointers to its internal (local copy) data.

In some embodiments, the internal data includes review information obtained from one or more users, wherein the review information includes user and user group defined rules, formulas and algorithms for data access, storage, display and search tuning and modifications to enable data analysis.

In some embodiments, the apparatus utilizes the internal data and includes review information obtained from one or more users, wherein the review information includes empirical, implies, implicit and explicit feedback (votes, ratings, scores, weights).

In some embodiments, the present invention provides an apparatus that includes a computer server, wherein the computer server is communicatively coupled to a plurality of clients over the communications network, and wherein the server includes: a data input device configured to elicit and receive input data from the plurality of clients, wherein the input data includes both a user profile that includes user-specific attributes of the user and user-selected relevancy weights for each of a plurality of ((parameters), wherein the user defines and adds to the data being analyzed for relevance at least one of the parameters), and user ((ranking and/or scoring data associated with each of a plurality of entities)); a classifier that classifies each user into a plurality of usergroups selected from a superset of usergroups based on the user profile of that respective user; a classifier that generates a momentum classification (MC) combining users into a plurality of user groups selected from a superset of usergroups; a classifier that generates a momentum parameter classification (MPC) combining user and usergroup parameters, MUFT, rules and algorithms into a plurality of usergroups from a superset of usergroups or associations; a database configured to store the ranking data in a manner that retains a separation of ranking data of different usergroups; and an output device that gathers data from the database and presents refined data to the user based on relevancy weights, defined parameters, MUFT, rules and/or algorithms, from the user's profile.

In some embodiments, each of a plurality of users is automatically a member of a single-user usergroup for just that user. In another embodiment, each of a plurality of users can define additional usergroups to be added to the superset of usergroups. In another example, each of a plurality of users can classify or remove that respective user into a usergroup that was not automatically selected by the classifier.

In some embodiments, a user can identify other users (based upon criteria defined by the user) to communicate and solicit feedback from other users directly via a forum provided by the system creating a social interface between users based upon criteria defined by the users themselves.

In some embodiments, an output device generates a data point (including a topic, parameter, factor or other information) or an iconic summary representation of a ranking based on. In another example, the data the system and apparatus independently collects and processes (with the user's predefined preferences, profiles and definitions) creates a predictive, suggested data point to the user.

In some embodiments, a plurality of parameters for each of a plurality of attributes of the resulting iconic representation(s) is based upon defined user group preferences or based upon the preferences provided by the user. In another example, each of a plurality of users can adjust, filter and tune the relevancy weights of ranking data based on data points, parameters, MUFT, governing rules, algorithms, of the ranking data. User profiles, other parameters or factors of the ranking data can also be incorporated.

In some embodiments, the search and analysis function is further filtered and tuned to correlate with suggested or selected user profile information.

In some embodiments, the system provides a method for eliciting and receiving input data from the plurality of clients, wherein the input data includes both a user profile that includes user-selected relevancy weights for each of a plurality of parameters, and user ranking data associated with each of a plurality of entities is incorporated. This can also include:
 a) a means for initially classifying each user into a plurality of user groups selected from a superset of user groups based on the user profile of that respective user;
 b) a means for storing the ranking data into a database in a manner that retains a separation of ranking data of different usergroups; and
 c) a means for gathering data from the database and for presenting refined data to the user based on relevancy weights from the user's profile.

In some embodiments, the apparatus contains the means for classifying including a means for classifying each of a plurality of users as a member of a single-user usergroup for just that user. This example can include a means for eliciting and receiving usergroup-definition; a means for defining additional usergroups to be added to the superset of usergroups, a means for eliciting and receiving usergroup-classification data from a user; and a means for further classifying that respective user into a usergroup that was not automatically selected by the initially classifying.

In some embodiments, the system includes a means for eliciting and receiving usergroup-declassification data from a user; and a means for removing that respective user from a usergroup that was automatically selected by the initially classifying.

In yet another embodiments, the system includes a means for eliciting and receiving relevancy-weight data, and rules and algorithms supporting the data from a user; and a means for adjusting relevancy weights of ranking data based on which of a plurality of user-selected usergroups the ranking data came from.

In some embodiments of the invention, the method provides a means for data gathered from the users to be processed algorithmically based upon user definitions to generate a momentum query (MQY) to suggest topics, parameters and factors, present data and feedback and provide analysis and queries. Such a function enables the system to generate a momentum prediction (MP) to predict meaningful and relevant tending data to support the identification of relevant topics and parameters for economical modeling, statistical analysis, momentum analysis (MA), and determining the MQ.

In some embodiments, the system provides for a method of receiving a plurality of search-engine-result pointers (e.g., hyperlinks), fetch source data pointed to by the search-engine-result pointers, retrieving data stored on an internal data base, perform a relevancy and comparison analysis of the fetched source data for relevance to a selected user (wherein the analysis is at least in part based on a plurality of relevancy parameters, and outputting a multivariate analysis result) The system provides for a means for transmitting the multivariate analysis result to the specified user.

In some embodiments, the system provides a means for receiving from the selected user additional parameters to be analyzed by the relevancy and comparison analysis. The method provided by the system can be configured for receiving the multivariate analysis result and presenting to the specified user one or more dynamically linked icons selected from a plurality of multivariate icons based on the multivariate analysis result.

In some embodiments, the relevancy and comparison analysis includes using a graphical-user interface to elicit and receive a further inquiry from the selected user, and based on the further inquiry, obtain a list of the relevancy parameters associated with one of the plurality of multivariate icons and respective relevancy-interpretation rules associated with each of the listed relevancy parameters and presenting the list to the user. In this example the relevancy-interpretation rules can include weightings for each one of a plurality of the relevancy parameters individually.

In some embodiments, the relevancy-interpretation rules include combinatoric algorithms for a combinatoric analysis of at least one combination of a plurality of the relevancy parameters. An example of the system includes eliciting and receiving data, via a graphical-user interface, from the selected user to define or modify at least one of the combinatoric rules.

In one example of the system, a computerized method comprises the function of defining a first user group that includes a plurality of users; defining a first user group association (UGA) that includes a plurality of users; providing a first default user-group set of relevance factors and associating the first default user-group set of relevance factors with the first user group; defining a second user group; deriving a UGA and correlating data points, parameters, rules, algorithms and profile information; deriving an second default user-group set of relevance factors based from the first default user-group set of relevance factors and associating the second default user-group set of relevance factors with the second user group; modifying the first default user-group set of relevance factors; and modifying the second default user-group set of relevance factors in a manner different than the modifying of the first default user-group set of relevance factors.

In some embodiments, the system incorporates a method to implement, at least in part, a computer server, wherein the computer server is communicatively coupled to a plurality of clients over the communications network, the method comprising the functions of eliciting and receiving input data from the plurality of clients, wherein the input data includes both a user profile that includes user-specific attributes about the user, and user ranking data associated with each of a plurality of entities, initially classifying each user into a plurality of user groups selected from a superset of user groups based on the user profile of that respective user; storing the ranking data into a database in a manner that retains a separation of ranking data of different user groups; and gathering data from the database and presenting refined data to the user based on relevancy weights, parameters, MUFT, rules and algorithms correlating to user's profile.

In some embodiments, the classifying includes classifying each of a plurality of users as a member of a single-user user group or UGA for just that user. The system can provide a means for eliciting and receiving usergroup-definition; and defining additional usergroups to be added to the superset of usergroups. In addition, the system can perform functions of eliciting and receiving usergroup-classification data from a user; and further classifying that respective user into a usergroup or a UGA that was not automatically selected by the initially classifying.

In some embodiments, the method includes eliciting and receiving usergroup-declassification data from a user; and removing that respective user from a usergroup that was automatically selected by the initially classifying. In some examples, the system provides a means for eliciting and receiving relevancy weight data from a user; and for adjusting relevancy weights of ranking data based on which of a plurality of user-selected usergroups the ranking data came from.

In some embodiments, the user profile further includes user-selected relevancy weights for each of a plurality of parameters, MUFT, and the rules and algorithms that apply to the stored data.

Some embodiments further include customizing a look-and-feel and usability of the user interface. For example, in some embodiments, the sorting interface includes user-defined organizational tools and icons within the dashboard that optimizes the relevancy of the searching, comparing or analyzing function that enable the user to drag and drop, right click or click and highlight to obtain a desired organization and re-organization of a function result.

{having the system suggest and predict results to a user as the user begins a search or comparison} An apparatus of claim 15, and the method of claim 8 wherein the apparatus provides a real-time and interactive interface with the systems' database and the inputted user profile, preferences and search and comparison criteria, to generate and display data that is suggested, predicted, prompted, previewed, weighted, and stored for the purposes of optimizing and tuning a users' search, comparison or analyzing function result.

In some embodiments, the system apparatus stores profile, historical user preferences and weighting data, in conjunction with other search engines responses to optimize results. An apparatus utilizes a search algorithm that incorporates user profile information, user defined (and UGA defined) parameter priority rankings, and MUFT and parameter weightings to further tune and optimize the search results.

In some embodiments, the tuning, search, comparison and analysis of the above is further tuned to incorporate scores, ratings, votes, or other feedback from external sources (e.g., other websites and DB).

In some embodiments, the security parameters incorporate user and UGA defined methods and rules to manage users and user access to data to mitigate fraud.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
a computer system comprising, a computer server, wherein the computer server is communicatively coupled to a plurality of clients over a communications network, and wherein the computer server includes:
a source of a plurality of search-engine-result pointers;
a relevancy-and-comparison engine (RACE) program stored on the server that, when the RACE program is executed, analyzes, for relevance to a first human-user, source data indexed by the plurality of search-engine-result pointers, wherein the RACE program:
elicits and receives, from the first human-user, a plurality of human-user-defined search terms;
elicits and receives, from the first human user, a specification of a first group, wherein the first group is a self-identified set of human users, and wherein the first human user need not be a member of the specified first group, wherein the RACE program associates a first set of group-relevancy factors with the group;
elicits and receives, from the first human user, a plurality of human-user-defined relevancy factors, wherein the plurality of human-user-defined relevancy factors received from the first human user includes factors that are to be weighted by the RACE program to rank search-engine results for presentation to the first human user in addition to the search terms received from the first human user; and
wherein the RACE program's analysis is at least partially based on weights determined by the received plurality of the first human-user-defined relevancy factors and the first set of group-relevancy factors and wherein the received plurality of the human-user-defined relevancy factors for the first human user include a location, and wherein the RACE analysis is based at least in part on the location.

2. The apparatus of claim 1, wherein the computer system utilizes momentum analysis to characterize momentum theory, momentum behavior and momentum predictions of users, user groups and defined entities, by incorporating user-profile information, adding human-user (and user peer group) defined parameters, rules (algorithms) or metrics and human-user feedback including weighted criteria or parameters provided by the human users, resulting in a momentum quotient.

3. The apparatus of claim 2, wherein the momentum quotient is at least in part based on statistical analysis of source data indexed by the plurality of search-engine-result pointers.

4. The apparatus of claim 2, wherein the momentum quotient is at least in part based on statistical analysis using a time parameter.

5. The apparatus of claim 2, wherein relevant information includes information provided by other human users that include users with similar profile information and 'use' of data context, and demanded data, feedback or information determined by the human users, a human usergroup, community or a peer group.

6. The apparatus of claim 1, wherein relevant information includes information provided by other human users that excludes users with similar profile information and 'use' of data context, and demanded data, feedback or information determined by the human users, a human usergroup, community or a peer group.

7. The apparatus of claim 1, wherein the computer system is coupled to a plurality of clients over the communications network; and includes search-engine-result data and analyzes source data indexed by the search-engine-result data for relevance to a selected user group.

8. The apparatus of claim 1, wherein the computer system yields a multivariate-analysis result that includes human usergroup parameters and characteristics.

9. The apparatus of claim 1, wherein the administrator, as the first user, defines the relevant, weighted search and comparison parameters.

10. An apparatus comprising:
a computer system, that comprises a computer server communicatively coupled to clients over a wireless communications network, and wherein the server includes:
a relevancy-and-comparison engine (RACE) program stored on the server that, when the RACE program is executed, analyzes, for relevance to a first human-user, source data indexed by the plurality of search-engine-results, wherein the RACE program:
elicits and receives, from the first human user, a plurality of human-user-defined search terms;
elicits and receives, from the first human user, a specification of a first group, wherein the first group is a self-identified set of human users, and wherein the first human user need not be a member of the specified first group, wherein the RACE program associates a first set of group-relevancy factors with the first group;
elicits and receives, from the first human user, a plurality of human-user-defined relevancy factors, wherein the plurality of human-user-defined relevancy factors received from the first human user includes factors that are to be weighted by the RACE program to rank search-engine results for presentation to the first human user in addition to the search terms received from the first human user; and
wherein the RACE program's analysis is at least in part based on weights determined by the received plurality of the first human-user-defined relevancy factors and the first set of group-relevancy factors.

11. The apparatus of claim 10, wherein the computer server augments Internet searches, re-ranks search results, and provides recommendations for objects based on an initial subject-matter query.

12. The apparatus of claim 10, wherein the computer server elicits and receives user-volunteered profile Information displayed and weighted with other users with similar profiles, human-user-defined relevancy factors, interests, and associations for purposes of social networking and gathering, feedback sharing, and prediction and notification of future products, services and behaviors.

13. The apparatus of claim 10, wherein human users associate with other human users who have a similar profile to enable searches incorporating a social-interaction component, analyze interpersonal compatibility and provide the ability to contact one or more human users through the system.

14. The apparatus of claim 10, wherein human users associate with other human users in the first group of users, and other users who have similar weightings of the human-user-defined relevancy factors, to have access to an association page wherein discussion forums are hosted by the apparatus facilitating a user to post, chat and communicate with other individual users and post comments to a discussion bulletin board, and wherein the apparatus facilitates individual users, to define relevancy factors, apply these to a search for a compatible person or group of persons, and to contact one or more persons in their home community based on relevancy-analysis results.

15. The apparatus of claim 10, wherein the computer system suggests and elicits topics; receives human-user-defined relevancy-weight data from a human user or human user group; wherein the users adjust relevancy weights of ranking data based on a context of the proposed use parameter of the relevancy-weighting ranking, and wherein the social search aspects are facilitated and managed by the system based upon rules and instructions predetermined by the user and the user groups.

16. The apparatus of claim 10, wherein the system facilitates a plurality of users, adjusting relevancy weights of ranking data based on a plurality of human user-selected-peer user groups from whom the ranking data came, and wherein the searching user does not need to be a member of a group to view human-user-defined results from the group.

17. The apparatus of claim 10, wherein the plurality of human-user-defined relevancy factors received from the first human user include a time parameter, and wherein the computer system calculates a momentum quotient based upon the algorithms defined by the first group of human users, wherein the first human user's input topics and relevant parameters, resulting in ratings and scorings based upon the relevant parameters that are compared and contrasted to weighted parameters from other human user-groups, and a set of resulting cumulative summaries, through a user-defined algorithm, are displayed as a momentum quotient and dynamically link to the communications network.

18. The apparatus of claim 10, wherein the computer system facilitates statistical modeling to analyze historical trends, to determine and predict future trends, and to define and determine a momentum quotient of a topic, product or other subject from the priorities, weighting, and perspectives of defined associations or user groups, and the data are tracked and visually displayed by inputting human-user-defined parameters, topics and the weightings by specifying human-user-defined criteria wherein a momentum quotient can be calculated and quantified, and wherein the user selects parameters that are isolated or correlated for search, trending and prediction.

19. The apparatus of claim 10, wherein human users associate with other human users, excluding users with similar profile information, facilitating searching and incorporating a social-interaction component, analyze interpersonal compatibility and provide the ability to contact one or more human users through the apparatus.

20. The apparatus of claim 10, wherein the apparatus includes a social networking component; wherein social networking aspects are facilitated and managed by the apparatus.

21. The apparatus of claim 10, wherein the computer includes notification options that have been predefined by a user, administrator and a user group.

22. A computer-implemented method for analyzing, for relevance to a first human-user, source data indexed by the plurality of search-engine-result pointers, the method comprising:
providing a computer server communicatively coupled to clients over a communications network;
eliciting and receiving into the computer system, which includes a computer server, from the first human user, a plurality of human-user-defined search terms;
eliciting and receiving into the computer server, from the first human user, a specification of a first group, wherein the first group is a self-identified set of human users, and wherein the first human user need not be a member of the specified first group, wherein the RACE program associates a first set of group-relevancy factors with the group;

eliciting and receiving into the computer server, from the first human user, a plurality of human-user-defined relevancy factors, wherein the plurality of relevancy factors received from the first human user includes factors that are to be weighted by the RACE program to rank search-engine results for presentation to the first human user in addition to the search terms received from the first human user; including human-user-defined relevancy factors from users who have elected to be included in the computer system social-interaction component, wherein a user can identify other users based upon criteria defined by the user, and analyzing the source data in the computer server for relevance to the first human user, at least in part based on weights determined by the received plurality of the first human-user-defined relevancy factors and the first set of group-relevancy factors;

presenting, by the computer server, the analyzed results to the first human user.

23. An apparatus comprising:
a computer system comprising, a computer server, wherein the computer server is communicatively coupled to a plurality of clients over a wireless communications network, and wherein the computer server includes:
 a relevancy-and-comparison engine (RACE) program stored on the server that, when the RACE program is executed, analyzes, for relevance to a first human-user, source data indexed by the plurality of search-engine-result pointers, wherein the RACE program:
 a source of a plurality of search-engine-result pointers;
 elicits and receives, from the first human-user, a plurality of human-user-defined search terms;
 elicits and receives, from the first human user, a specification of a first group, wherein the first group is a self-identified set of human users, and wherein the first human user need not be a member of the specified first group, wherein the RACE program associates a first set of group-relevancy factors with the group;
 elicits and receives, from the first human user, a plurality of human-user-defined relevancy factors, wherein the plurality of human-user-defined relevancy factors received from the first human user includes factors that are to be weighted by the RACE program to rank search-engine results for presentation to the first human user in addition to the search terms received from the first human user; and
 wherein the RACE program's analysis is at least partially based on weights determined by the received plurality of the first human-user-defined relevancy factors and the first set of group-relevancy factors;
 wherein the computer system includes a mobile electronic device, and includes a dynamically linked result to include at least one of the group consisting of a symbol, a graph, and a figure, for ready access via a computer or a mobile device.

24. An apparatus comprising:
a computer system that comprises a computer server communicatively coupled to clients over a wireless communications network, and wherein the server includes a system forum:
 a relevancy-and-comparison engine (RACE) program stored on the server that, when the RACE program is executed, analyzes, for relevance to a first human-user, source data indexed by the plurality of search-engine-results, wherein the RACE program:
 elicits and receives, from the first human user, a plurality of human-user-defined search terms;
 elicits and receives, from the first human user, a specification of a first group, wherein the first group is a self-identified set of human users, and wherein the first human user need not be a member of the specified first group, wherein the RACE program associates a first set of group-relevancy factors with the group;
 elicits and receives, from the first human user, a plurality of human-user-defined relevancy factors, wherein the plurality of relevancy factors received from the first human user includes factors that are to be weighted by the RACE program to rank search-engine results for presentation to the first human user in addition to the search terms received from the first human user; and
 wherein the RACE program's analysis is at least in part based on weights determined by the received plurality of the first human-user-defined relevancy factors and the first set of group-relevancy factors;
 wherein the computer system elicits and receives human-user-defined relevancy factors from users who have elected to be included in the system forum and social-interaction component wherein a user identifies other human users based upon criteria defined by the human user, to communicate and solicit feedback from other human users directly via a forum provided by the system creating a social interface between human users based upon criteria defined by the human users themselves.

* * * * *